(12) United States Patent
Kweon, II et al.

(10) Patent No.: US 7,612,946 B2
(45) Date of Patent: Nov. 3, 2009

(54) WIDE-ANGLE LENSES

(75) Inventors: Gyeong Kweon, II, Gwangju (KR); Milton Laikin, Marina Del Rey, CA (US)

(73) Assignee: Nanophotonics Co., Ltd., Gwangju (KR)

( * ) Notice: Subject to any disclaimer, the term of this patent is extended or adjusted under 35 U.S.C. 154(b) by 0 days.

(21) Appl. No.: 12/162,122

(22) PCT Filed: Oct. 24, 2007

(86) PCT No.: PCT/KR2007/005246

§ 371 (c)(1),
(2), (4) Date: Jul. 24, 2008

(87) PCT Pub. No.: WO2008/051016

PCT Pub. Date: May 2, 2008

(65) Prior Publication Data

US 2009/0052050 A1  Feb. 26, 2009

(30) Foreign Application Priority Data

Oct. 24, 2006  (KR) .................. 10-2006-0103346
Mar. 4, 2007  (KR) .................. 10-2007-0021234
Jun. 23, 2007  (KR) .................. 10-2007-0061922
Oct. 23, 2007  (KR) .................. 10-2007-0106725

(51) Int. Cl.
*G02B 3/00* (2006.01)
*G02B 13/06* (2006.01)
(52) U.S. Cl. ............... 359/648; 359/649; 359/650; 359/651; 359/725; 359/740; 359/754
(58) Field of Classification Search ......... 359/648–651, 359/725, 740, 754
See application file for complete search history.

(56) References Cited

U.S. PATENT DOCUMENTS 4,070,098 A * 1/1978 Buchroeder ............. 359/725
5,434,713 A * 7/1995 Sato ....................... 359/725
6,510,009 B2  1/2003 Nishimura
6,710,942 B2  3/2004 Sato
6,762,887 B2  7/2004 Tomioka (Continued)

FOREIGN PATENT DOCUMENTS

JP  2001-343586  12/2001

(Continued)

OTHER PUBLICATIONS

Gauvin et al., "Development of New Family of Wide-Angle Anamophic Lens with Controlled Distortion Profile," Proceedings of SPIE (5874):587404-1, 2005.

(Continued)

*Primary Examiner*—Evelyn A. Lester
(74) *Attorney, Agent, or Firm*—Hovey Williams LLP

(57) ABSTRACT

The present invention provides new projection schemes for wide angle imaging lenses rotationally symmetric about optical axis wherein the field of view of lenses and the size of image sensors are directly reflected without any reference to the effective focal length of the lenses. This invention also provides explicit examples of wide-angle lenses implementing the newly developed projection schemes. According to the present invention, by providing new projection schemes explicitly reflecting the physical quantities of direct interest to the user for industrial applicability, namely, the field of view and the image sensor size, it is possible to realize wide-angle lenses providing the most satisfactory images.

18 Claims, 31 Drawing Sheets

U.S. PATENT DOCUMENTS

| | | | |
|---|---|---|---|
| 6,844,990 B2 | 1/2005 | Artonne et al. | 359/725 |
| 6,865,028 B2 | 3/2005 | Moustier et al. | 359/725 |
| 7,046,458 B2 * | 5/2006 | Nakayama | 359/725 |
| 7,283,312 B2 * | 10/2007 | Kawada | 359/725 |

FOREIGN PATENT DOCUMENTS

| | | |
|---|---|---|
| JP | 2003-121735 | 4/2003 |
| JP | 2003-287677 | 10/2003 |

OTHER PUBLICATIONS

Thibault, S., "Distortion Control Offers Optical System Design a New Degree of Freedom," Photonics Spectra, pp. 80-82, May 2005.

Thibault, S., "Enhanced optical design by distortion control," Proceedings of SPIE (5962):596211, 2005.

Thibault, S., "Innovative lens improves imaging for surveillance systems," SPIE Newsroom, Aug. 19, 2006.

Thibault, S., "Panomorph lenses: A Low Cost Solution for Panoramic Surveillance," Proceedings of SPIE (6203):62030S, 2006.

* cited by examiner

[Fig. 1]
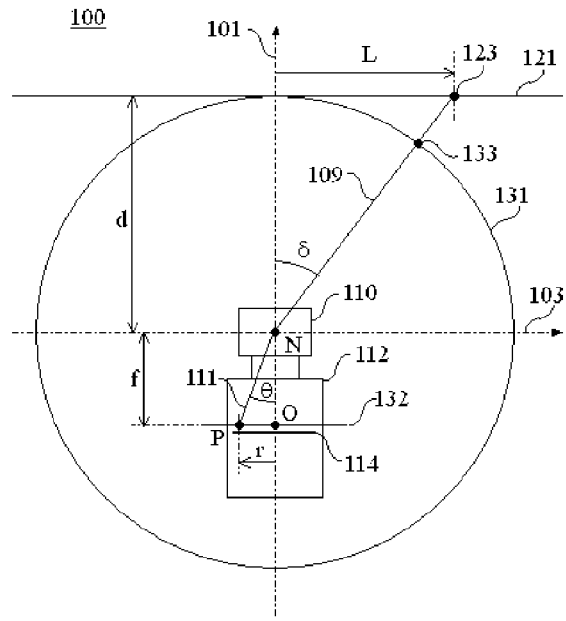
[Fig. 2]
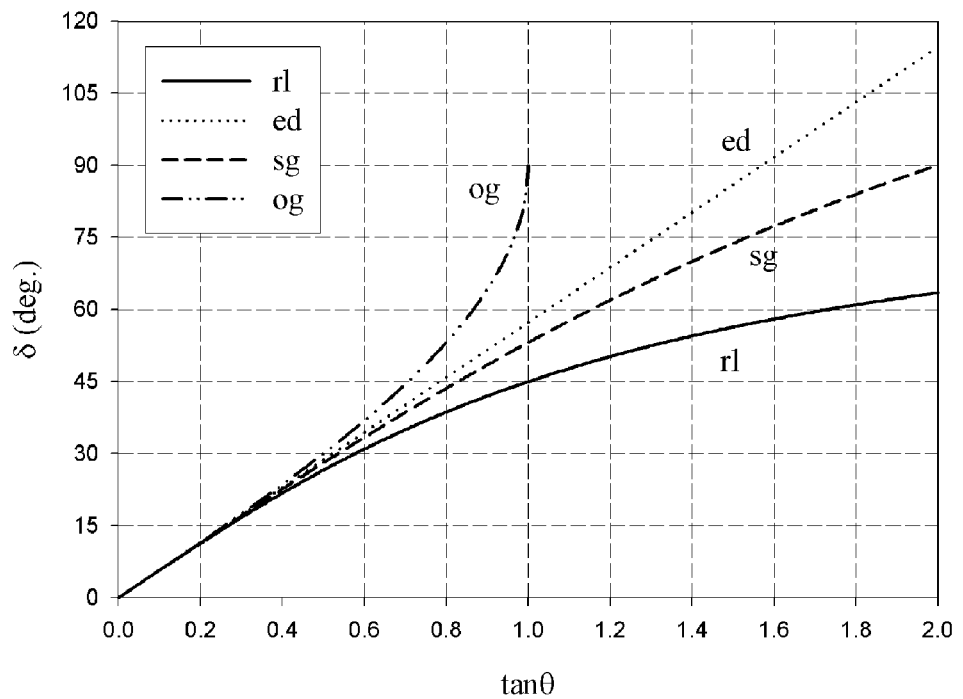

[Fig. 3]
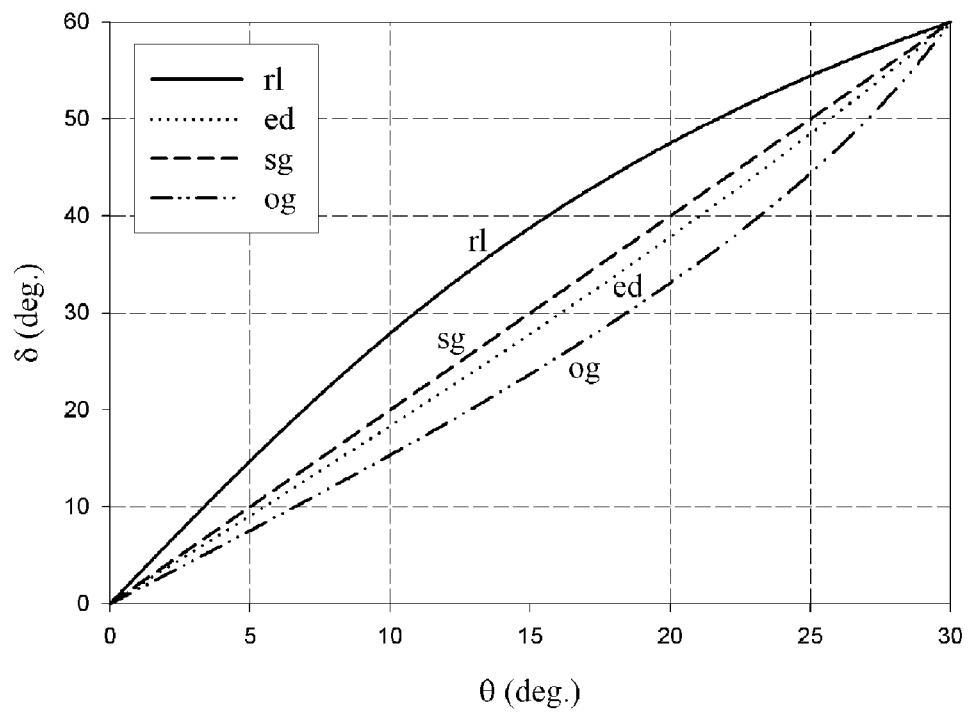
[Fig. 4]
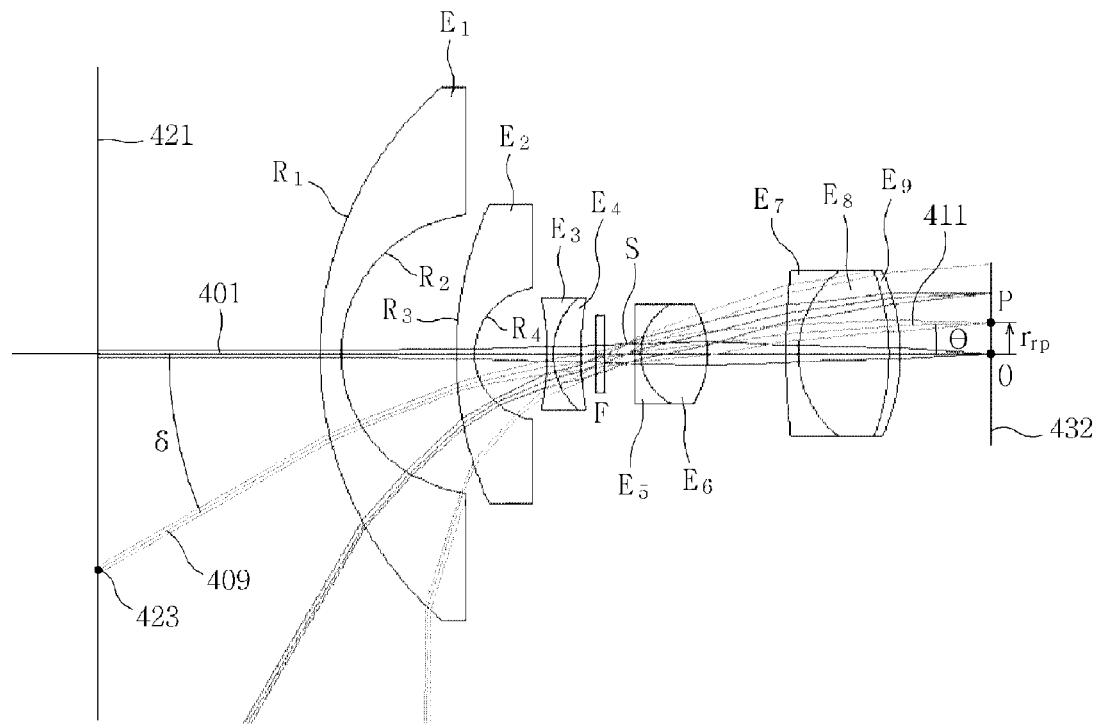

[Fig. 5]
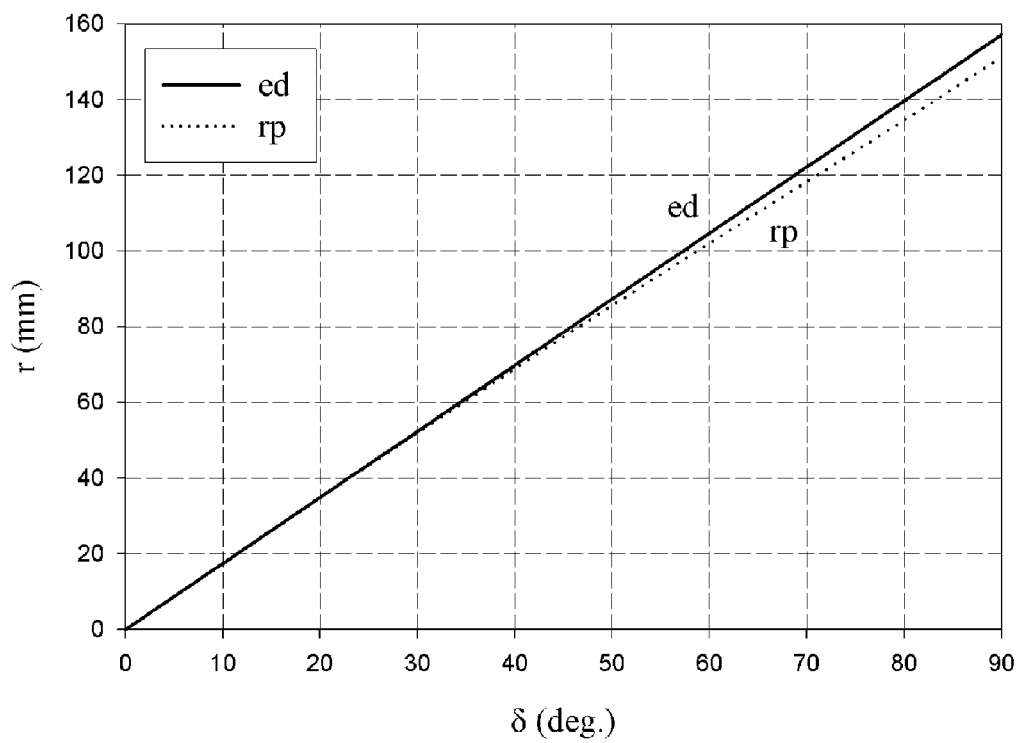
[Fig. 6]
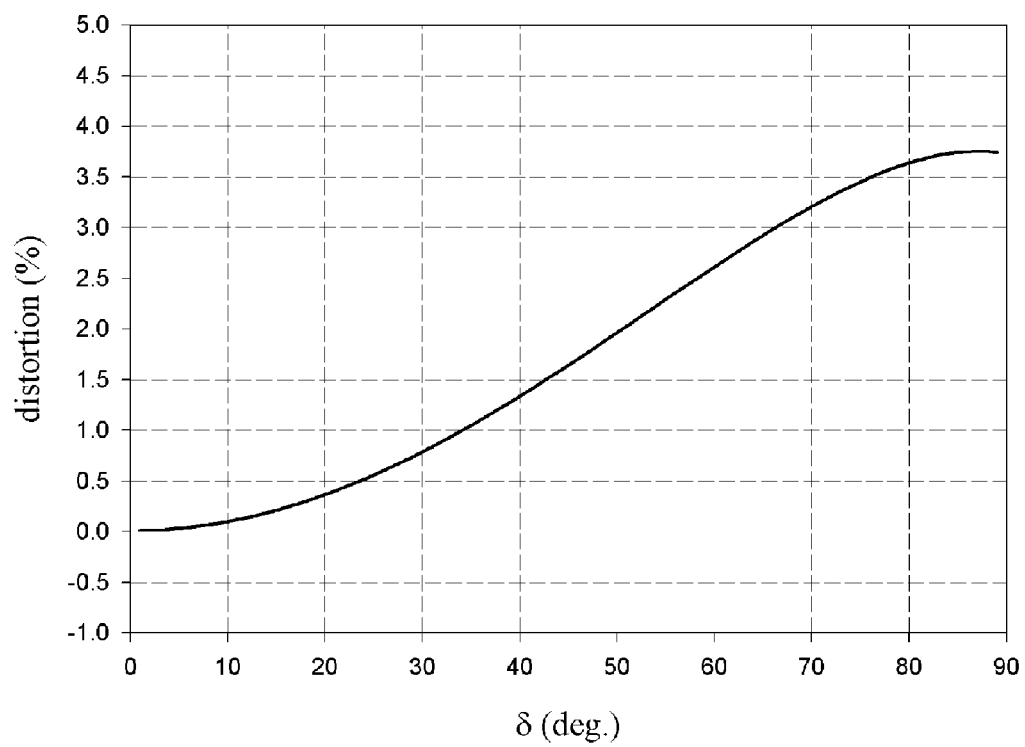

[Fig. 7]
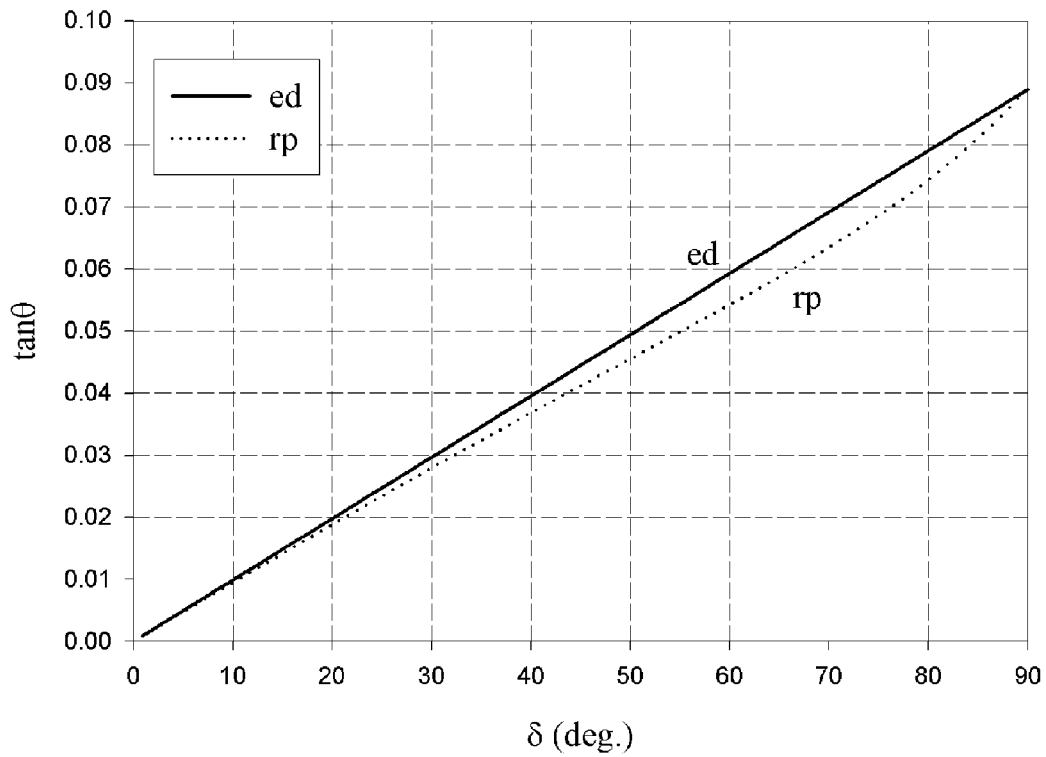
[Fig. 8]
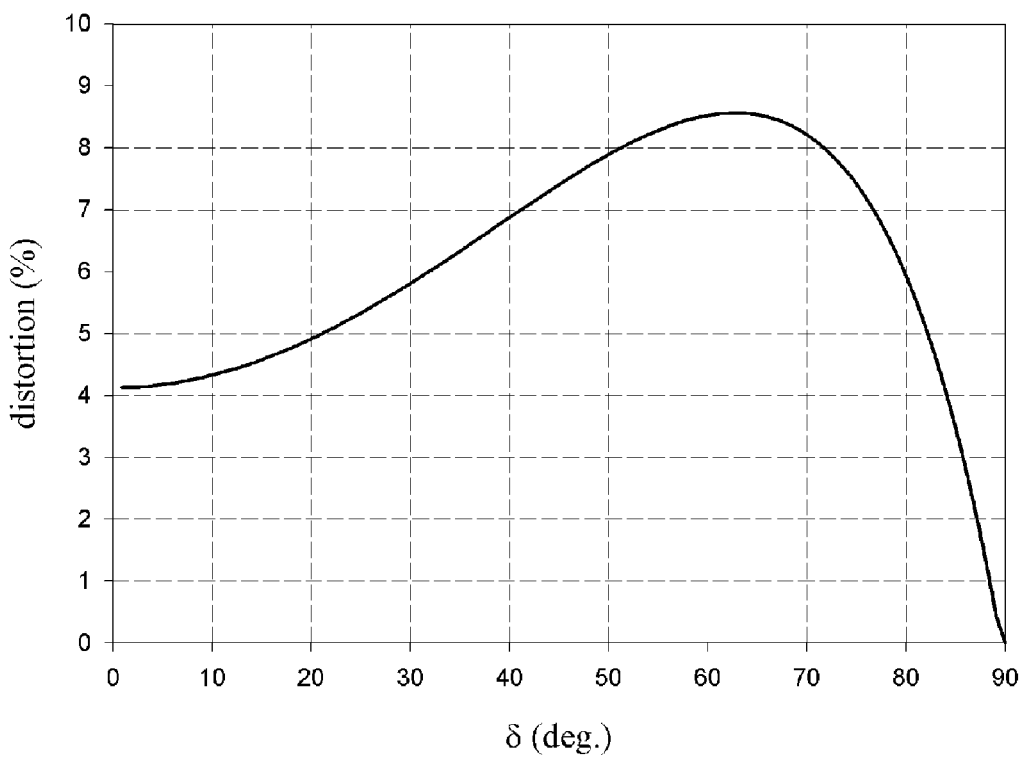

[Fig. 9]
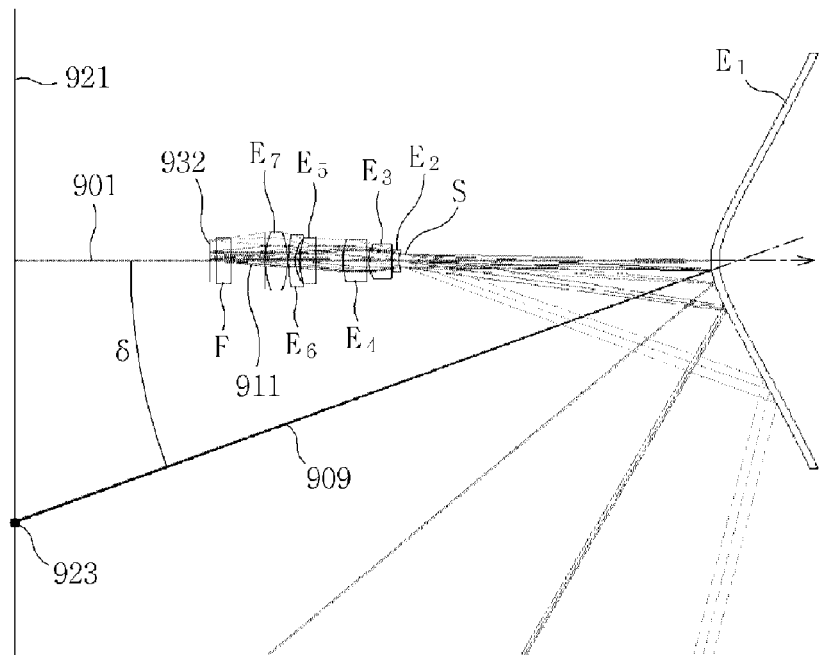
[Fig. 10]
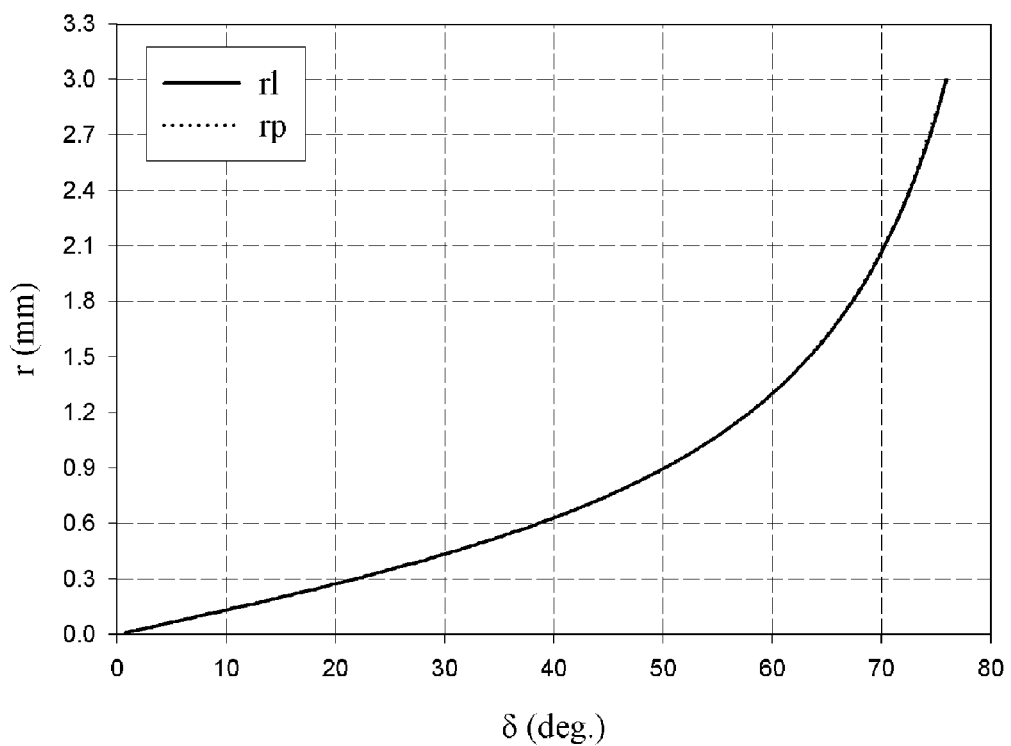

[Fig. 11]
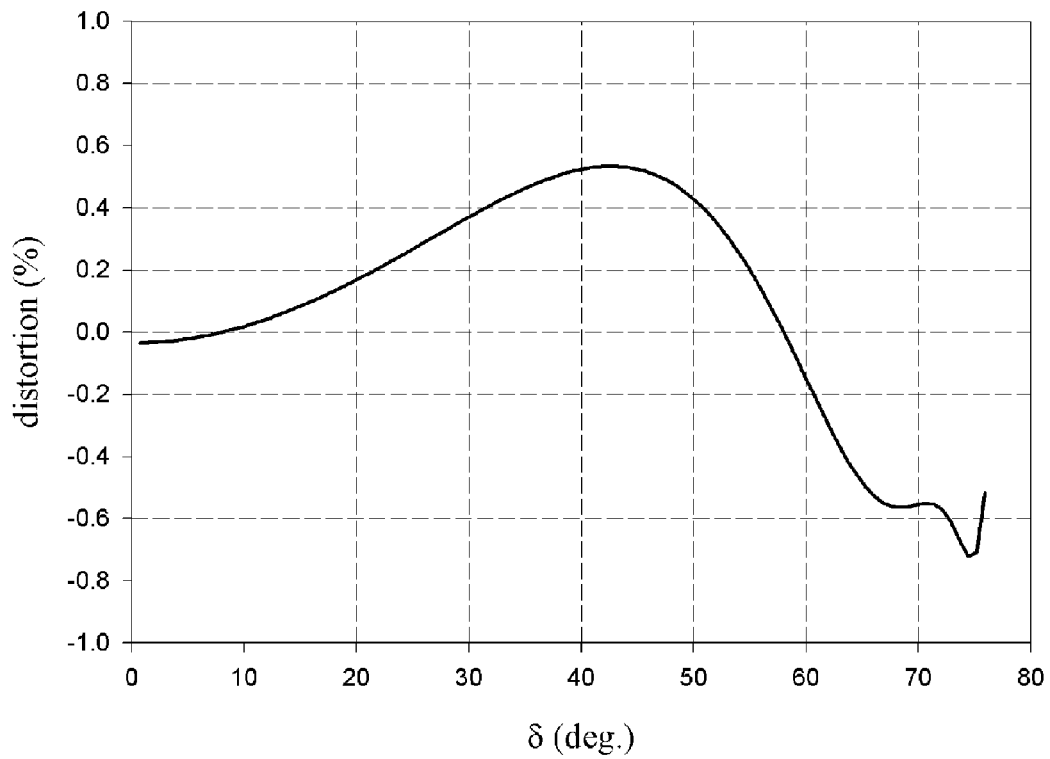
[Fig. 12]
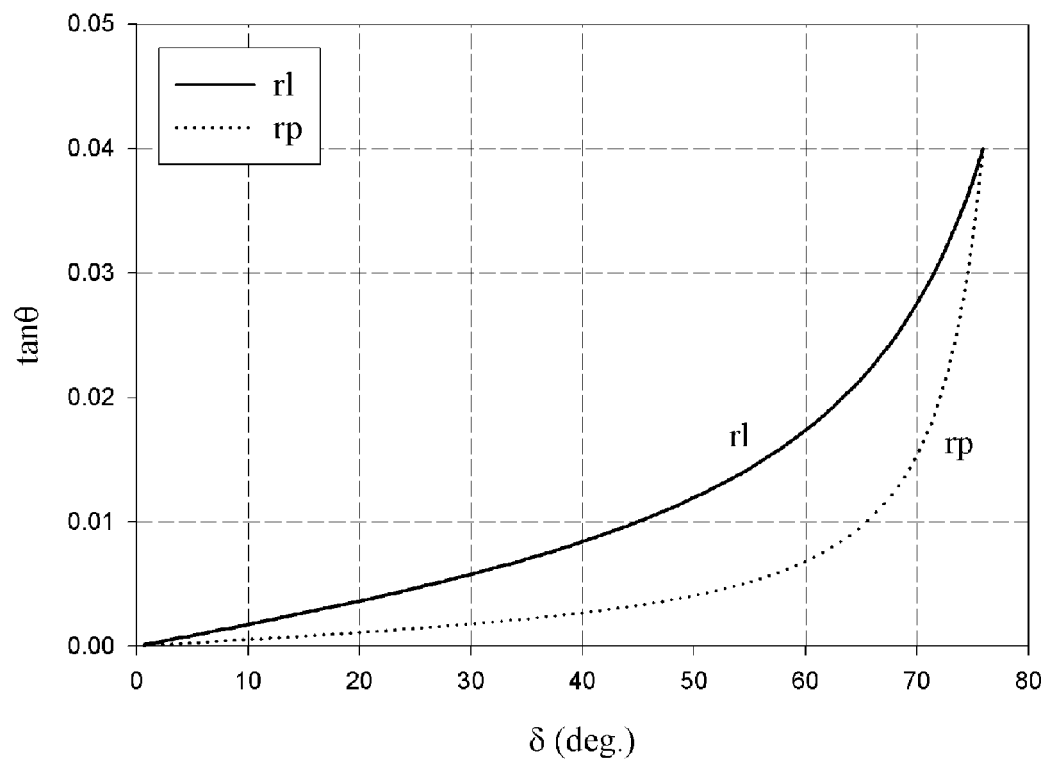

[Fig. 13]
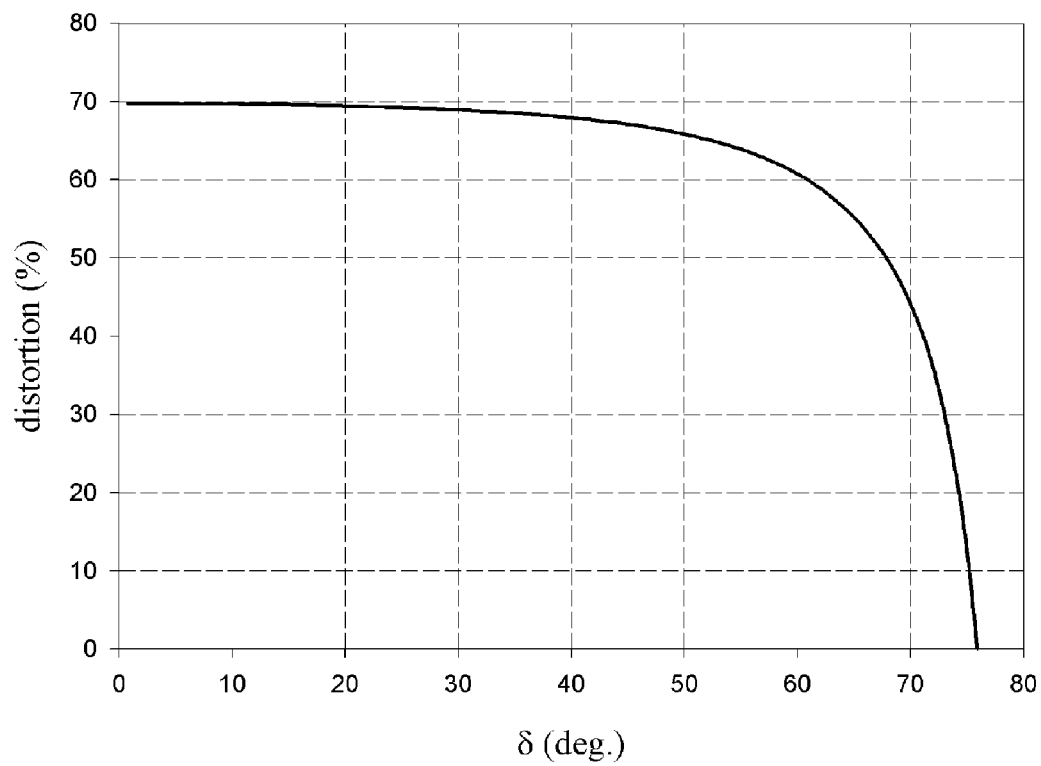
[Fig. 14]
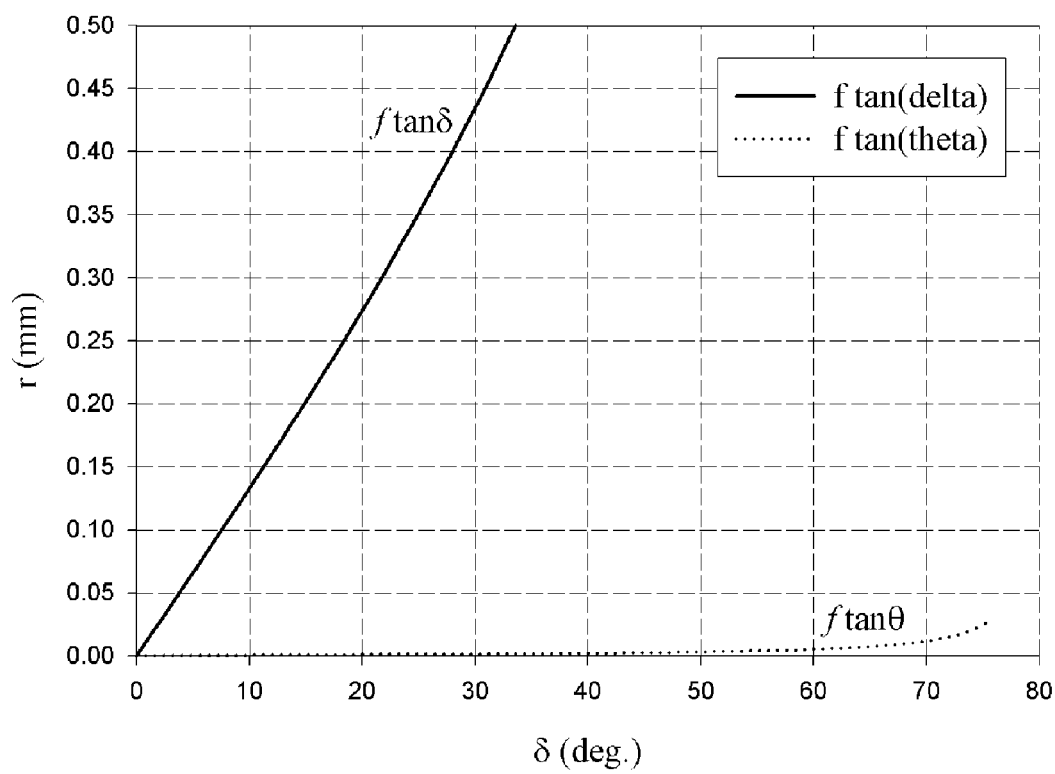

[Fig. 15]
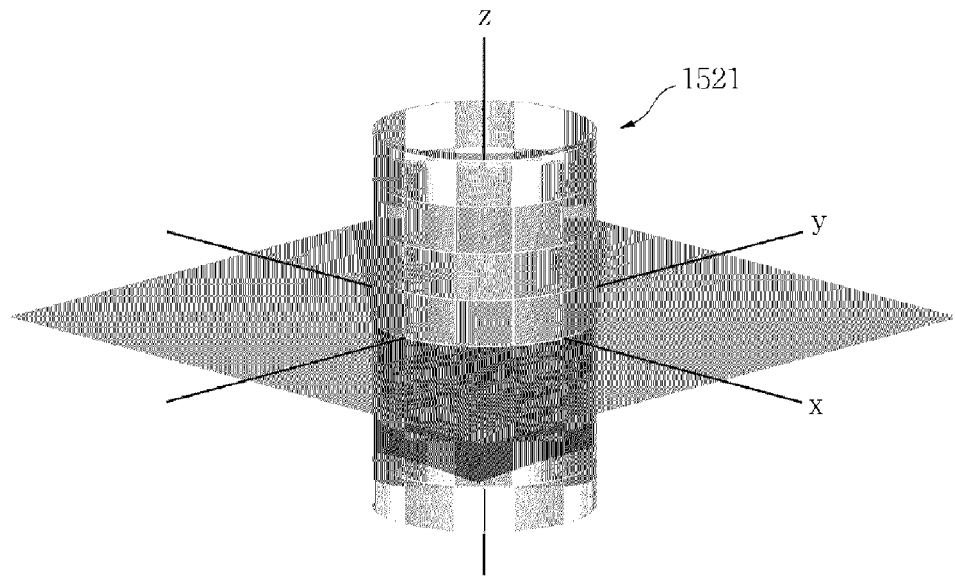
[Fig. 16]
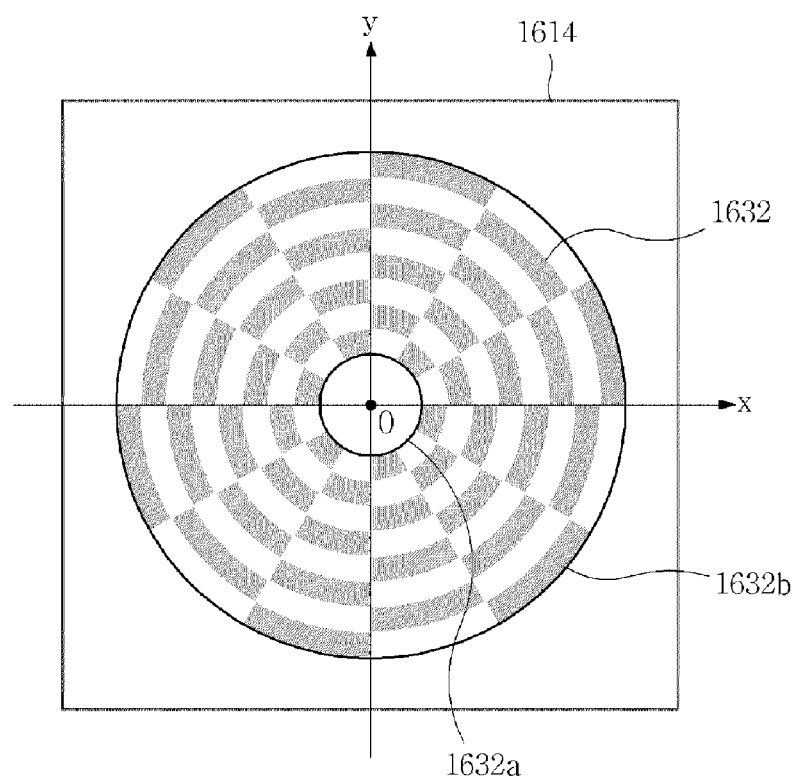

[Fig. 17]
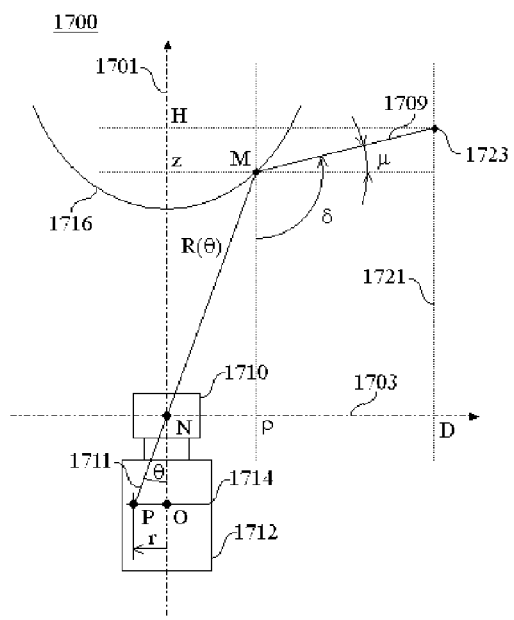
[Fig. 18]
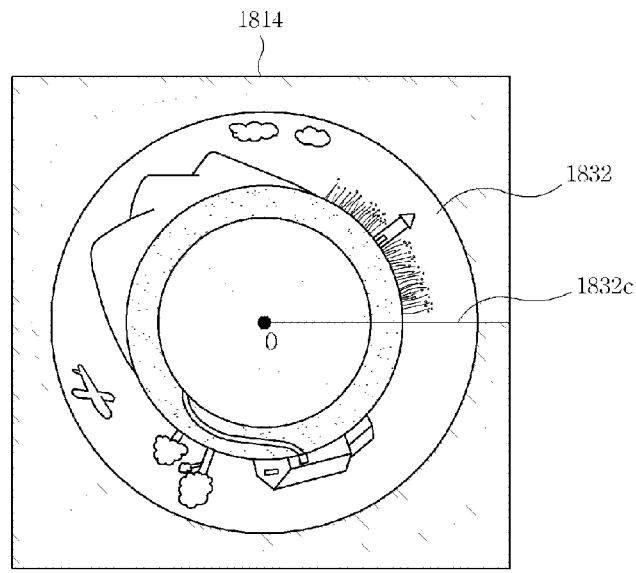
[Fig. 19]
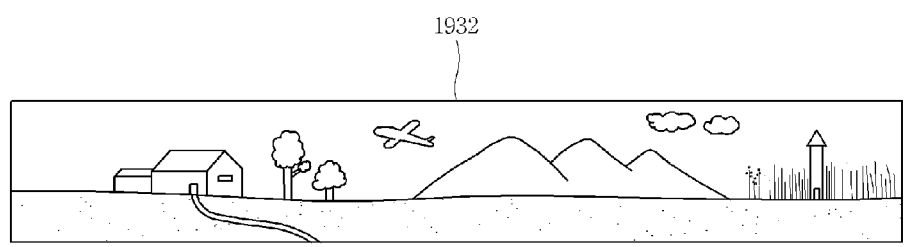

[Fig. 20]
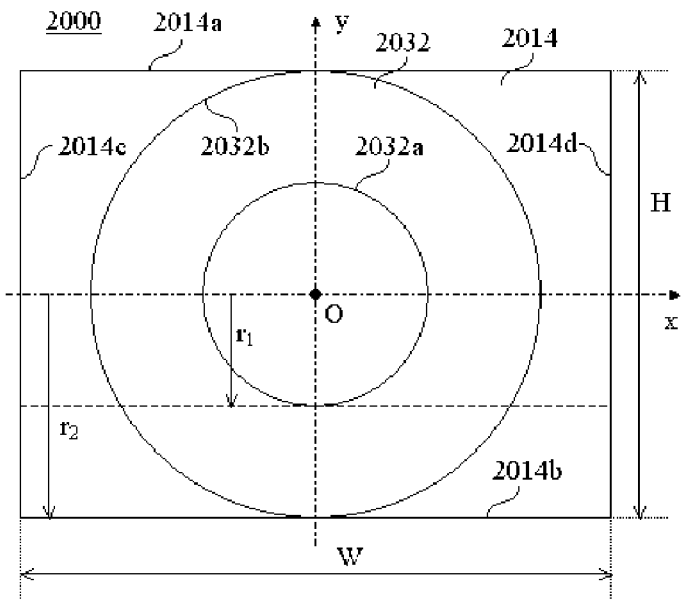
[Fig. 21]
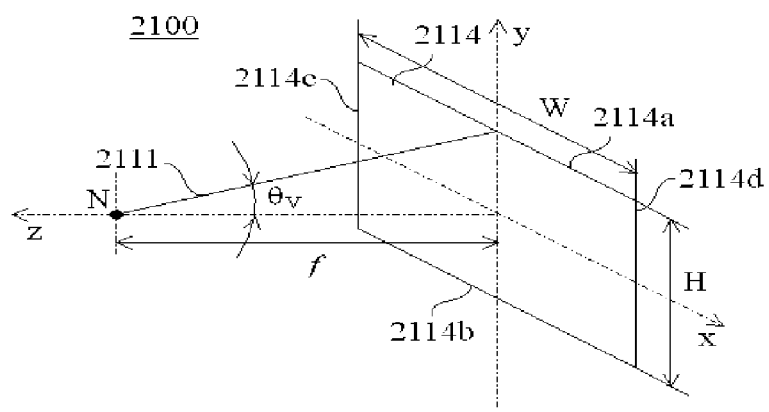
[Fig. 22]
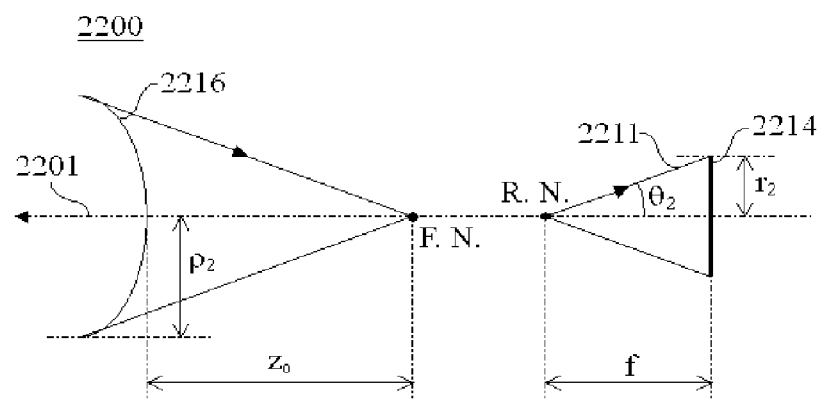

[Fig. 23]
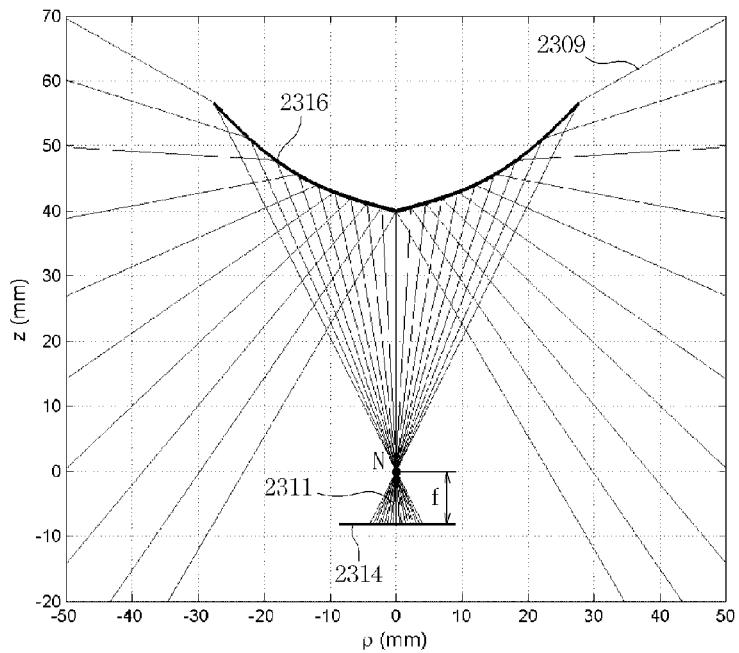
[Fig. 24]
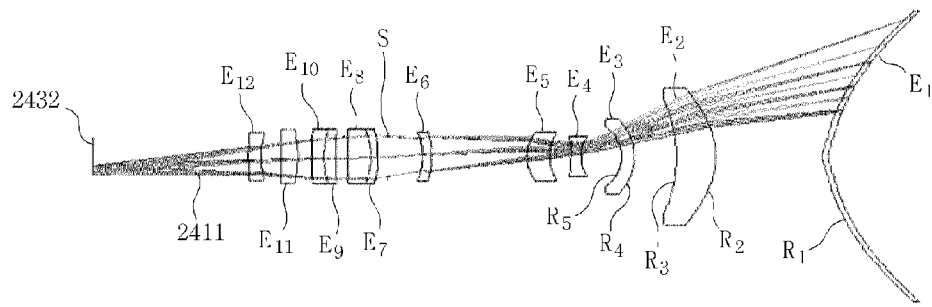
[Fig. 25]
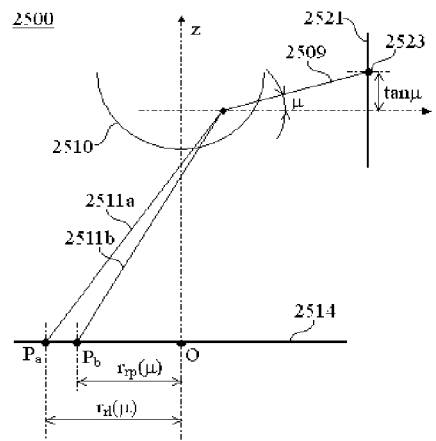

[Fig. 26]
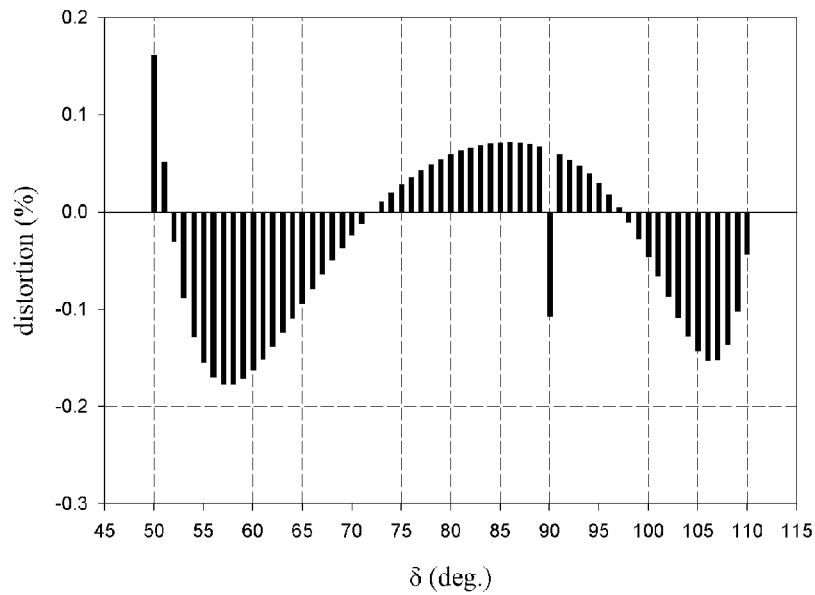
[Fig. 27]
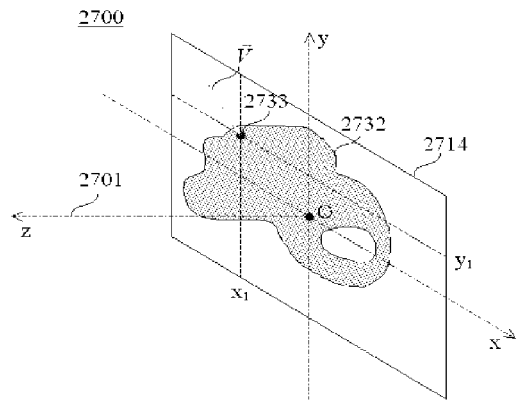
[Fig. 28]
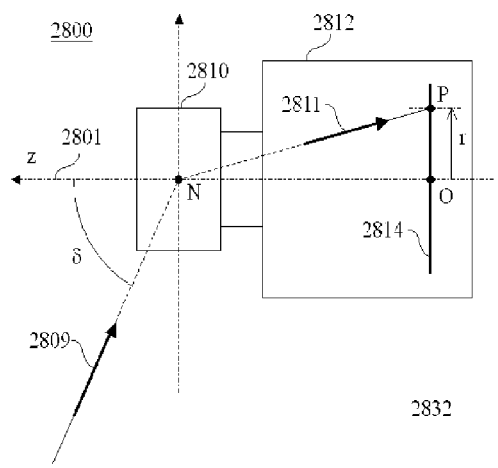

[Fig. 29]
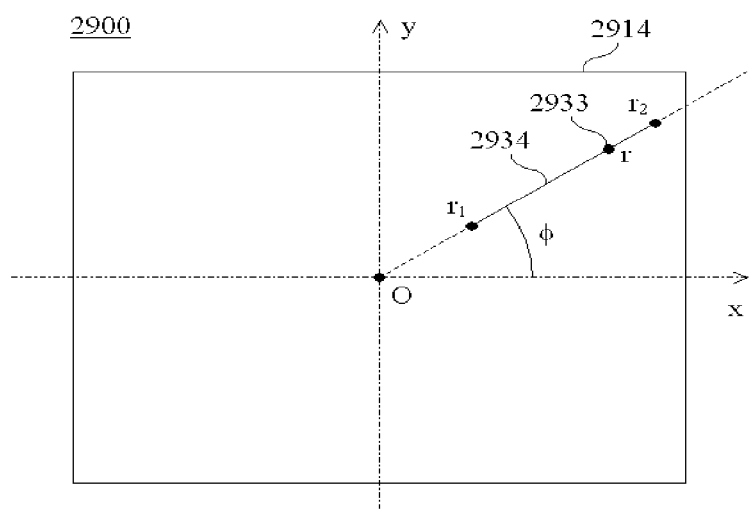
[Fig. 30]
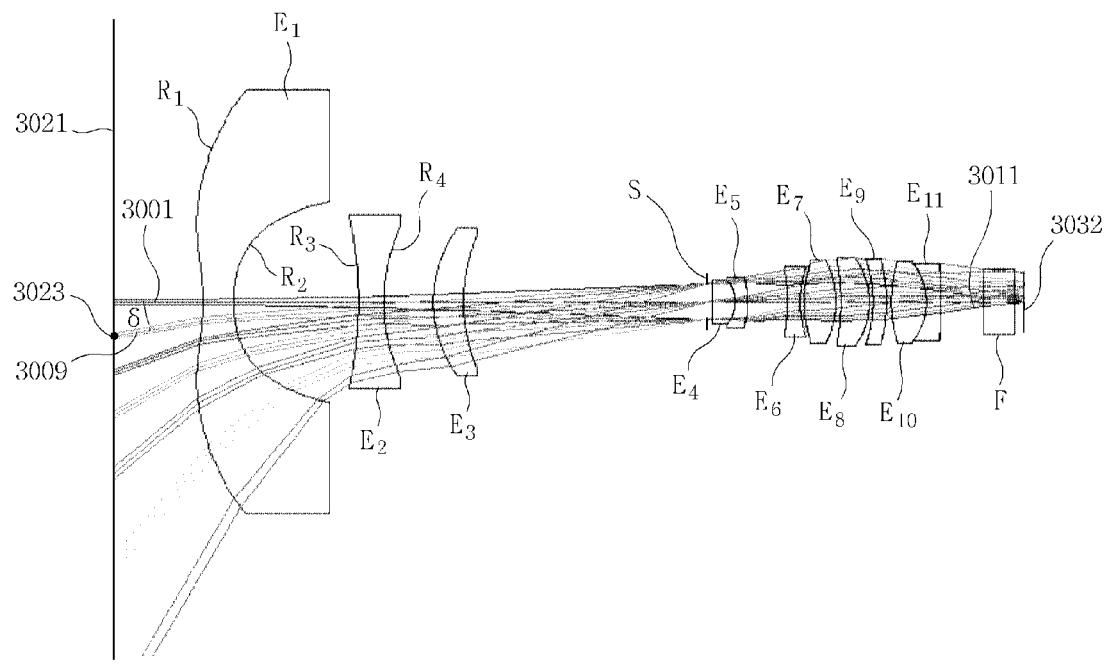

[Fig. 31]
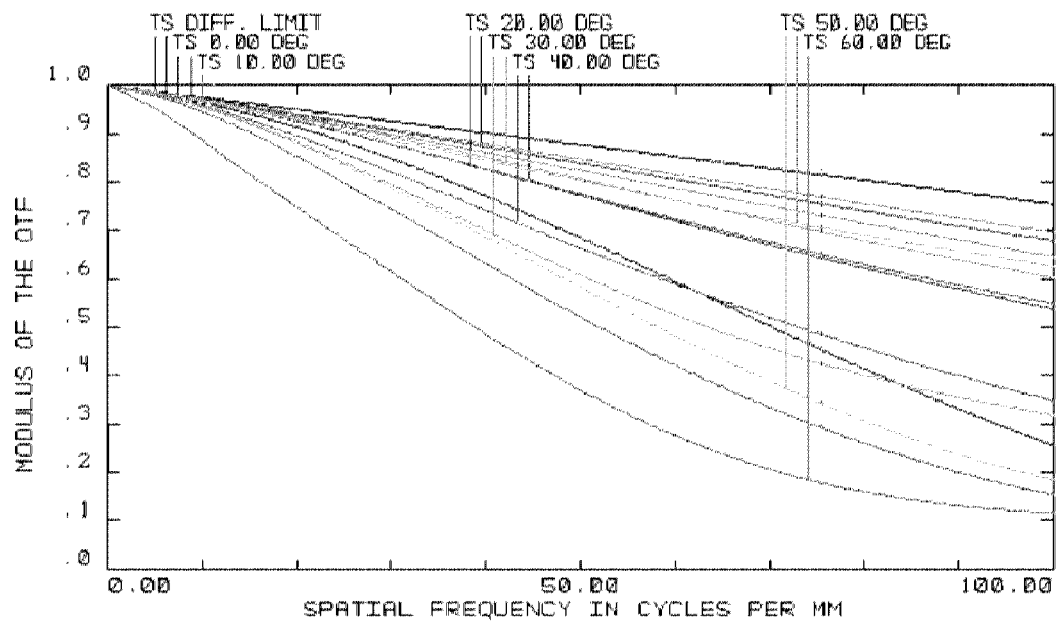
[Fig. 32]
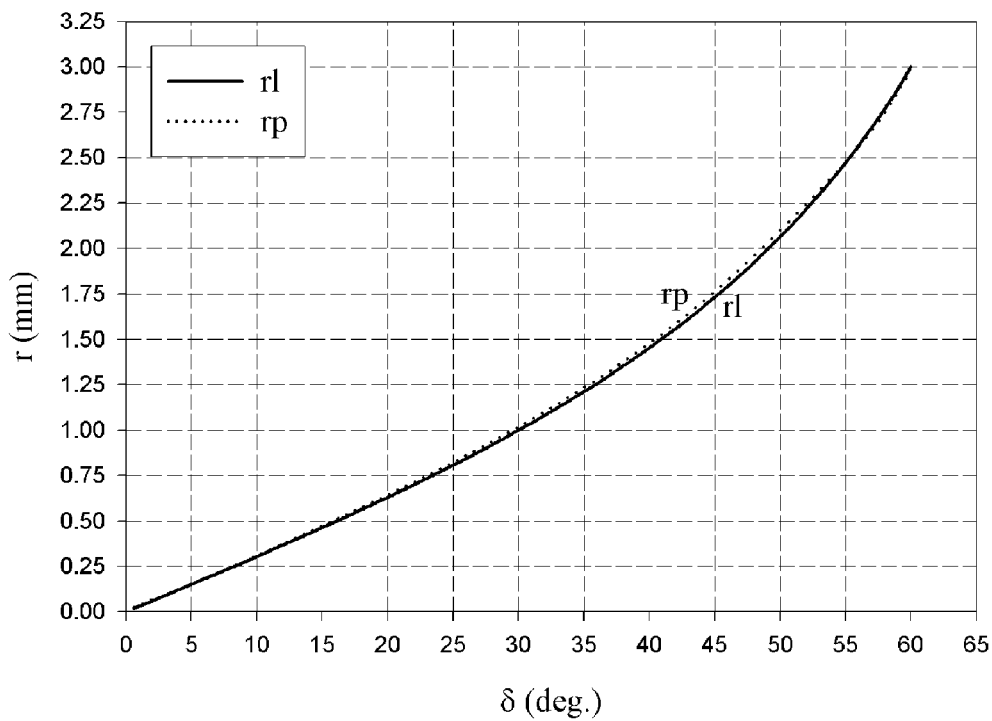

[Fig. 33]
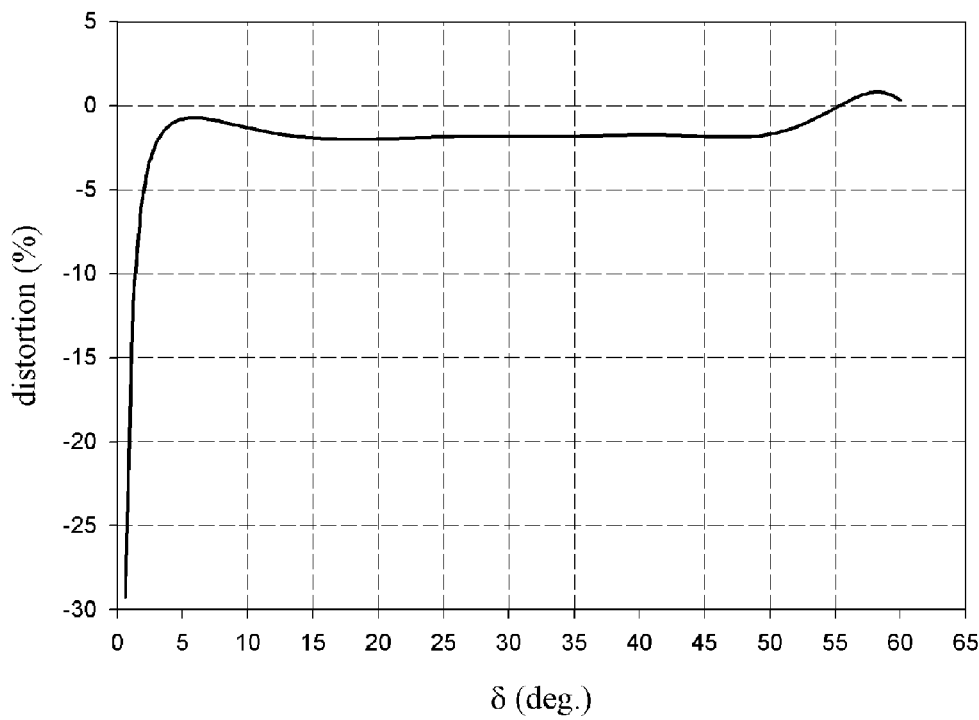
[Fig. 34]
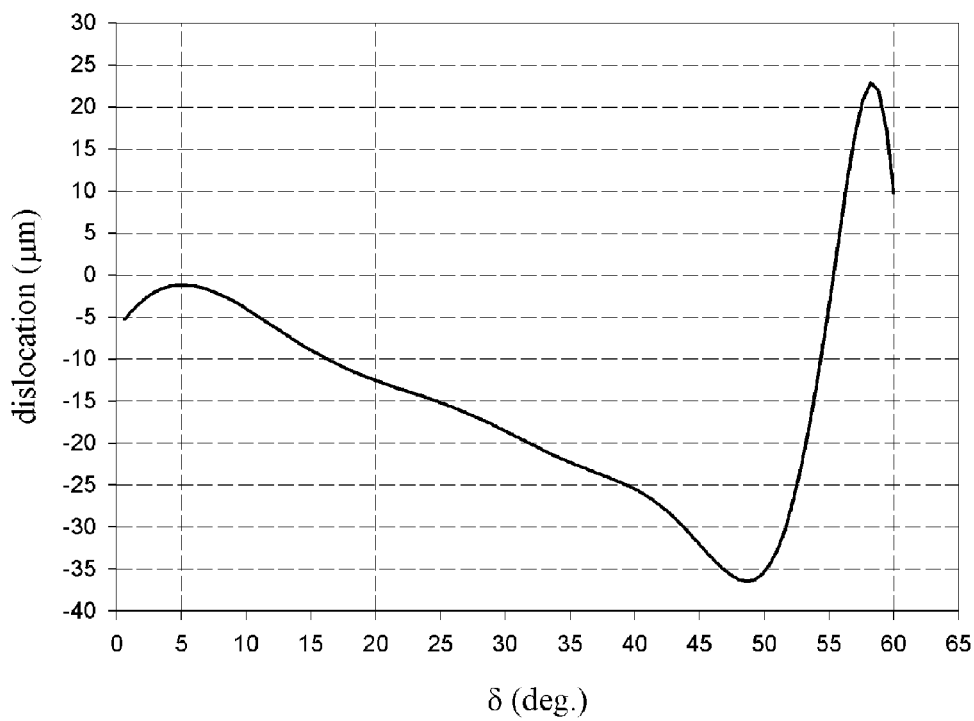

[Fig. 35]
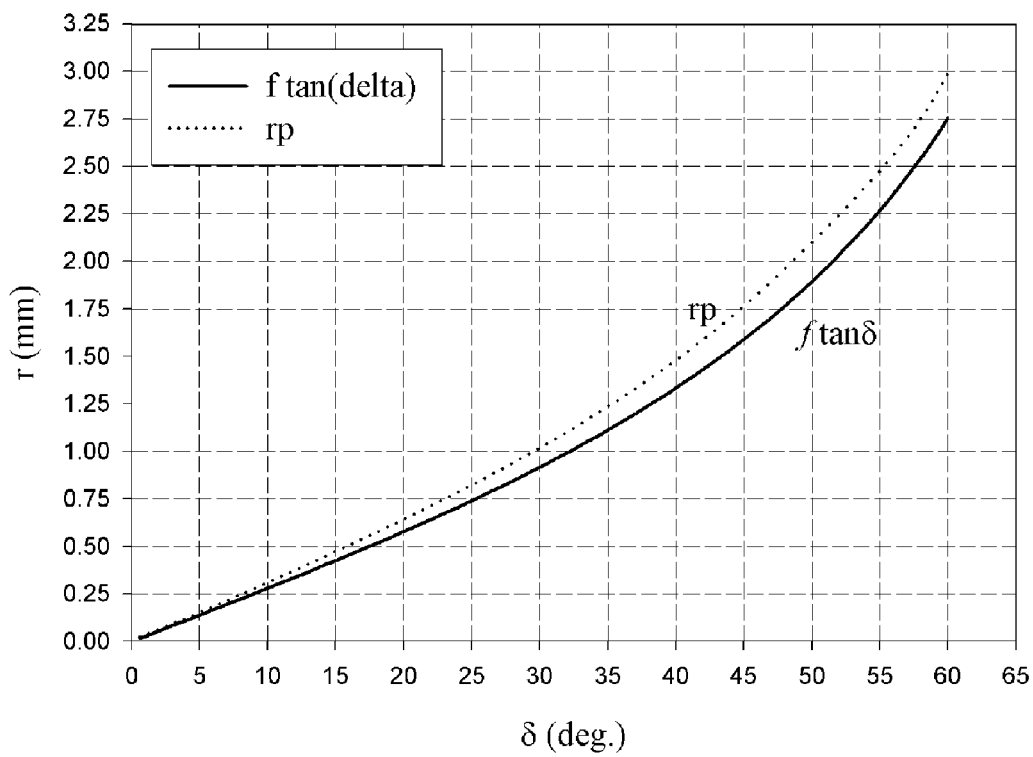
[Fig. 36]
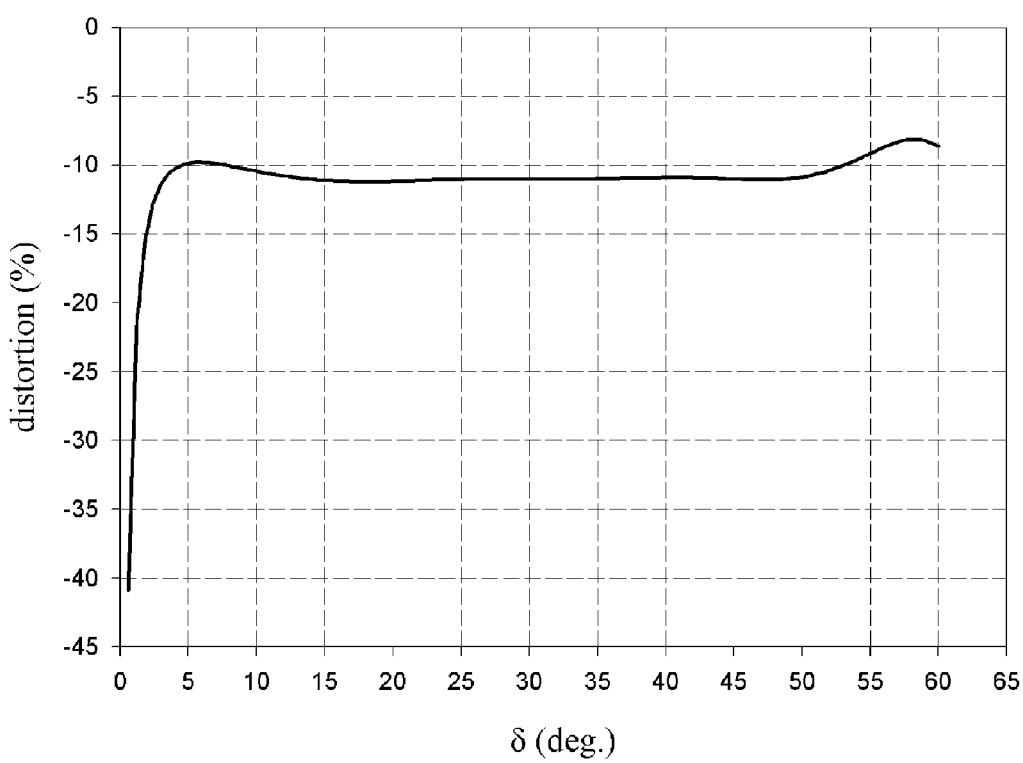

[Fig. 37]
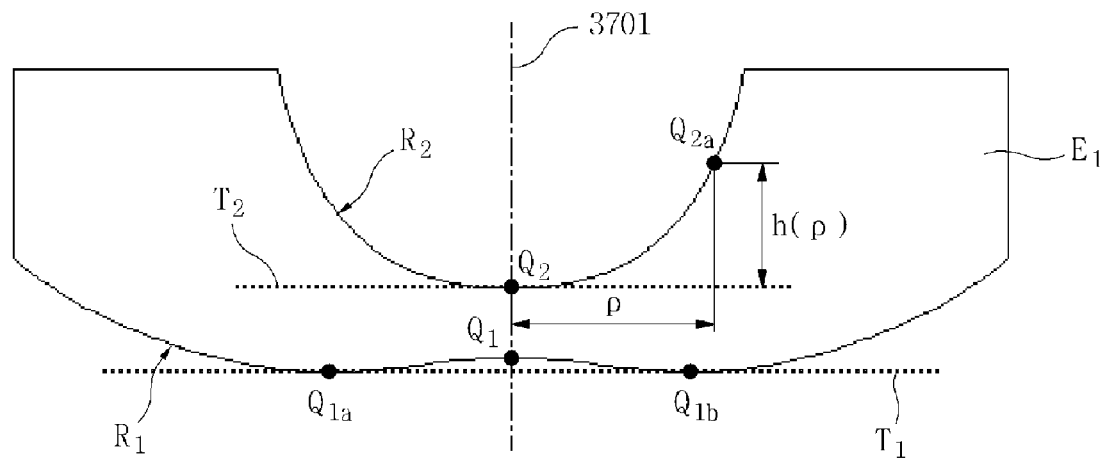
[Fig. 38]
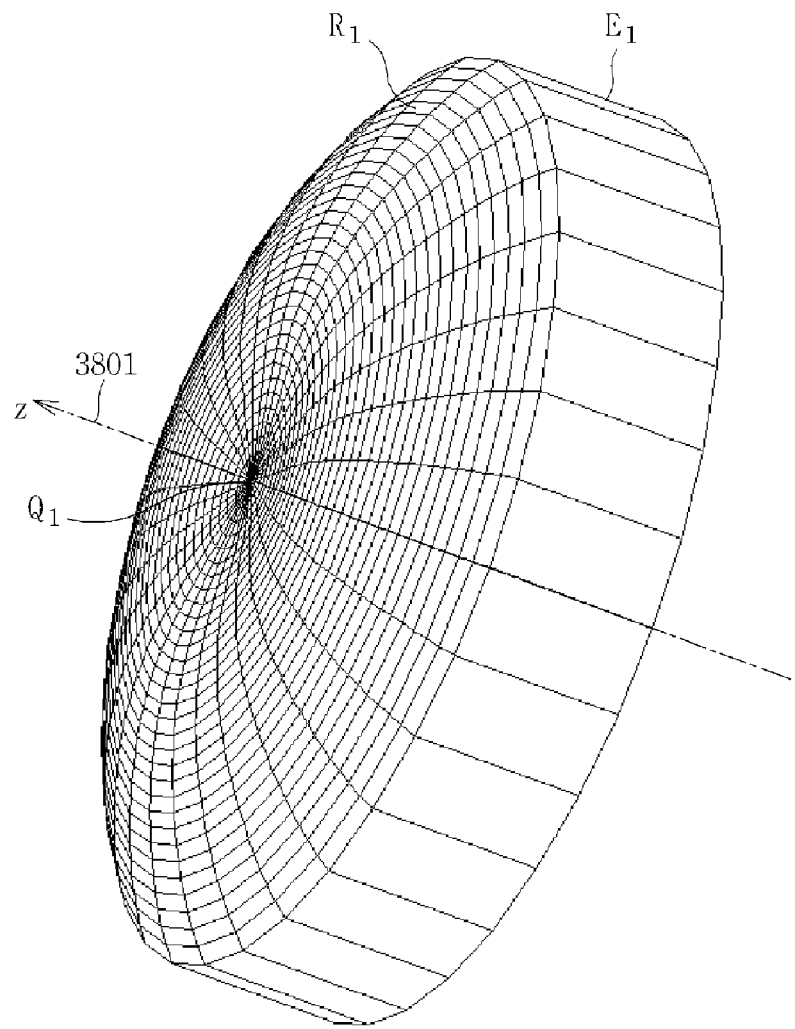

[Fig. 39]
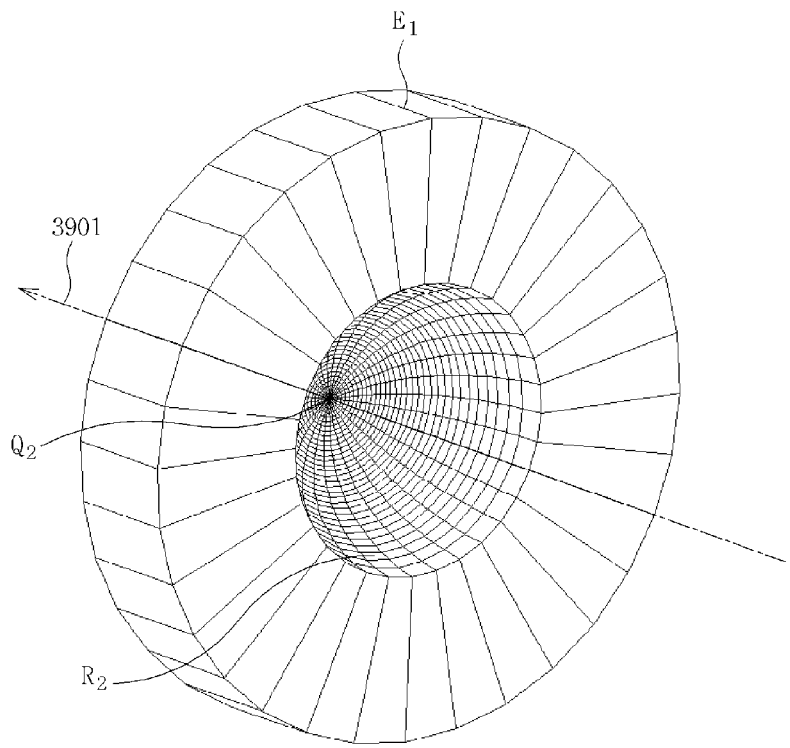
[Fig. 40]
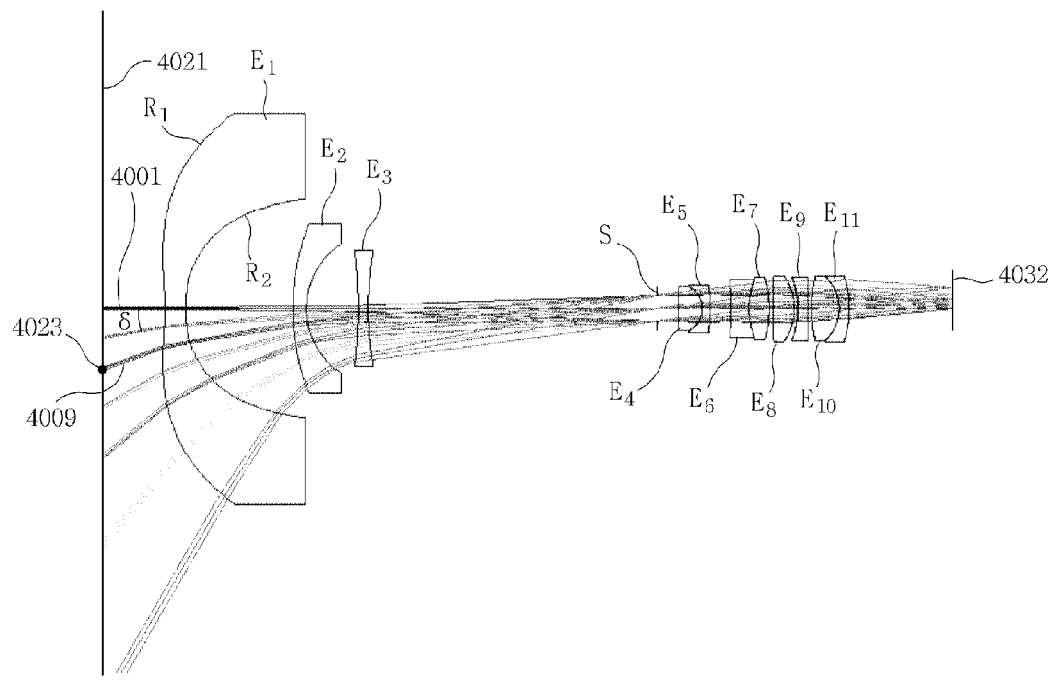

[Fig. 41]
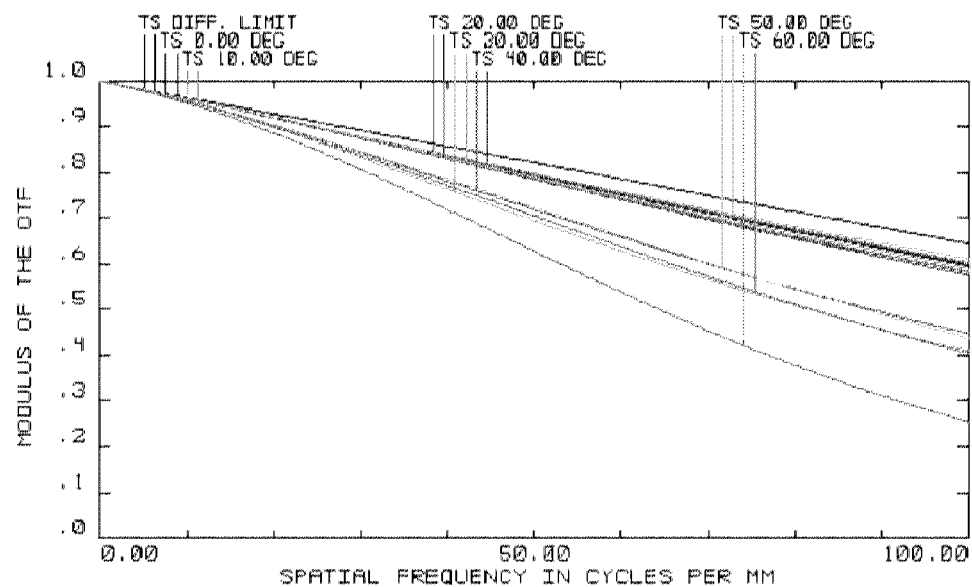
[Fig. 42]
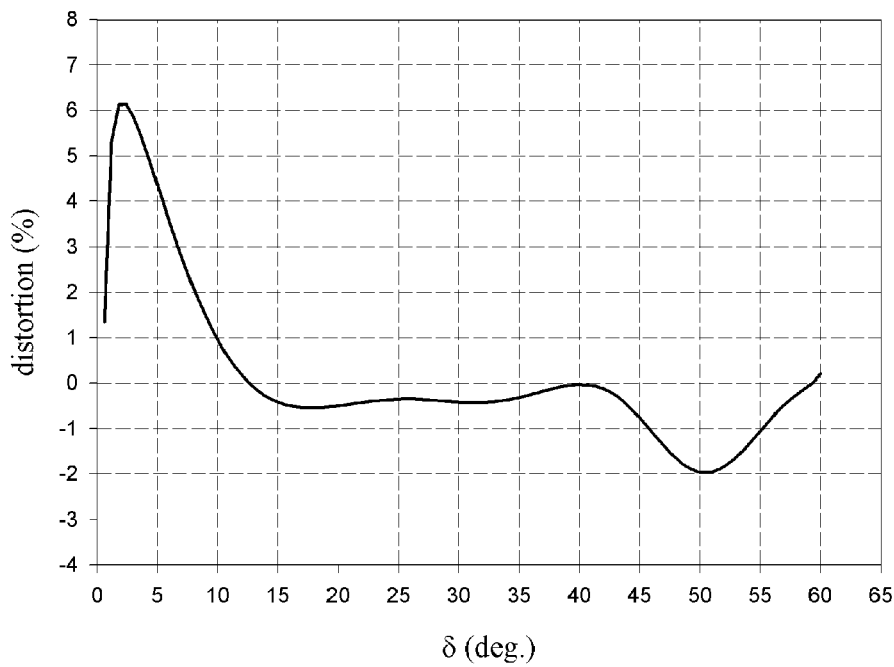

[Fig. 43]
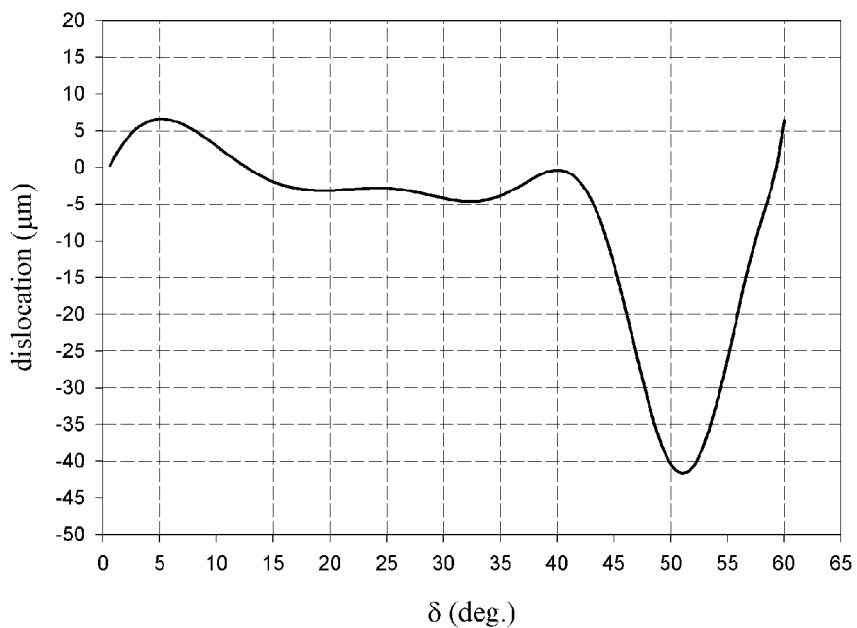
[Fig. 44]
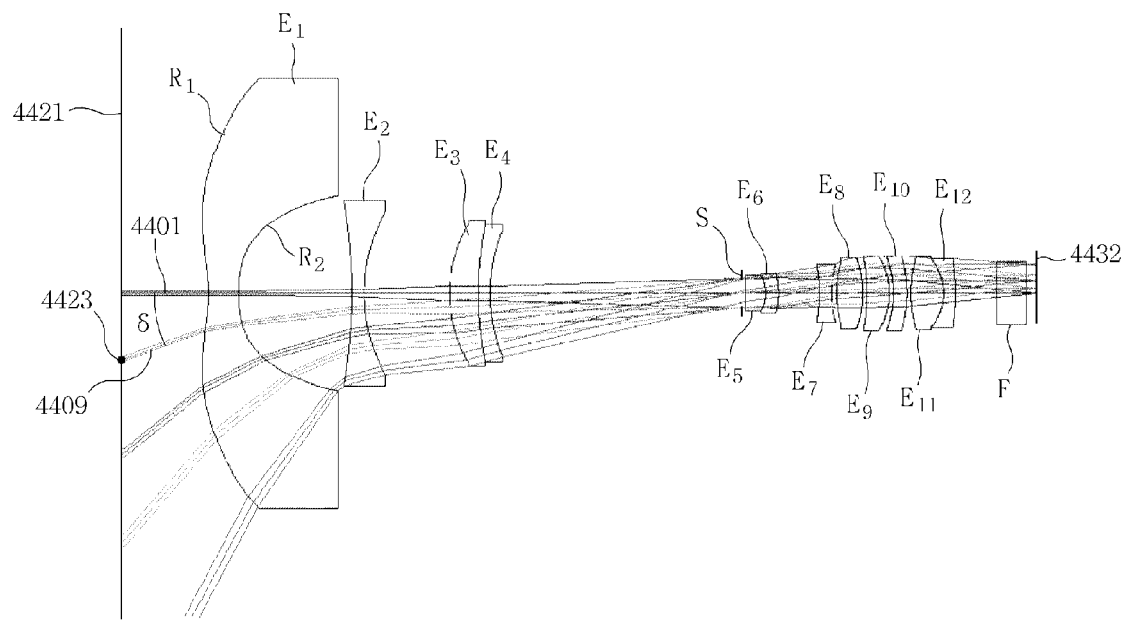

[Fig. 45]
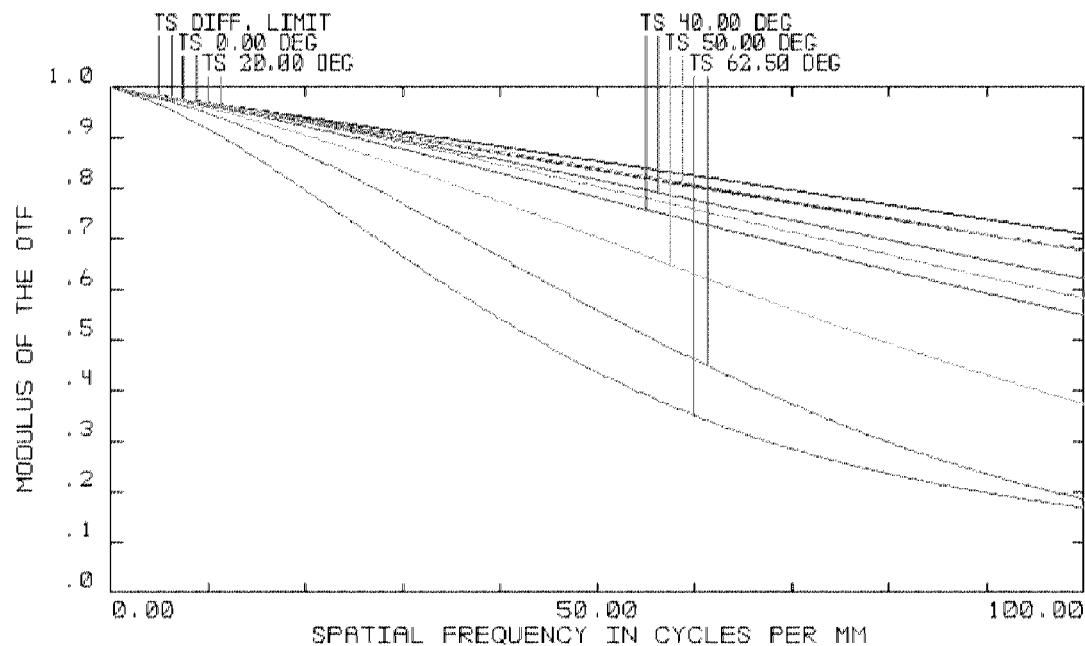
[Fig. 46]
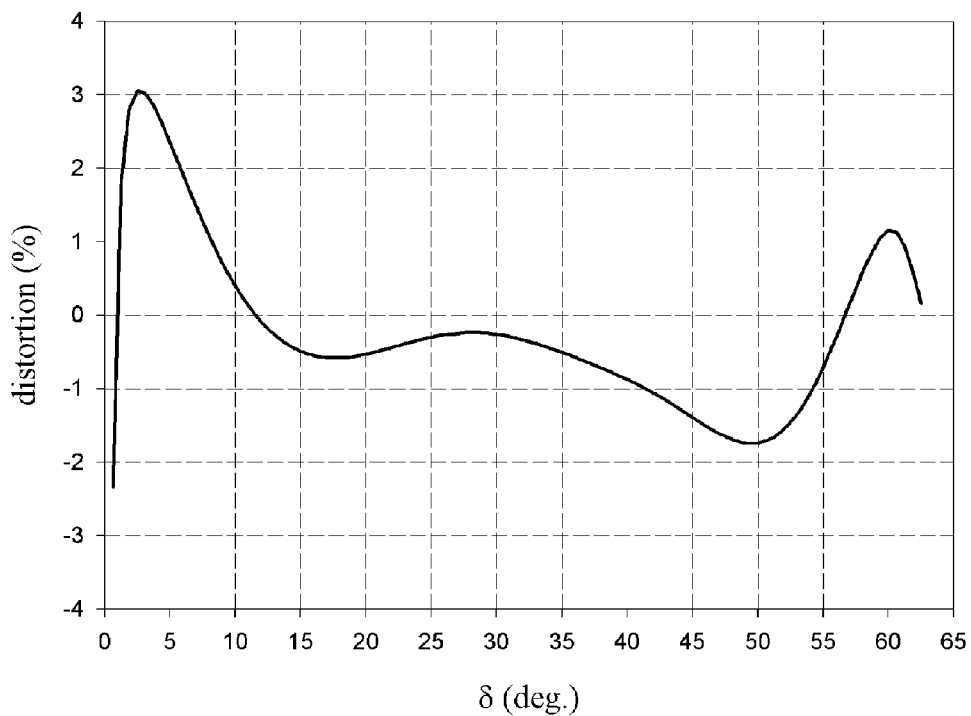

[Fig. 47]
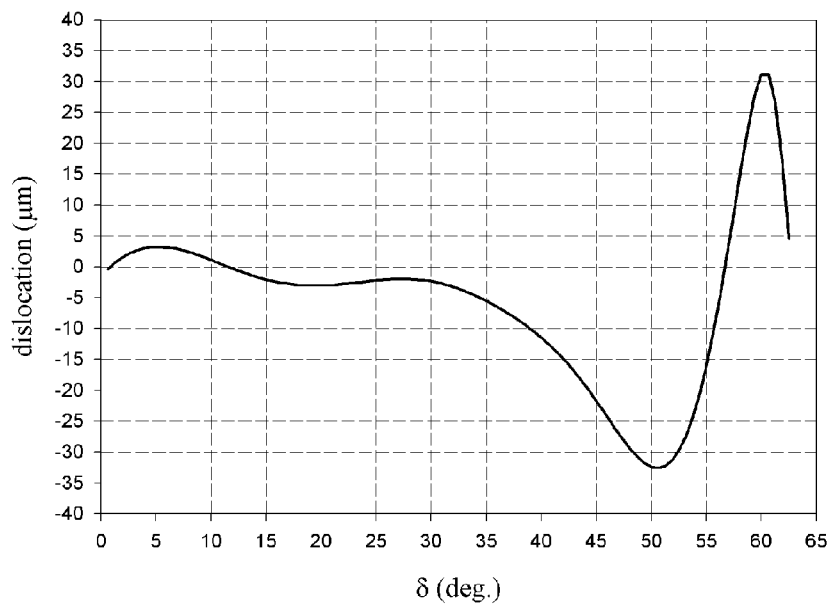
[Fig. 48]
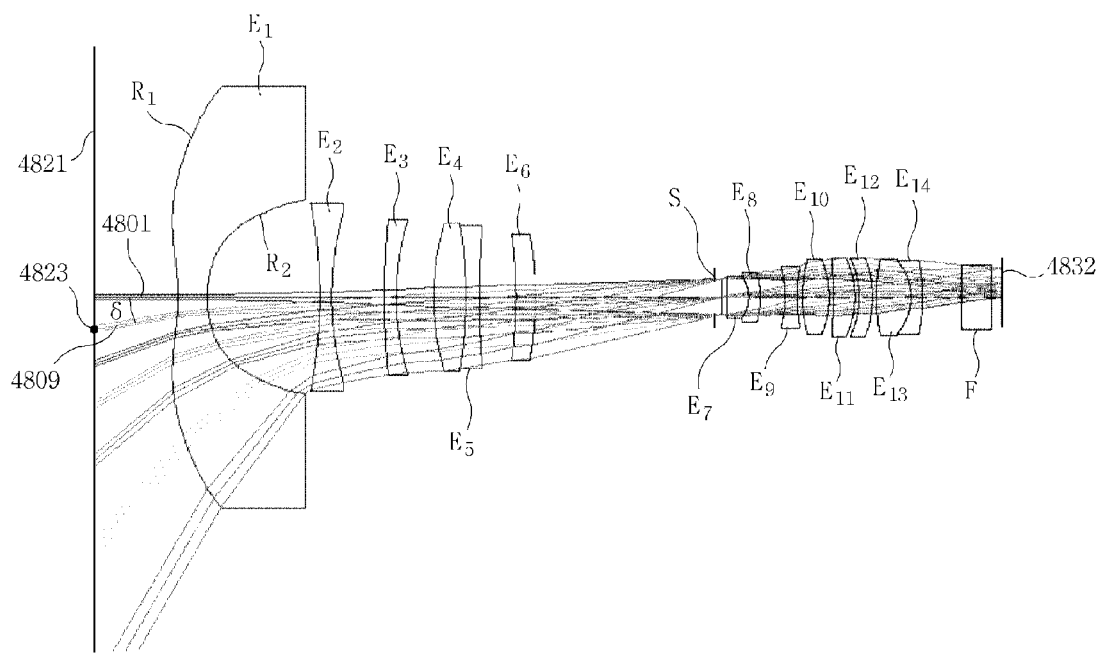

[Fig. 49]
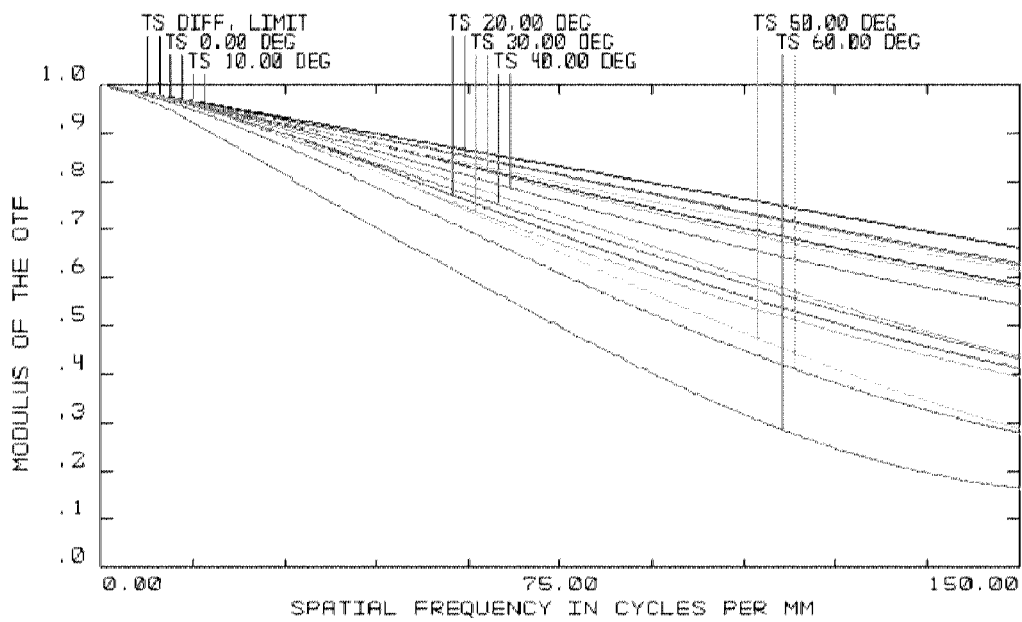
[Fig. 50]
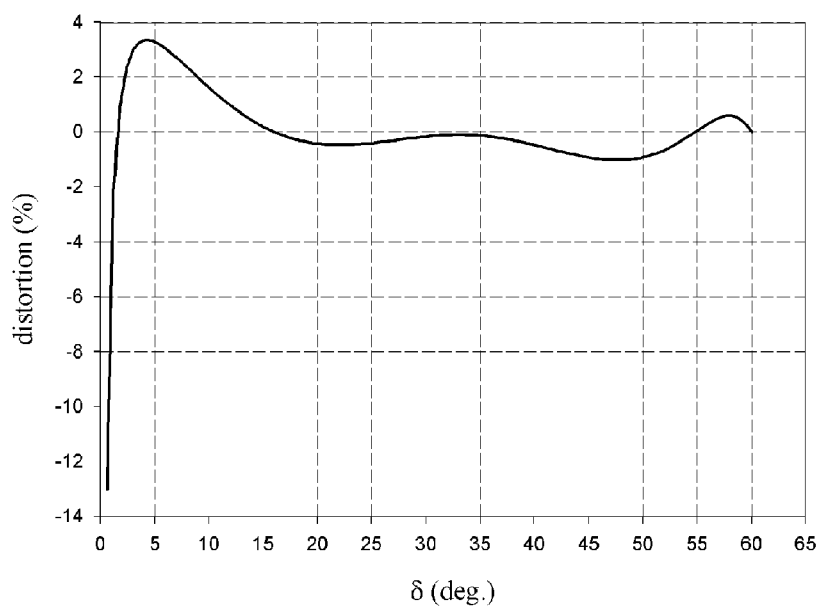

[Fig. 51]
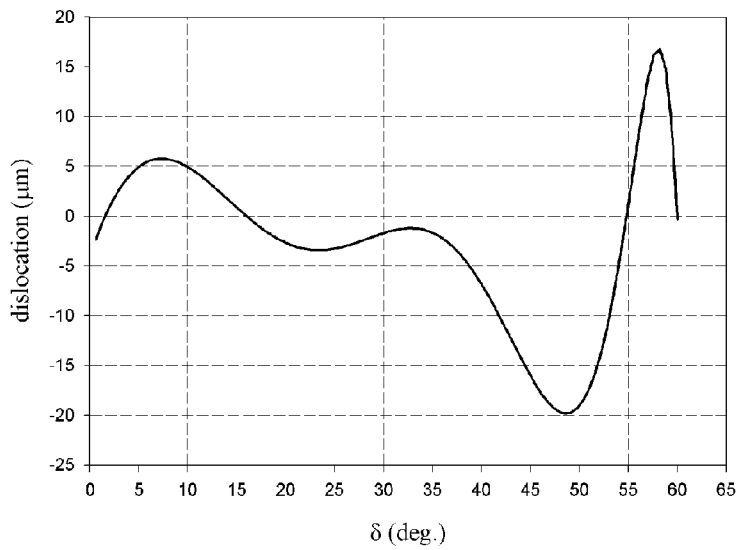
[Fig. 52]
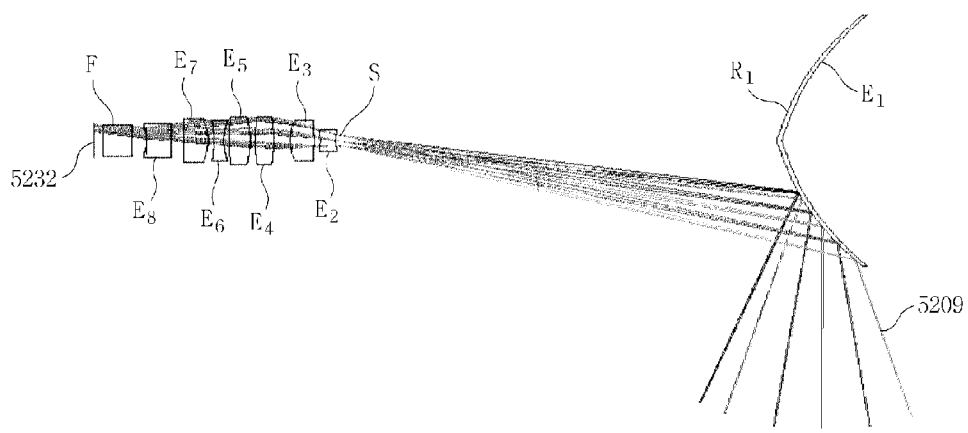
[Fig. 53]
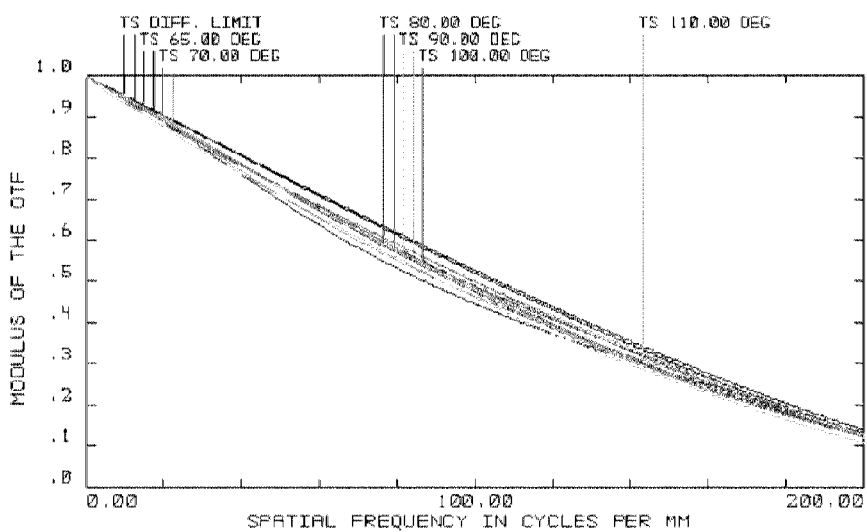

[Fig. 54]
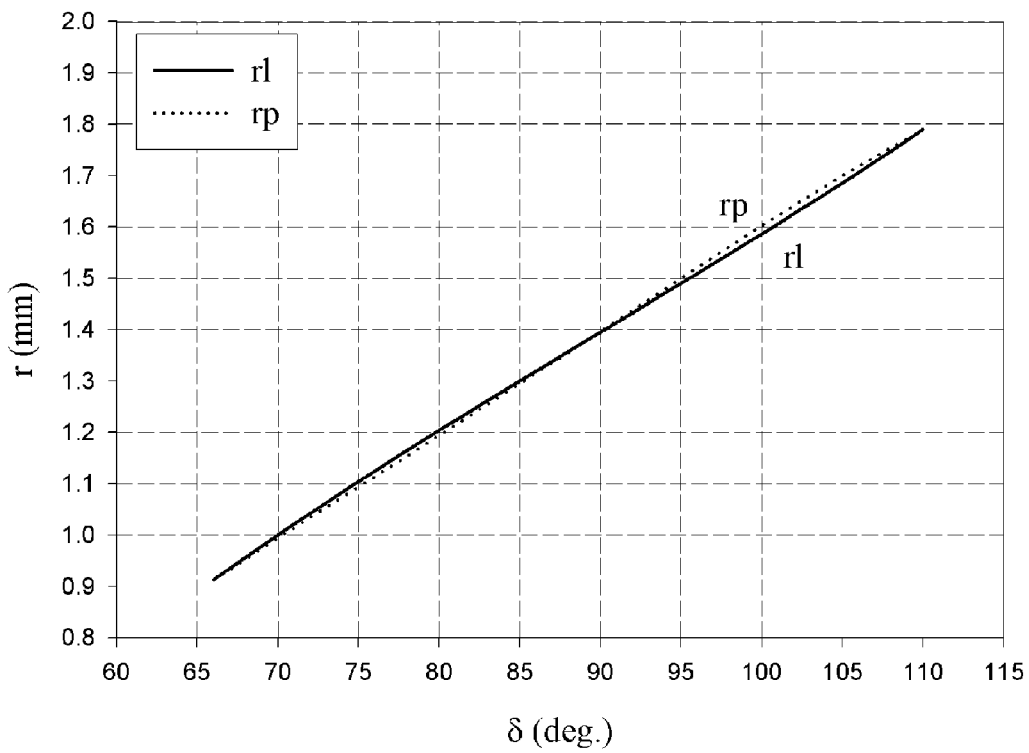
[Fig. 55]
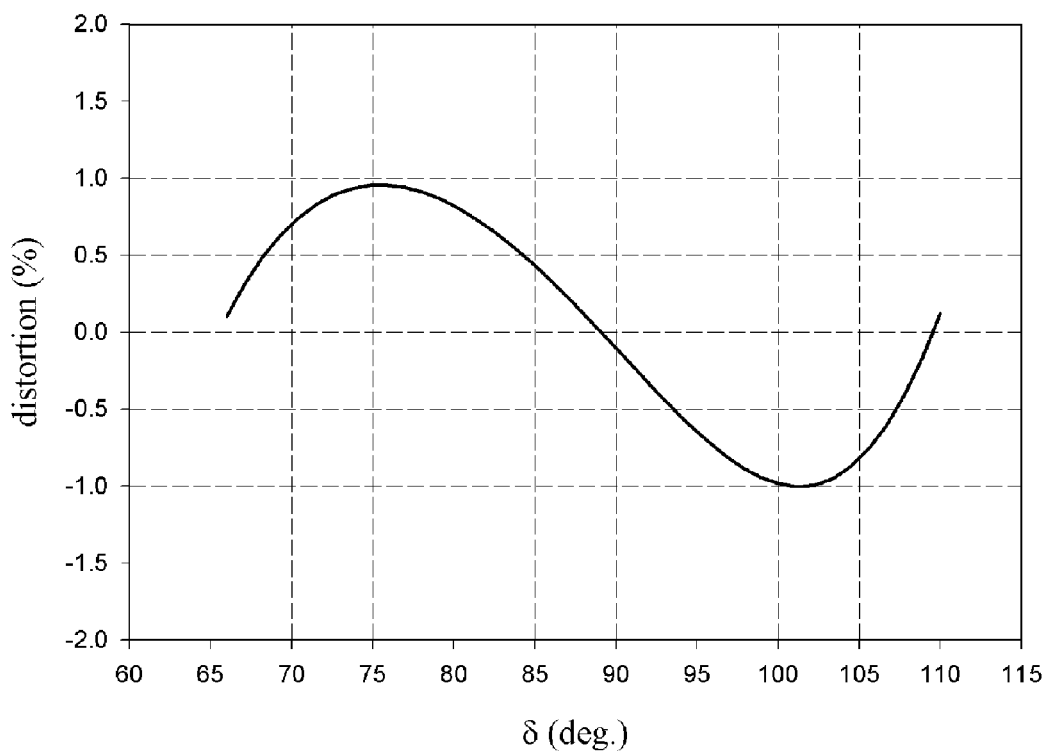

[Fig. 56]
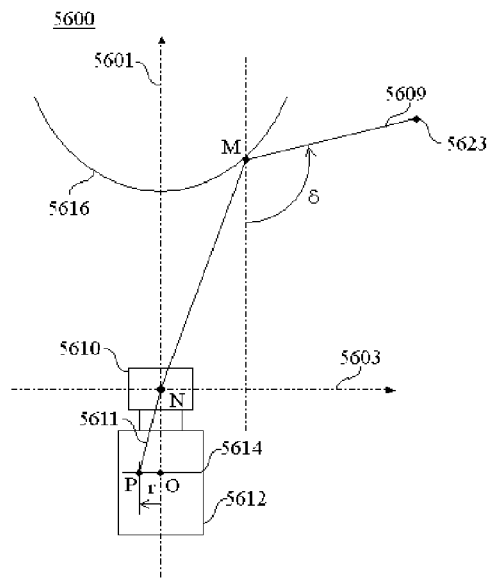
[Fig. 57]
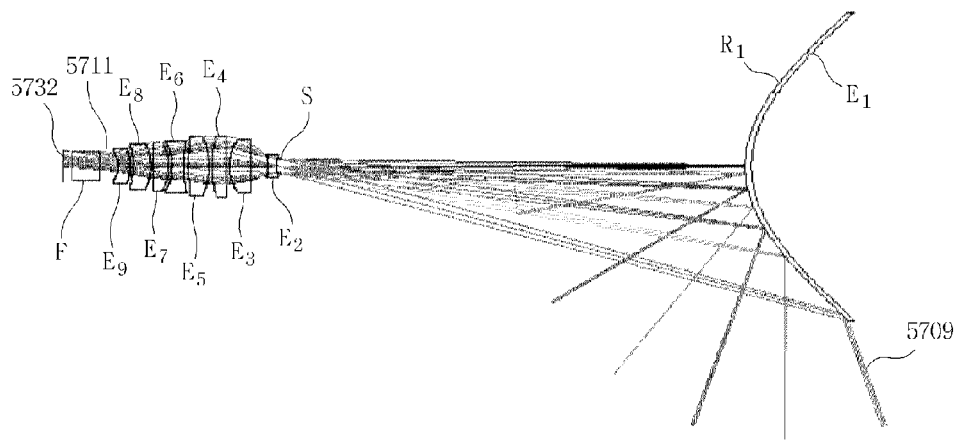
[Fig. 58]
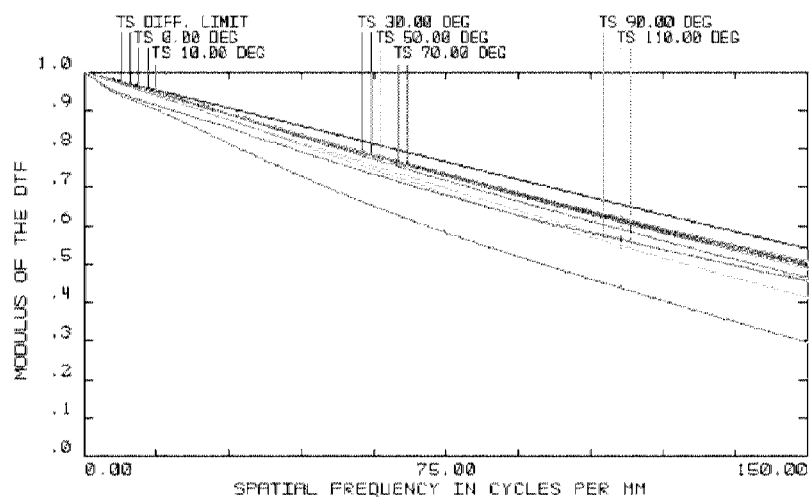

[Fig. 59]
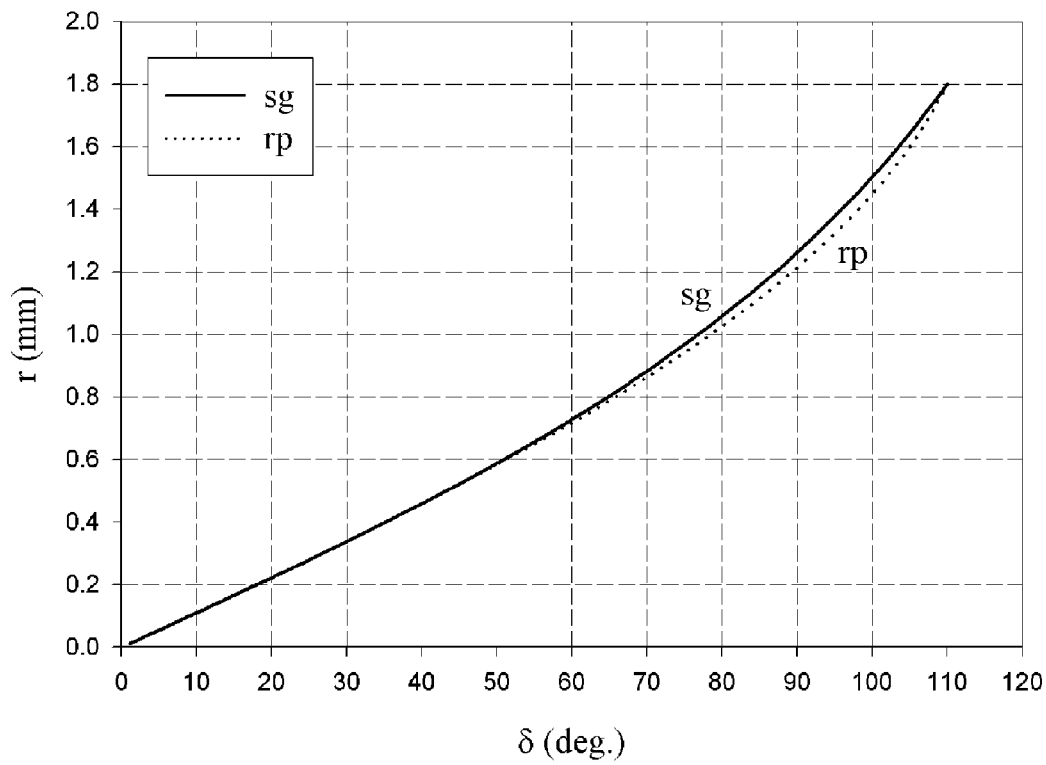
[Fig. 60]
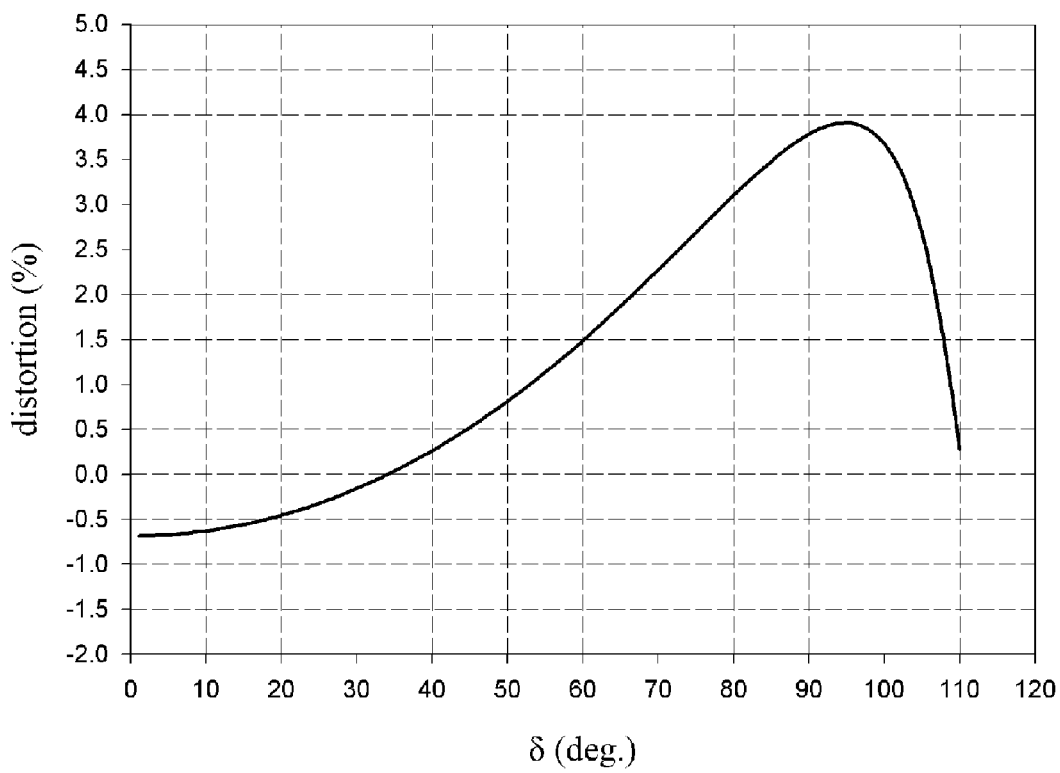

[Fig. 61]
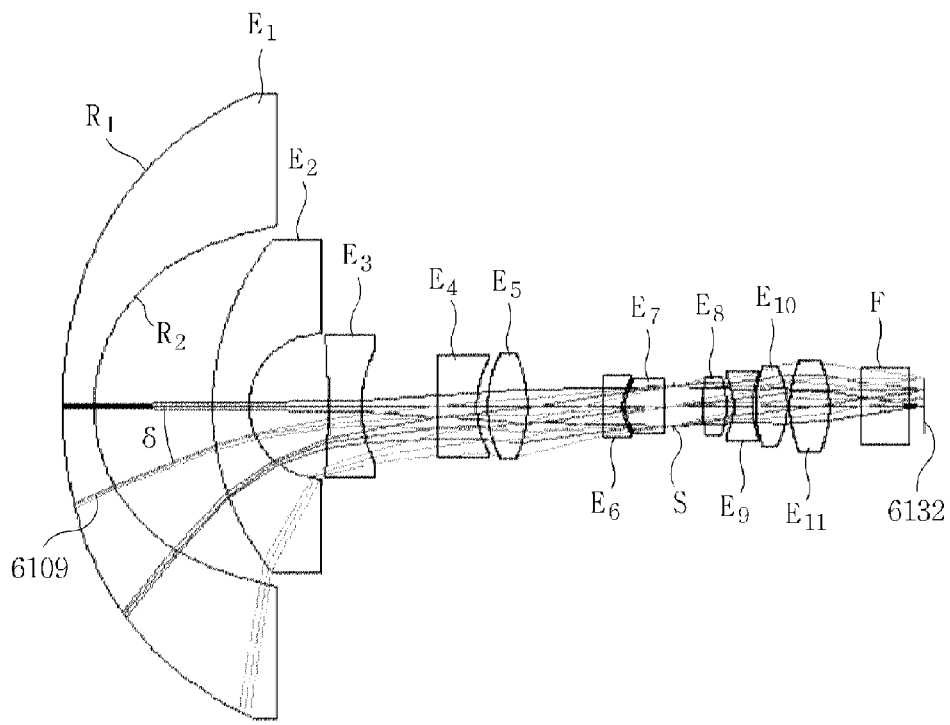
[Fig. 62]
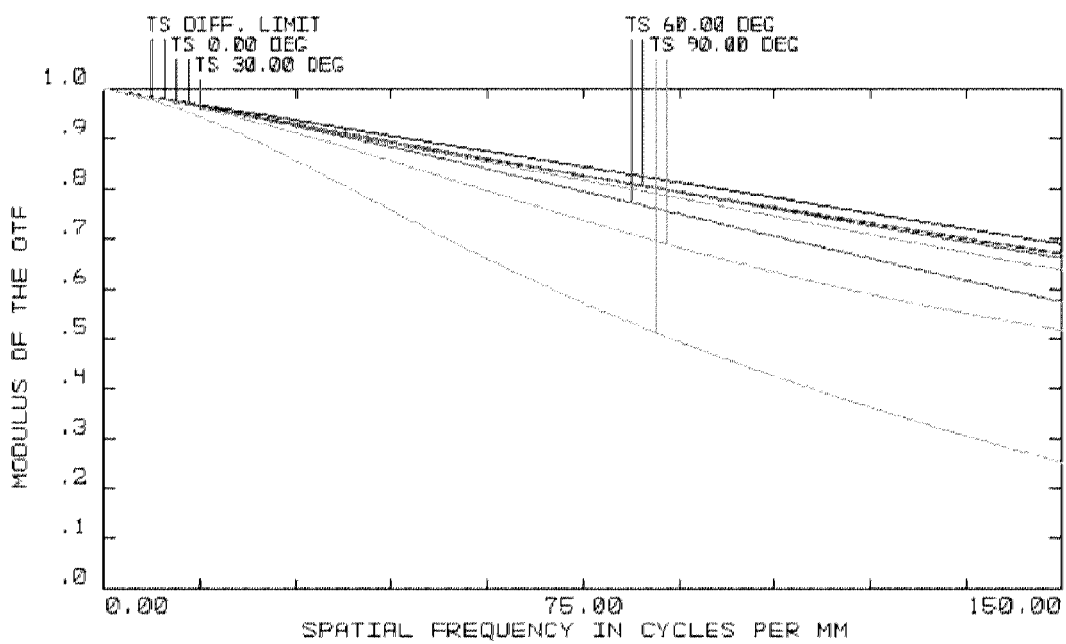

[Fig. 63]
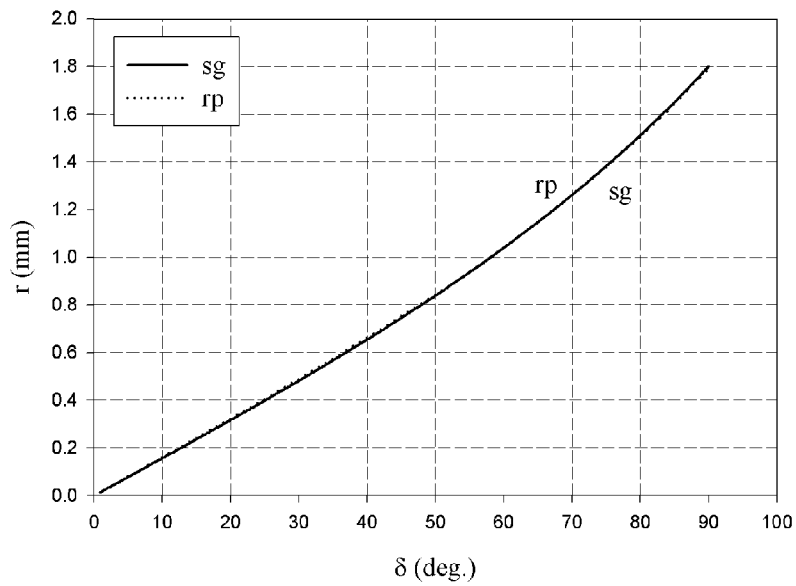
[Fig. 64]
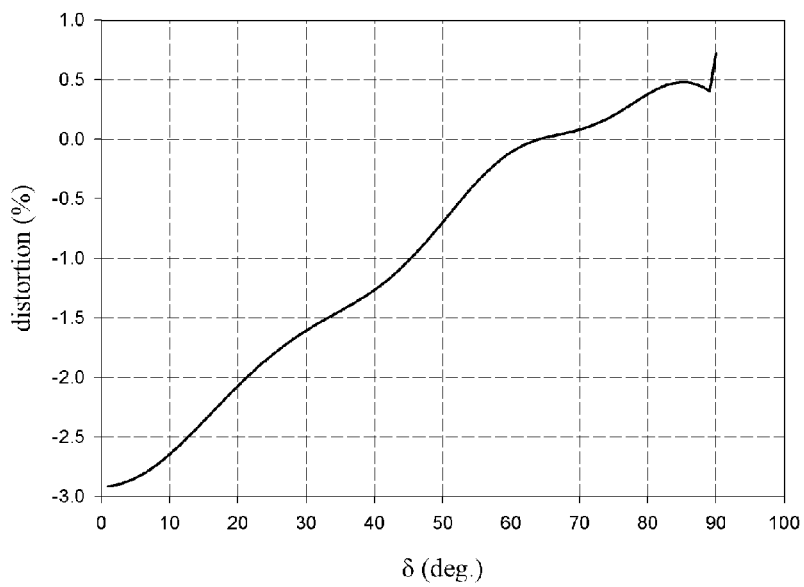
[Fig. 65]
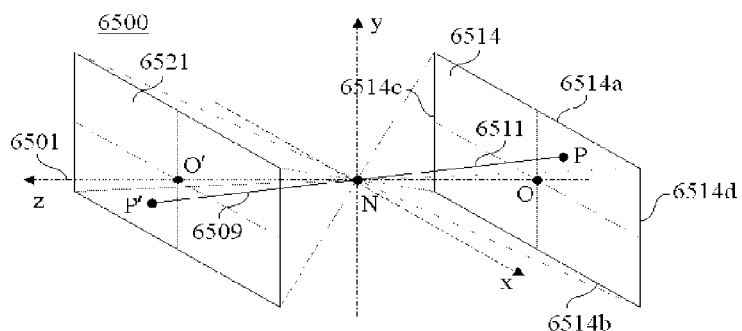

[Fig. 66]
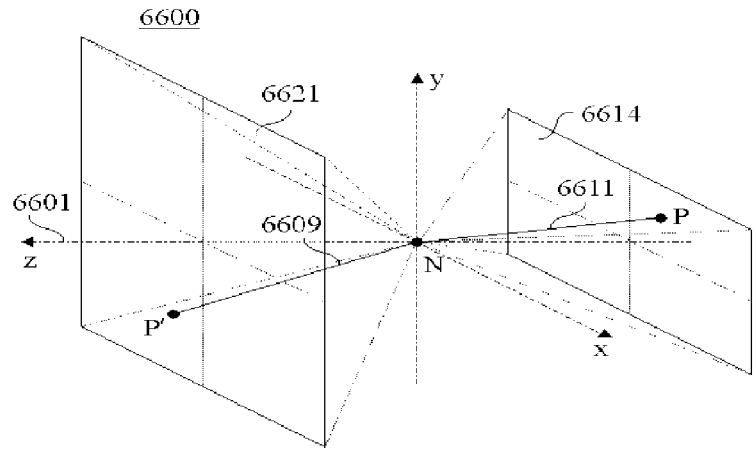
[Fig. 67]
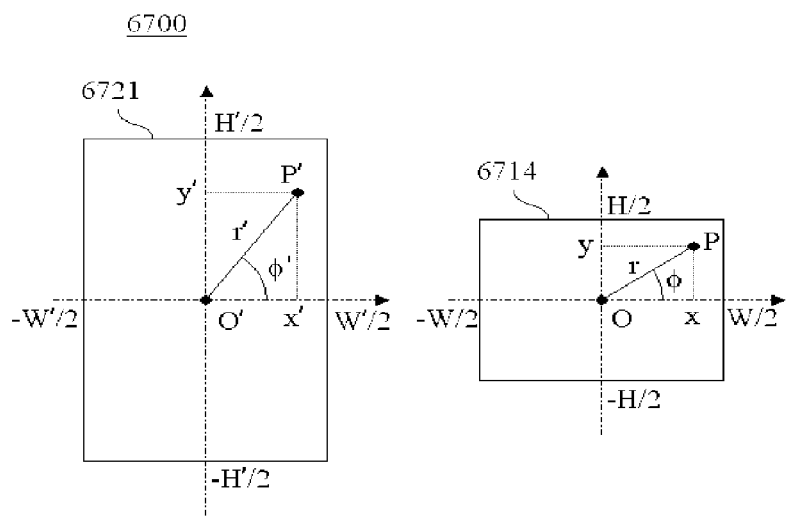
[Fig. 68]
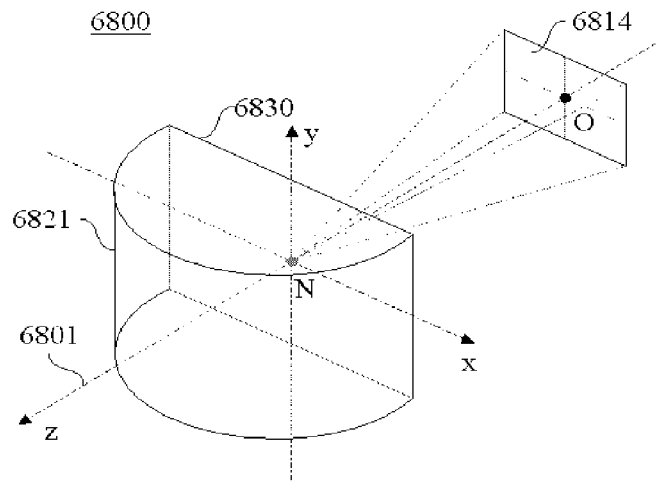

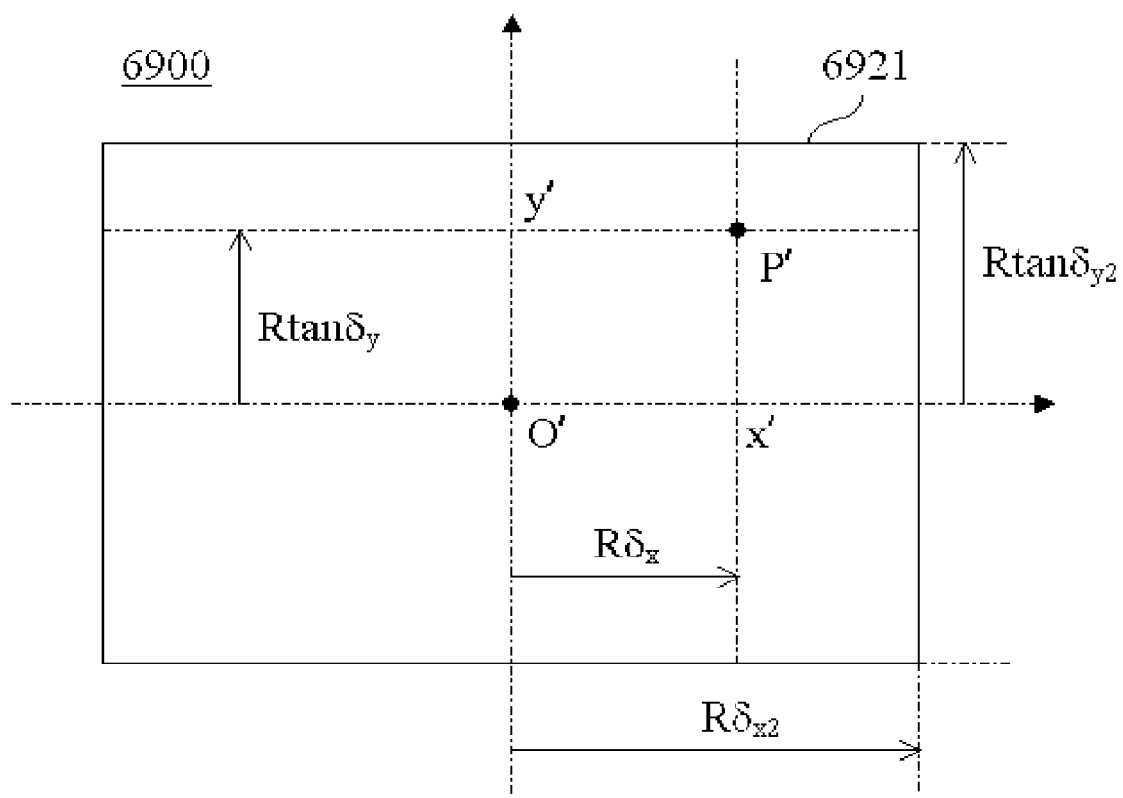
[Fig. 69]

WIDE-ANGLE LENSES

TECHNICAL FIELD

The present invention relates to a lens having a specific projection scheme, and more specifically, an object of the present invention is to provide an imaging lens having at least one lens element and a stop and implements a specific projection scheme so that the imaging lens provides a superb image most satisfying for the particular application purpose of the image acquisition.

BACKGROUND ART

FIG. 1 is a schematic diagram illustrating the relationship between the incidence angle δ of an incident ray 109 and the exit angle θ of an exit ray 111 in accordance with a projection scheme which is useful in an imaging optical system such as a camera. The camera comprises a lens 110 and a camera body 112 having an image sensor therein. The lens 110 is assumed to be rotationally symmetric about an optical axis 101. In an ideal camera model, the lens is considered as a pinhole. The nodal point N of the lens is the point corresponding to the position of the pinhole. The incident ray 109 which is originated from a point 123 of an object (hereinafter, referred to as an object point) enters into the lens and then the imaging lens forms an image point P on an image plane 132 which is a portion of the focal plane of the lens. The focal plane is a plane perpendicular to the optical axis 101. In order to obtain a sharp image in good focus, the image sensor plane 114 of the camera image sensor should be coincident with the focal plane, and the image plane is a sub-region of the focal plane wherein the actual image points have been formed from the exit rays. Hereinafter, it will be assumed that the focal plane is always coincident with the image sensor plane.

If the distance d from the lens to the object point is sufficiently large, then the incident ray 109 may be considered as a parallel beam, and the distance from the nodal point N of the lens to the focal plane is substantially identical to the effective focal length f of the lens. The whole bundle of exit rays which pass through the lens and form image points on the image plane are considered to pass through the nodal point N of the lens 110 in the camera. For simplicity of notation, the ray 109 before passing through the nodal point is referred to as the incident ray, while the ray 111 after passing through the nodal point is referred to as the exit ray. For a rotationally symmetric lens, the object point 123, the incident ray 109, the nodal point N, the exit ray 111, the image point P and the optical axis 101 are all contained in a same plane. Such a plane is referred to as the incidence plane.

When an imaging system is said to be distortion-free, then the lens employed in the imaging system follows a rectilinear projection scheme. In a rectilinear projection scheme, an object point is considered to lie on a plane (hereinafter, referred to as an object plane 121). The object plane is perpendicular to the optical axis 101, and the distance from the nodal point N of the camera to the object plane measured along the optical axis is d, and the lens 110 causes the image of the object point 123 to be formed as an image point P on the focal plane. Both the object plane 121 and the focal plane 132 are planes which are perpendicular to the optical axis.

For simplicity of notation, a rectangular coordinate system having the optical axis 101 as the z-axis is used, and the coordinate origin coincides with the nodal point N. In that case, the rectangular coordinate of an object point is given as (x', y', d), while the rectangular coordinate of an image point is given as (x, y, −f). Further, the distance r (hereinafter, referred to as an image height) from the intersection point O between the image plane (i.e., the focal plane) and the optical axis 101 to the image point P on which the exit ray 111 is captured is given by Equation 1 as follows:

$$r=\sqrt{x^2+y^2}$$ MathFigure 1

If the nadir angle of the exit ray with respect to the optical axis 101 of the camera is referred to as θ, then the image height r is given by Equation 2 as follows:

$$r = f \tan\theta$$ MathFigure 2

In the present invention, the zenith angle is an angle measured from the positive z-axis toward the negative z-axis, while the nadir angle is an angle measured from the negative z-axis toward the positive z-axis. For example, the zenith angle of the incident ray 109 is δ, while the nadir angle thereof is 180°−δ. Further, the nadir angle of the exit ray 111 is θ while the zenith angle thereof is 180°−θ. By definition, the sum of the zenith angle and the nadir angle is 180°. The incidence angle or the exit angle of the present invention may be measured by the zenith angle or by the nadir angle, and whether it is measured by the zenith angle or the nadir angle must be clear from the accompanying drawings.

The distance L (hereinafter, referred to as an object height) from the optical axis to the object point is given by Equation 3 as follows:

$$L=\sqrt{(x')^2+(y')^2}$$ MathFigure 3

If the incidence angle of the incident ray 109 with respect to the optical axis 101 is δ, then the incidence angle δ and the object height L satisfies the relation given in Equation 4 as follows:

$$L = d \tan\delta$$ MathFigure 4

In a conventional rectilinear projection scheme, the tangent of the incidence angle of the incident ray is proportional to that of the exit angle of the exit ray as in Equation 5, $$\tan\theta = c_{rl} \tan\delta$$ MathFigure 5 where $c_{rl}$ is proportionality constant. Such a projection scheme has well been known for a long time and is described in detail in References 1 and 2. If the incidence angle of an incident ray for such an optical system ranges from δ=0 to δ=δ₂ and the exit angle of an exit ray ranges from θ=0 to θ=θ₂, then the following relationship is obtained from Equation 5.

$$\tan\theta_2 = c_{rl} \tan\delta_2$$ MathFigure 6

The proportionality constant $c_{rl}$ can be uniquely determined from Equation 6, and therefore the incidence angle δ of an incident ray for a rectilinear projection scheme is given as a function of the exit angle θ of an exit ray as in Equation 7.

$$\delta(\theta) = \tan^{-1}\left[\frac{\tan\delta_2}{\tan\theta_2}\tan\theta\right]$$ MathFigure 7

If a lens implementing the rectilinear projection scheme as described above is used, then the image of the object on the object plane 121 is faithfully reproduced on the focal plane. The image height r divided by the object height L is referred to as a magnification M of the lens. The magnification is given by Equation 8 from Equations 2 and 4 as follows:

$$M = \frac{r}{L} = \frac{f\tan\theta}{d\tan\delta} = c_{r1}\left(\frac{f}{d}\right)$$ MathFigure 8

Since $c_{r1}$ is a constant, the magnification depends only on the object distance d and the focal length f of the lens, and therefore, the respective portions of the object on the object plane 121 are reproduced on the image sensor plane 114 with their correct ratios maintained. That is, the image captured by a lens implementing a rectilinear projection scheme is an undistorted image. The rectilinear projection scheme is a projection scheme which is satisfied or at least aimed at to be satisfied by most lenses and considered as the most natural projection scheme.

The incidence angle $\delta$ of an incident ray in a rectilinear projection scheme cannot be larger than 90°. However, the incidence angle $\delta$ of an incident ray in some application needs to be equal to or even larger than 90°, and therefore, projection schemes other than the rectilinear projection scheme are required in such a case. An equidistance projection scheme is the most widely known projection scheme among these projection schemes. In the equidistance projection scheme, it is assumed that an object point exists on a large spherical surface 131 surrounding the camera, so that the incidence angle $\delta$ of an incident ray and the tangent of the exit angle $\theta$ of an exit ray is proportional to each other as in Equation 9, $$\tan\theta = c_{ed}\delta$$ MathFigure 9 where $c_{ed}$ is another proportionality constant. Considering the range of the incidence angle and the range of the exit angle as described in the rectilinear projection scheme, the incidence angle is given as a function of the exit angle as in Equation 10.

$$\delta(\theta) = \left(\frac{\delta_2}{\tan\theta_2}\right)\tan\theta$$ MathFigure 10

Although the exit angle $\theta$ in an equidistance projection scheme cannot be not larger than 90°, there is no limit to the incidence angle $\delta$ of an incident ray. Accordingly, the object point 133 on the spherical surface 131 from which the incident ray 109 is originated may lie even behind the camera. A high-end fisheye lens implements the equidistance projection scheme in a relatively faithful manner, and therefore, how small an error is between the equidistance projection scheme and the projection scheme of the actual lens is used as an important index for measuring the performance of the fisheye lens.

In a stereographic projection scheme, which is similar to an equidistance projection scheme, the incidence angle $\delta$ of an incident ray and the exit angle $\theta$ of an exit ray satisfies the relationship as given in Equation 11.

$$\tan\theta = c_{sg}\tan\frac{\delta}{2}$$ MathFigure 11

Considering the range of the incidence angle and the range of the exit angle, the incidence angle is given as a function of the exit angle as in Equation 12.

$$\delta(\theta) = 2\tan^{-1}\left[\frac{\tan\frac{\delta_2}{2}}{\tan\theta_2}\tan\theta\right]$$ MathFigure 12

Among the projection schemes wherein the field of view (FOV) can be equal to or larger than 180° such as those of fisheye lenses, the stereographic projection scheme is considered as the most natural projection scheme. For example, if a camera provided with a fisheye lens implementing a stereographic projection scheme is aimed toward the zenith to take a photograph of the whole sky, a circular object such as the sun always appears as a circle regardless of the image position on the screen. However, in an equidistance projection scheme, a circle may be shown as an ellipse depending on the position on the screen.

The following Equation 13 shows the relationship between the incidence angle $\delta$ of an incident ray and the exit angle $\theta$ of an exit ray in an orthographic projection scheme.

$$\tan\theta = c_{og}\sin\delta$$ MathFigure 13

Similar to the previous examples, the incidence angle is given as a function of the exit angle as in Equation 14.

$$\delta(\theta) = \sin^{-1}\left[\frac{\sin\delta_2}{\tan\theta_2}\tan\theta\right]$$ MathFigure 14

FIG. 2 is a graph wherein the four different projection schemes used in conventional imaging systems, i.e., a rectilinear projection scheme rl, an equidistance projection scheme ed, a stereographic projection scheme sg and an orthographic projection scheme og are compared to each other. In FIG. 2, the proportionality constants are selected so that the incidence angle is equal to the exit angle (i.e., $\theta = \delta$) when they are small. Specifically, they are given as $c_{rl} = c_{ed} = c_{og} = 1.0$ and $c_{sg} = 2.0$. Meanwhile, FIG. 3 is a graph showing the four different projection schemes wherein the common range of the exit angle $\theta$ is from 0° to 30° and the common range of the incidence angle $\delta$ is from 0° to 60°. Reference 3 provides examples of aspheric lens shapes precisely implementing the projection schemes as described above.

The projection schemes given by Equations 1 through 14 define the ranges of the incidence angle and the exit angle, and the functional relationship between these two variables. However, the effective focal length or equivalently the refractive power is often considered as one of the most important features of a lens. The refractive power is defined by the reciprocal of the effective focal length. The effective focal length of a lens is often the feature which is given the first priority when designing an imaging lens. Accordingly, projection schemes directly reflecting the effective focal length of the lens may be preferred in certain circumstances. Projection schemes directly including the effective focal length are described in Reference 4. According to Reference 4, given the effective focal length f, a rectilinear projection scheme is given by Equation 15 as follows:

$$r = f\tan\delta$$ MathFigure 15

Hereinafter, the projection scheme given by Equation 5 is referred to as a first type of rectilinear projection scheme while the projection scheme given by Equation 15 is referred to as a second type of rectilinear projection scheme.

Meanwhile, a second type of stereographic projection scheme is given by Equation 16 as follows:

$$r = 2f\tan\frac{\delta}{2} \qquad \text{MathFigure 16}$$

A second type of equidistance projection scheme is given by Equation 17 as follows:

$$r = f\delta \qquad \text{MathFigure 17}$$

Meanwhile, a second type of orthographic projection scheme is given by Equation 18 as follows:

$$r = 2f\sin\frac{\delta}{2} \qquad \text{MathFigure 18}$$

Using Equation 2, Equation 15 may be given as follows:

$$r = f\tan\theta = f\tan\delta \qquad \text{MathFigure 19}$$

If f is eliminated from Equation 19, it may be seen that the incidence angle $\delta$ is identical to the exit angle $\theta$ as in Equation 20.

$$\theta = \delta \qquad \text{MathFigure 20}$$

Accordingly, if Equation 2 is valid, then the second type of rectilinear projection scheme given by Equation 15 may be considered as a particular example of the first type of rectilinear projection scheme given by Equation 5 (i.e., $c_{rl}=1.0$).

An optical layout of a fisheye lens with the field of view of 180° is given in Reference 4, and the lens design data is given in Reference 5. FIG. 4 is a diagram showing the optical layout and the ray traces for the fisheye lens according to the optical design data given in Reference 5, wherein the effective focal length of the lens is 100.0286 mm. This lens is composed of a first lens element $E_1$ through a ninth lens element $E_9$, a color filter F, and a stop S. The lens is located between an object plane 421 and a focal plane 432. The first lens element $E_1$ is a lens element which an incident ray 409 originating from an object point 423 on the object plane first encounters when it enters into the lens, and the first lens element $E_1$ has a first lens surface $R_1$ which is a refractive surface facing the object plane (i.e., on the object side) and a second lens surface $R_2$ which is another refractive surface facing the image plane (i.e., on the image side). A lens surface according to the present invention is a single surface in a lens element having a refractive power, and may be a refractive surface as described in this example or alternatively a reflective surface. In other words, a lens surface is a concept encompassing a refractive surface and a reflective surface.

Similarly, the second lens element $E_2$ is located directly behind the first lens element, and is a refractive lens element having a third lens surface $R_3$ which is a refractive surface on the object side and a fourth lens surface $R_4$ which is another refractive surface on the image side. In similar manners, each of the other lens elements has two refractive lens surfaces. The filter F is located between the fourth lens element $E_4$ and the stop S and has no refractive power. The incidence angle $\delta$ of an incident ray 409 originating from an object point is measured as a zenith angle, wherein the z-axis coincides with the optical axis. Also, the exit angle $\theta$ of the corresponding exit ray 411 is measured as a nadir angle, and the image height is designated as $r_{rp}$.

As described above, most of the fisheye lenses are designed in accordance with an equidistance projection scheme.

Shown in FIG. 5 are the ideal image heights $r_{ed}$ on the focal plane of this fisheye lens determined by the equidistance projection scheme and the effective focal length and the real image height $r_{rp}$ as a function of the incidence angle $\delta$ of an incident ray 409. The ideal image height $r_{ed}$ is given by Equation 17 and drawn as a solid line in FIG. 5. When a complete optical design data is available, the real image height $r_{rp}$ ($\delta$) on the focal plane corresponding to a given incidence angle $\delta$ of an incident ray may be calculated using an operator such as 'REAY' in professional lens design program 'Zemax'. The real projection scheme of a lens in the present invention represents a theoretical projection scheme obtained by the method as described above, and has an advantage in that the projection scheme is obtained in a much simpler and more precise way than empirically obtaining from an experiment with a real lens. It can be seen from FIG. 5 that the real image height rp of the lens represented by a dotted line is not substantially different from the ideal image height ed represented by a solid line. FIG. 6 shows the distortion as a percentage error between the ideal image height and the real image height defined by Equation 21.

$$\text{distortion}(\delta) = \frac{r_{ed}(\delta) - r_{rp}(\delta)}{r_{ed}(\delta)} \times 100\% \qquad \text{MathFigure 21}$$

It can be seen from FIG. 6 that this particular fisheye lens is excellent in that the error between the real projection scheme and the ideal projection scheme is less than 4%.

Meanwhile, the projection scheme of this lens may be compared to the first type of equidistance projection scheme represented by Equation 10. However, since the exit angle $\theta$ rather than the incidence angle $\delta$ is the independent variable, Equation 10 needs to be converted into Equation 22 in which the incidence angle $\delta$ is used as the independent variable in order to be compared with Equation 17.

$$\tan\theta = \left(\frac{\tan\theta_2}{\delta_2}\right)\delta \qquad \text{MathFigure 22}$$

FIG. 7 shows the ideal image height ed from the first type of equidistance projection scheme given by Equation 22 and the real projection scheme rp, and FIG. 8 shows a percentage error given by Equation 23:

$$\text{distortion}(\delta) = \frac{\tan\theta_{ed}(\delta) - \tan\theta_{rp}(\delta)}{\tan\theta_{ed}(\delta)} \times 100\% \qquad \text{MathFigure 23}$$

It can be seen that the maximum distortion is less than 4% in FIG. 6, while the maximum distortion is more than 8% in FIG. 8. Accordingly, it can be seen that this fisheye lens relatively faithfully implements the second type of equidistance projection scheme given in Equation 17, while it largely differs from the first type of equidistance projection scheme given in Equation 10 or its equivalent Equation 22. As shown above, it can be appreciated that the two equidistance projection schemes respectively given by Equations 10 and 17 are substantially different from each other.

FIG. 9 shows an optical layout and ray traces for a prior art of catadioptric wide-angle lens described in Reference 6. This lens has the field of view of 151.8°, a distortion less than 1%, and an effective focal length f of 0.752 mm. This lens is comprised of seven lens elements, wherein the first lens surface of the first lens element $E_1$ is an aspheric mirror surface, while the second lens element $E_2$ through the seventh lens element $E_7$ are refractive lens elements with both lens surfaces being spherical surfaces. The stop S is located between the first lens element $E_1$ and the second lens element $E_2$, and an optical low pass filter F is located between the seventh lens element $E_7$ and the focal plane 932. The optical low pass filter F is not a constitutional element of the lens but a constitutional element of the camera and is covered over the image sensor plane of the camera image sensor. As previously mentioned, the image sensor plane is considered as coincident with the focal plane. The optical low pass filter serves to remove a moire effect from the image. FIG. 9 indicates that the lens has been designed with a due consideration for the optical low pass filter.

FIG. 10 is a graph showing how faithfully the second type of the rectilinear projection scheme given by Equation 15 is implemented by this catadioptric wide-angle lens, wherein a solid line represents the ideal projection scheme given by Equation 15 and a dotted line represents the projection scheme of a real lens. As shown in FIG. 10, there is no substantial difference between the two projection schemes. FIG. 11 shows the percentage error calculated using Equation 21, and it can be appreciated that the maximum error is less than 1%, and this catadioptric wide-angle lens is practically distortion-free. Meanwhile, as given in Equation 24, the first type of the rectilinear projection scheme given by Equation 7 can be given as a function having the incidence angle as the independent variable.

$$\tan\theta = \frac{\tan\theta_2}{\tan\delta_2}\tan\delta \qquad \text{MathFigure 24}$$

FIG. 12 is a graph comparing the first type of the rectilinear projection scheme rl given by Equation 24 with the real projection scheme rp, and FIG. 13 shows the percentage error calculated in the same manner as in Equation 23. From FIG. 13, it can be seen that the maximum distortion is as much as 70%. Accordingly, although the catadioptric wide-angle lens shown in FIG. 9 faithfully implements the second type of the rectilinear projection scheme given by Equation 15, the error between the real projection scheme and the first type of the rectilinear projection scheme given by Equation 7 is so large that comparing the two projection scheme appears meaningless.

FIG. 14 is a graph clarifying the reason why the difference between the two rectilinear projection schemes is so large that they appear totally unrelated to each other. If the assumption given in Equation 2 is valid, the relation given by Equation 19 should be satisfied. However, from a real projection scheme derived from a lens design data sufficiently in detail for ready manufacturing, it can be seen that f tan δ and f tan θ are vastly different from each other. The relation given in Equation 2 has been considered as a golden rule in the field of geometrical optics and computer science, and the notions of a nodal point and an effective focal length constitute a theoretical background. Since, however, these concepts are valid only within the approximation of paraxial ray tracing, they can be safely applied to an imaging system where the maximum incidence angle is relatively small. Therefore, it is not legitimate to apply these concepts to an ultra wide-angle lens where the maximum incidence angle is relatively large.

In other words, the assumption of Equation 2 is relatively well satisfied by an image formed by a single thin lens element such as a magnifying glass. As a result, the first type of projection scheme and the second type of projection scheme are compatible to each other. However, even in such a case, the assumption of Equation 2 is no more than an approximate relation satisfied within the limit of paraxial ray tracing and it is not a mathematically exact equation. In addition, since the modern advanced optical lens has many lens elements and the field of view is getting ever wider, the assumption of paraxial ray tracing is no more valid. Further, an imaging system using an optoelectronic image sensor such as CCD, CMOS, or the like requires that the exit angles of the exit rays with respect to the optical axis be relatively small. Accordingly, most of the currently designed and manufactured lenses are image-side telecentric lenses, and regardless of the incidence angles, the corresponding exit angles are nearly 0°. Therefore, a lens which does not satisfy Equation 2 is actually preferable, and a pinhole camera is the only imaging system which literally satisfies the Equation 2.

For such a reason, a lens satisfying the first type of projection scheme and a lens satisfying the second type of projection scheme are substantially different from each other, and especially, designing the two types of lenses result in completely different constraints in the merit function. For example, a projection scheme satisfying the Equation 5 defines the range of the incidence angle of the incident ray and the range of the exit angle of the exit ray and the functional relationship between these two variables. Accordingly, if Equation 5 is used as a constraint in a lens design, the effective focal length of the lens becomes a floating variable. Meanwhile, if the Equation 15 is used as a constraint, the effective focal length of the lens becomes a constraint, and according to the assumption of the Equation 2, the maximum incidence angle $\delta_2$ of the incident ray is determined by the maximum image height $r_2$ on the image sensor plane. Therefore, as a matter of fact, it can be seen that Equations 5 and 15 correspond to largely different projection schemes. Similar relations also hold in the equidistance projection scheme, in the stereographic projection scheme, and in the orthographic projection scheme.

FIG. 15 is a schematic view of an object plane 1521 used in a panoramic imaging system described in Reference 7. A panoramic imaging system is a system which captures in a single image all the views seeable from a given spot when one turns around 360° at the standing point. Panorama camera which captures beautiful scenery of every direction in a single photograph is one example of a panoramic imaging system. FIG. 16 is a schematic diagram of an imaginary unwarped (i.e., raw) panoramic image plane 1632 obtained by capturing the scene on the object plane 1521 in FIG. 15 with a panoramic imaging system. The views in all directions, i.e., 360°, are captured within a ring-shaped region between an inner rim 1632a and an outer rim 1632b of the unwarped panoramic image plane 1632.

FIG. 17 is a schematic diagram of a catadioptric panoramic imaging system in which the assumption of Equation 2 is premised. A catadioptric panoramic imaging system 1700 having such a function includes as constituent elements a catadioptric panoramic lens having a panoramic mirror surface 1716 and a refractive lens 1710, and a camera body 1712 having an image sensor plane 1714 included therein. The panoramic mirror surface 1716 and the refractive lens 1710 are rotationally symmetric about an optical axis 1701, and the optical axis 1701 coincides with the z axis of the coordinate system. Characteristic of an optical system having an odd number of reflective lens elements, an exit ray 1711 propagates along the negative z axis. In an ideal camera model, the refractive lens 1710 is considered as a pinhole, and the nodal point N of the refractive lens is the point corresponding to the pinhole.

FIG. 18 is an exemplary view of an unwarped panoramic image plane 1832 captured by such a catadioptric panoramic imaging system. When such a panoramic image plane 1832 is unwrapped with respect to the break line 1832c shown in FIG. 18, an unwrapped panoramic image plane 1932 as shown in FIG. 19 is obtained. In order to obtain an unwrapped panoramic image plane shown in FIG. 19 from a raw panoramic image plane shown in FIG. 18, a software image processing or a hardware image processing may be taken.

As schematically shown in FIG. 17, the object plane 1721 is in a form of a cylindrical wall which is rotationally symmetric about the optical axis 1701. As described above, a panoramic imaging system captures the scene on the cylindrically-shaped object plane 1721 around the camera as a ring-shaped image plane on the image sensor plane 1714 which is coincident with the focal plane. An exit ray 1711 originated from an object point 1723 of an object existing on the object plane and propagating toward an image point on the image sensor plane 1714 of the camera is considered as reflected at a point M on the panoramic mirror surface 1716 and then passes through the nodal point N of the refractive lens 1710. The distance from the nodal point to the image sensor plane 1714 generally agrees with the effective focal length f of the refractive lens 1710. For convenience of illustration, the ray 1709 before being reflected at the panoramic mirror surface is referred to as an incident ray, the ray after being reflected therefrom is referred to as a reflected ray, and the reflected ray after passing thorough the nodal point N of the refractive lens is referred to as the exit ray 1711. According to the assumption of Equation 2, the reflected ray is parallel to the exit ray 1711. The incidence angle δ of an incident ray and the exit angle θ of an exit ray in this example are all measured as nadir angles, and the distance r from the center of the image sensor plane, i.e., the intersection point O between the image sensor plane 1714 and the optical axis 1701, to an image point P on the image sensor plane on which the exit ray 1711 is captured is given by Equation 2 as usual.

If a panoramic lens implementing the rectilinear projection scheme is used, the height of an object point 1723 on the object plane 1721, i.e., the distance measured parallel to the optical axis, is proportional to the image height r, i.e., the distance from the center O of the image sensor plane to the corresponding image point P. It is assumed that the axial radius and the height of a point M on the panoramic mirror surface 1716 at which the incident ray is reflected are ρ and z, respectively, while the axial radius and the height of the object point 1723 are D and H, respectively. Further, let us assume that the elevation angle of the incident ray 1709 is μ. Herein, the elevation angle is an angle measured from the horizontal plane (i.e., the x-y plane) toward the zenith. Then, the height H of the object point is given by Equation 25 as follows:

$$H=z+(D-\rho)\tan\mu \quad\quad \text{MathFigure 25}$$

If the distance from the camera to the object plane is much larger than the size of the camera itself (i.e., D>>ρ, H>>z), Equation 25 may be approximated to Equation 26 as follows:

$$H=D\tan\mu \quad\quad \text{MathFigure 26}$$

Accordingly, if the radius D of the object plane is fixed, the height of an object point is proportional to tan μ while the image height is proportional to tan θ. If tan μ is proportional to tan θ as described above, the image of an object on the object plane is captured on the image sensor plane with its respective proportions correctly maintained. Referring to FIGS. 15 and 16, it can be seen that both the elevation angle of the incident ray and the nadir angle of the exit ray have their upper bounds and lower bounds. The elevation angle of the incident ray ranges from $\mu_1$ to $\mu_2$ ($\mu_1 \leq \mu \leq \mu_2$), and the nadir angle of the exit ray ranges from $\theta_1$ to $\theta_2$ ($\theta_1 \leq \theta \leq \theta_2$). Accordingly, in order for the proportionality relationship as described above to be satisfied within the valid ranges of the elevation angle of the incident ray and the nadir angle of the exit ray, the elevation of the incident ray should be given as a function of the exit angle of the exit ray as in Equation 27.

$$\mu(\theta) = \tan^{-1}\left[\frac{(\tan\mu_2 - \tan\mu_1)}{(\tan\theta_2 - \tan\theta_1)}(\tan\theta - \tan\theta_1) + \tan\mu_1\right] \quad \text{MathFigure 27}$$

The shape of a panoramic mirror surface satisfying the rectilinear projection scheme given by Equation 27 is given by Equations 27 through 29 and described in detail in References 8 and 9, $$R(\theta) = R(\theta_1)\exp\left[\int_{\theta_1}^{\theta} \frac{\sin\theta' + \cot\psi\cos\theta'}{\cos\theta' - \cot\psi\sin\theta'} d\theta'\right] \quad \text{MathFigure 28}$$

$$\psi = \frac{\theta + \left(\frac{\pi}{2} - \mu\right)}{2} \quad \text{MathFigure 29}$$

where a preferable range of the exit angle may be determined by considering the effective focal length of the refractive lens and the size of the image sensor plane.

FIG. 20 shows a preferable size of an unwarped panoramic image plane 2032 for a given size of an image sensor plane. The image sensor plane is assumed to be the one of a conventional CCD (charge coupled device) or CMOS (complementary metal-oxide-semiconductor) sensor in which the ratio of the horizontal width W to the vertical height H is 4:3. Here in this example, the height H in FIG. 20 is 7.8 mm. Since the goal of a panoramic imaging system is to equally monitor all the directions, i.e., 360°, the diameter of the outer rim 2032b of the unwrapped panoramic image plane should not be larger than the height H of vertical side 2014c or 2014d of the image sensor plane 2014 so that the ring-shaped raw panoramic image plane is completely contained within the image sensor plane. Further, if the circumference of the inner rim 2032a is vastly different from that of the outer rim 2032b, the image resolutions in the upper and the lower portions of the unwrapped panoramic image plane will be greatly different from each other. Accordingly, it is preferable that the ratio of the circumferences or equivalently the ratio of the radii is about 1:2. Considering the matters as described above, it is a sensible choice that the radius of the outer rim of the unwrapped panoramic image plane is the half of the vertical height of the image sensor plane, and the radius of the inner rim is again half of the radius of the outer rim.

FIG. 21 is a schematic diagram showing an exit ray 2111 with the maximum exit angle. If a panoramic image plane as shown in FIG. 20 is assumed, the exit ray having the maximum exit angle is a ray arriving at the horizontal side 2114a of the image sensor plane. If the effective focal length of the refractive lens is f, the size of the maximum exit angle is given by Equation 30 as follows:

$$\theta_v = \tan^{-1}\left(\frac{H}{2f}\right) \qquad \text{MathFigure 30}$$

Since it is very difficult to design a satisfactory refractive lens when the maximum exit angle is too large (i.e., when the field of view is too large), the maximum exit angle should have an appropriate value, which in turn means that the effective focal length of the refractive lens should have an appropriately large value.

FIG. 22 is a preliminary optical layout in which the effective focal length of the refractive lens and an approximate mirror size are selected considering the matters as described above. The nodal point is divided into a front nodal point F.N. and a rear nodal point R.N. under the assumption that the refractive lens is a thick lens. In this case, the distance from the rear nodal point to the image sensor plane approximately corresponds to the effective focal length f of the refractive lens. Since it is difficult to design a satisfactory refractive lens when the maximum exit angle of the exit ray is too large, the effective focal length f is chosen to be 8 mm, and accordingly, the maximum exit angle is given as 25.989°. Meanwhile, the distance $z_o$ from the front nodal point to the lowest point on the mirror surface 2216 is set as 40 mm, and the maximum axial radius $\rho_2$ of the mirror surface is approximately 27.5 mm. When obtaining the mirror surface profile, the elevation angle of the incident ray has been ranged from −60° to +30°. FIG. 23 shows the mirror surface profile as determined by the aforementioned design variables and the paths of chief rays.

In order to complete the design of a catadioptric rectilinear panoramic lens as describe above, a dedicated refractive lens which is to be used with the panoramic mirror 2316 shown in FIG. 23 should be designed. To design a dedicated refractive lens, a merit function should be written. Although the elevation angle of the incident ray has been ranged from −60° to +30° when designing the rectilinear panoramic mirror itself, the rectilinear panoramic lens as a whole is designed for the elevation angle ranging from −30° to +30°, and as a result, the central portion of the rectilinear panoramic mirror surface is not used. Using the range of the exit angle of the exit ray and the relationship of Equation 2, the axial radius of the image point on the image sensor plane ranges from $r_1 = f \tan \theta_1$ to $r_2 = f \tan \theta_2$ ($r \leq r \leq r_2$). Accordingly, the projection scheme given by Equation 27 is equivalently given as follows:

$$r(\mu) = r_1 + \frac{r_2 - r_1}{\tan\mu_2 - \tan\mu_1}(\tan\mu - \tan\mu_1) \qquad \text{MathFigure 31}$$

For the design of a dedicated refractive lens, the functional relationship of Equation 31 is included in the merit function.

FIG. 24 shows the entire optical layout of the rectilinear panoramic lens including the rectilinear panoramic mirror shown in FIG. 23 and the refractive lens along with the ray traces. The panoramic lens includes a first lens element $E_1$, i.e., the rectilinear panoramic mirror with an aspheric surface profile that can be described as a polynomial; a second lens element $E_2$, of which the second lens surface $R_2$ facing the first lens element is described as an even aspheric lens formula and the third lens surface $R_3$ is a spherical refractive surface; and a third lens element $E_3$ through the twelfth lens element $E_{12}$ sequentially positioned. Each of the third to twelfth lens elements is a refractive lens element with both surfaces being spherical surfaces. The stop S is located between the sixth lens element and the seventh lens element. An incident ray originating from an object point on the object is first reflected at the first lens element, and then sequentially passes through the second to twelfth lens elements, and finally as an exit ray, converges toward an image point on the focal plane.

FIG. 25 is a schematic diagram showing the definition of distortion for a rectilinear panoramic lens, wherein $P_a$ is an image point having the ideal image height $r_{rl}$ and $P_b$ is another image point corresponding to the real projection scheme. The distortion of a rectilinear panoramic lens is defined in a manner similar to Equation 21, and FIG. 26 is a graph showing the distortion calculated using such a scheme and shows that the percentage error (i.e., distortion) is less than 0.2%. Accordingly, the distortion in a prior art of rectilinear panoramic lens described in Reference 7 is practically non-existent.

The rectilinear panoramic lens described in Reference 7 is clearly different from the other panoramic lenses of previous designs in that the lens is substantially distortion-free and the vertical field of view (i.e., the range of the elevation angle of the incident ray) is completely independent of the range of the exit angle of the exit ray. However, the same drawback as those of other wide-angle lenses of prior art persists in that the effective focal length of the refractive lens is used in the projection scheme. Further, the panoramic mirror already satisfies the projection scheme (or the constraint) given by Equations 27 through 29, and the whole panoramic lens including the panoramic mirror satisfies an additional projection scheme given by Equation 31. Since two projection schemes are satisfied, there is a disadvantage in that the lens structure is unnecessarily complicated.

Reference 1: R. Hill, "A lens for whole sky photographs," Q. J. R. Meteor. Soc. 50, 227-235 (1924).
Reference 2: C. Beck, "Apparatus to photograph the whole sky," J. Sci. Instr. 2, 135-139 (1925).
Reference 3: Korean Patent No. 10-0624052, "OPTICAL COMPONENTS INCLUDING LENSES HAVING AT LEAST ONE ASPHERICAL REFRACTIVE SURFACE."
Reference 4: K. Miyamoto, "Fish-eye lens," J. Opt. Soc. Am. 54, 1060-1061 (1964).
Reference 5: W. J. Smith, Modern Lens Design (McGraw-Hill, Boston, 1992) p. 166.
Reference 6: G. Kweon, S. Hwang-bo, G. Kim, S. Yang, Y. Lee, "Wide-angle catadioptric lens with a rectilinear projection scheme," Appl. Opt. 45, 8659-8673 (2006).
Reference 7: G. Kweon, M. Laikin, "Design of a mega-pixel grade catadioptric panoramic lens with the rectilinear projection scheme," J. Opt. Soc. Korea, 10, 67-75 (2006).
Reference 8: Korean Patent No. 10-0491271, "PANORAMIC MIRROR AND IMAGING SYSTEM USING THE SAME."
Reference 9: Korean Patent No. 10-0552367, "RECTILINEAR MIRROR AND IMAGING SYSTEM HAVING THE SAME."
Reference 10: N. L. Max, "Computer graphics distortion for IMAX and OMNIMAX projection," Proc. NICOGRAPH, 137-159 (1983).

DISCLOSURE OF INVENTION

Technical Problem

An object of the present invention is to replace the conventional projection schemes implemented by conventional wide-angle or panoramic lenses and provide new projection schemes capable of realizing wide-angle or panoramic lenses which having a wider field of view still provide more satisfactory images and also to provide concrete examples of embodiments of wide-angle lenses implementing such projection schemes.

Technical Solution

In order to achieve the objects as described above, the present invention discards the concept of effective focal length and the nodal point which are based on the theory of paraxial ray tracing, and directly implements in the new projection scheme the most relevant variables in the viewpoint of industrial uses of imaging system, namely the field of view and the size of the image sensor. That is, the present invention provides new projection schemes for rotationally symmetric imaging lenses in which the field of view and the size of the image sensor are explicitly used but the effective focal length is not used.

ADVANTAGEOUS EFFECTS

By providing new projection schemes explicitly reflecting the field of view and the image sensor size, it is possible to realize wide-angle lenses providing most satisfactory images.

BRIEF DESCRIPTION OF THE DRAWINGS

FIG. 1 is a schematic diagram illustrating the conventional projection scheme used in an imaging optical system such as a camera.

FIG. 2 is a graph comparing various conventional projection schemes used in imaging optical systems.

FIG. 3 is a graph comparing various conventional projection schemes used in imaging optical systems for a common range of incidence angles as well as for a common range of exit angles.

FIG. 4 is the optical layout of a fisheye lens of a prior art and the ray traces.

FIG. 5 is a graph comparing the real projection scheme of the fisheye lens shown in FIG. 4 with the second type of equidistance projection scheme.

FIG. 6 is a graph showing the distortion as a percentage error between the real projection scheme of the fisheye lens shown in FIG. 4 and the second type of equidistance projection scheme.

FIG. 7 is a graph comparing the real projection scheme of the fisheye lens shown in FIG. 4 with the first type of equidistance projection scheme.

FIG. 8 is a graph showing the percentage error between the real projection scheme of the fisheye lens shown in FIG. 4 and the first type of equidistance projection scheme.

FIG. 9 is the optical layout of a catadioptric rectilinear wide-angle lens of a prior art and the ray traces.

FIG. 10 is a graph comparing the real projection scheme of the catadioptric rectilinear wide-angle lens shown in FIG. 9 with the second type of rectilinear projection scheme.

FIG. 11 is a graph showing the percentage error between the real projection scheme of the catadioptric rectilinear wide-angle lens shown in FIG. 9 and the second type of rectilinear projection scheme.

FIG. 12 is a graph comparing the real projection scheme of the catadioptric rectilinear wide-angle lens shown in FIG. 9 with the first type of rectilinear projection scheme.

FIG. 13 is a graph showing the percentage error between the real projection scheme of the catadioptric rectilinear wide-angle lens shown in FIG. 9 and the first type of rectilinear projection scheme.

FIG. 14 is a graph illustrating the inappropriateness of the paraxial ray tracing theory for the catadioptric rectilinear wide-angle lens shown in FIG. 9.

FIG. 15 is a conceptual view showing the shape of an object plane for a rectilinear panoramic imaging system.

FIG. 16 is a conceptual view of an unwarped panoramic image plane.

FIG. 17 is a schematic diagram of a catadioptric panoramic imaging system.

FIG. 18 is an exemplary view of an unwarped panoramic image plane.

FIG. 19 is an exemplary view of an unwrapped panoramic image plane obtained by unwrapping the unwarped panoramic image plane shown in FIG. 18.

FIG. 20 is a schematic diagram showing an appropriate partitioning of the image sensor plane for a catadioptric panoramic imaging system.

FIG. 21 is a schematic diagram illustrating the field of view of a lens which is determined by the size of the image sensor plane and the effective focal length.

FIG. 22 is a preliminary design of a catadioptric panoramic lens.

FIG. 23 is a graph showing the shape of a rectilinear panoramic mirror used in a catadioptric panoramic imaging system of a prior art and the optical path of chief rays therein.

FIG. 24 is the optical layout of a catadioptric rectilinear panoramic lens of a prior art and the ray traces.

FIG. 25 is a schematic diagram illustrating the definition of distortion for the catadioptric rectilinear panoramic lens shown in FIG. 24.

FIG. 26 is a graph showing the distortion of the catadioptric rectilinear panoramic lens shown in FIG. 24.

FIG. 27 is a schematic diagram illustrating the most general projection scheme of an imaging lens according to the present invention.

FIG. 28 is a schematic diagram illustrating the real projection scheme of a rotationally symmetric imaging lens.

FIG. 29 is a schematic diagram illustrating the projection scheme of the current invention using a scalar function for a rotationally symmetric imaging lens.

FIG. 30 is the optical layout of the refractive rectilinear wide-angle lens according to the first embodiment of the present invention and optical path of rays therein.

FIG. 31 is the modulation transfer function characteristic of the lens shown in FIG. 30.

FIG. 32 is a graph comparing the real projection scheme of the lens according to the first embodiment of the present invention with the third type of rectilinear projection scheme.

FIG. 33 is a graph showing the distortion of the lens in the first embodiment of the present invention according to the third type of rectilinear projection scheme.

FIG. 34 is a graph showing the difference between the ideal image height by the third type of rectilinear projection scheme and the real image height.

FIG. 35 is a graph comparing the second type of rectilinear projection scheme with the real projection scheme of the lens according to the first embodiment of the present invention.

FIG. 36 is a graph showing the distortion of the lens of the first embodiment of the present invention according to the second type of rectilinear projection scheme.

FIG. 37 is a cross-sectional view of the first lens element of the lens of the first embodiment of the present invention.

FIG. 38 is a perspective view showing the shape of the first lens surface of the first lens element of the lens of the first embodiment of the present invention.

FIG. 39 is a perspective view showing the shape of the second lens surface of the first lens element of the lens of the first embodiment of the present invention.

FIG. 40 is the optical layout of the refractive rectilinear wide-angle lens according to the second embodiment of the present invention and optical path of rays therein.

FIG. 41 is the modulation transfer function characteristic of the lens shown in FIG. 40.

FIG. 42 is a graph showing the distortion of the lens of the second embodiment of the present invention according to the third type of rectilinear projection scheme.

FIG. 43 is a graph showing the difference between the ideal image height by the third type of rectilinear projection scheme and the real image height.

FIG. 44 is the optical layout of the refractive rectilinear wide-angle lens according to the third embodiment of the present invention and optical path of rays therein.

FIG. 45 is the modulation transfer function characteristic of the lens shown in FIG. 44.

FIG. 46 is a graph showing the distortion of the lens of the third embodiment of the present invention according to the third type of rectilinear projection scheme.

FIG. 47 is a graph showing the difference between the ideal image height by the third type of rectilinear projection scheme and the real image height.

FIG. 48 is the optical layout of the refractive rectilinear wide-angle lens according to the fourth embodiment of the present invention and optical path of rays therein.

FIG. 49 is the modulation transfer function characteristic of the lens shown in FIG. 48.

FIG. 50 is a graph showing the distortion of the lens of the fourth embodiment of the present invention according to the third type of rectilinear projection scheme.

FIG. 51 is a graph showing the difference between the ideal image height by the third type of rectilinear projection scheme and the real image height.

FIG. 52 is the optical layout of a catadioptric rectilinear panoramic lens according to the fifth embodiment of the present invention and optical path of rays therein.

FIG. 53 is the modulation transfer function characteristic of the lens shown FIG. 52.

FIG. 54 is a graph comparing the ideal image height by the third type of rectilinear panoramic projection scheme and the real image height.

FIG. 55 is a graph showing the distortion of the lens shown in FIG. 52.

FIG. 56 is a schematic diagram of a catadioptric fisheye lens according to the third type of stereographic projection scheme of the present invention.

FIG. 57 is the optical layout of a catadioptric fisheye lens with a stereographic projection scheme according to the sixth embodiment of the present invention and optical path of rays therein.

FIG. 58 is the modulation transfer function characteristic of the lens shown in FIG. 57.

FIG. 59 is a graph comparing the ideal image height by the third type of stereographic projection scheme and the real image height of the lens shown in FIG. 57.

FIG. 60 is a graph showing the distortion of the lens shown in FIG. 57.

FIG. 61 is the optical layout of a refractive fisheye lens with a stereographic projection scheme according to the seventh embodiment of the present invention and optical path of rays therein.

FIG. 62 is the modulation transfer function characteristic of the lens shown in FIG. 61.

FIG. 63 is a graph comparing the ideal image height by the third type of stereographic projection scheme and the real image height of the lens shown in FIG. 61.

FIG. 64 is a graph showing the distortion of the lens shown FIG. 61.

FIG. 65 is a schematic diagram illustrating the rectilinear projection scheme of a rotationally symmetric lens in a new viewpoint.

FIG. 66 is a schematic diagram illustrating the projection scheme of an anamorphic rectilinear lens.

FIG. 67 is a schematic diagram illustrating the optical mapping of an object plane of an anamorphic rectilinear lens onto an image plane.

FIG. 68 is a schematic diagram illustrating the projection scheme of a panoramic lens which is suitable for a wall-mounting type panoramic camera.

FIG. 69 is a schematic diagram of an object plane of the panoramic lens shown in FIG. 68.

BEST MODE FOR CARRYING OUT THE INVENTION

The present invention provides an imaging optical lens rotationally symmetric about an optical axis and has a specific projection scheme in which the field of view of the lens and the size of the image sensor plane are directly reflected. The imaging operation of the lens renders an incident ray entering the lens from the object side to form an image point on an image plane which is perpendicular to the optical axis. The incidence angle $\delta$ of the incident ray with respect to the optical axis ranges from a minimum incidence angle $\delta_1$ to a maximum incidence angle $\delta_2$, and the real image height r which is defined as a distance from the intersection point of the image sensor plane with the optical axis to the said image point is given as $$r(\delta) = \frac{r_2 - r_1}{F_2 - F_1}\{F(\delta) - F_1\} + r_1$$

for a given continuous and monotonous function $F(\delta)$. Here, $F_1$ is a functional value corresponding to the minimum incidence angle $\delta_1$ (i.e., $F_1 \equiv F(\delta_1)$), $F_2$ is a functional value corresponding to the maximum incidence angle $\delta_2$ (i.e., $F_2 \equiv F(\delta_2)$), $r_1$ is an image height corresponding to the minimum incidence angle $\delta_1$ (i.e., $r_1 \equiv r(\delta_1)$), and $r_2$ is an image height corresponding to the maximum incidence angle $\delta_2$ (i.e., $r_2 \equiv r(\delta_2)$). The function $F(\delta)$ is given among $$F(\delta) = \tan\delta,$$

$$F(\delta) = \tan\frac{\delta}{2},$$

$$F(\delta) = \delta$$

and $$F(\delta) = \cot\delta.$$

MODE FOR THE INVENTION

Hereinafter, preferred embodiments according to the present invention will be described in detail with reference to FIGS. 27 to 69.

FIG. 27 is a schematic diagram illustrating the most general projection scheme for an imaging lens according to the present invention. The image of an object due to an imaging lens (not shown) is formed on the focal plane which is a plane perpendicular to the optical axis 2701. According to the paraxial ray tracing theory, when the distance from the object to the lens is infinite, then the distance from the nodal point of the lens to the focal plane is the effective focal length of the lens. As described above, the image plane 2732 in the present invention is a portion of the focal plane wherein image points have been actually formed by exit rays. When the focal plane is coincident with the image sensor plane 2714 of the image sensor, a sharp image is obtained. For a conventional imaging system, the image sensor plane 2714 should be completely included within the image plane 2732 so that a satisfactory image can be obtained without vignetting. On the other hand, for a panoramic imaging system, the image plane 2732 should be completely included in the image sensor plane 2714 so that all the directions, i.e., 360°, can be equally monitored without a dead zone.

For simplicity of notation, a rectangular coordinate system is taken having the optical axis 2701 as the z-axis and the coordinate origin coinciding with the intersection point O of the image plane 2732 with the optical axis 2701. It is preferable that the horizontal and the vertical sides of the image sensor plane 2714 are set to be parallel to the x-axis and the y-axis, i.e., the remaining two axes of the coordinate system, respectively. At this point, a vector function $$\vec{V}$$

is assumed which is defined over the valid ranges of the two dimensional image points (x, y, 0) on the image plane 2732. That is, the image plane is the domain of definition of the vector function. Three components $(V_x, V_y, V_z)$ of this vector function are direction cosines which are given by Equation 32 as follows:

$$\vec{V}(x,y) = (V_x, V_y, V_z) = (\cos \alpha, \cos \beta, \cos \gamma) \quad \text{MathFigure 32}$$

where α is the angle of the vector $$\vec{V}$$

with respect to the positive x axis, β and γ are the angles of the vector $$\vec{V}$$

with respect to the positive y axis and the positive z axis, respectively. By definition, the size of the vector $$\vec{V}$$

is 1, and accordingly, Equation 33 is satisfied as follows:

$$|\vec{V}| = \sqrt{V_x^2 + V_y^2 + V_z^2} = \sqrt{\cos^2\alpha + \cos^2\beta + \cos^2\gamma} = 1 \quad \text{MathFigure 33}$$

Except for a sign, the direction of the vector $$\vec{V}$$

is exactly the direction of the incident ray corresponding to the exit ray which converges onto the single image point 2733 on the image plane 2732. Further, this vector function is continuous within the image plane 2732, and two different points in the image plane 2732 have different functional values. The most general projection scheme can be represented using the specific vector function as described above.

However, majority of industrially used lenses are rotationally symmetric about an optical axis. It is then unnecessarily troublesome to represent the projection scheme of a rotationally symmetric lens using the vector function given by Equation 32. Instead of this vector function, the projection scheme of a rotationally symmetric lens can be represented more conveniently using a scalar function in which a single real number is assigned as a functional value.

FIG. 28 is a schematic diagram illustrating the projection scheme of a rotationally symmetric imaging system 2800 in accordance with the present invention. An imaging lens 2810 used in the imaging system 2800 includes at least one lens element and a stop. As described above, the distance from the nodal point N of the imaging lens 2810 to the focal plane is approximately equal to the effective focal length of the lens. When the focal plane is coincident with the image sensor plane 2814, a sharp image is obtained. If the lens 2810 is rotationally symmetric about the optical axis 2801 which is coincident with the z axis of the coordinate system, then the optical axis 2801, the incident ray 2809, and the exit ray 2811 are all contained within an incidence plane. The incidence angle δ of the incident ray 2809 is measured either as a zenith angle or as a nadir angle with respect to the optical axis 2801 in the incidence plane. In FIG. 28, the incidence angle is given as a zenith angle. The incident ray 2809 becomes the exit ray 2811 after sequentially passing through the first lens element to the last elements of the lens 2810, and the exit ray converges toward a single image point P on the image sensor plane 2814 which is coincident with the focal plane. The distance from the intersection point O of the optical axis 2801 with the image sensor plane 2814 to the image point P, i.e., the image height, is r.

FIG. 29 is a schematic diagram illustrating a general projection scheme that can be used in an imaging system having a rotationally symmetric lens. For a rotationally symmetric lens, a line segment 2934 in the image plane is assumed that connects the image point 2933 with the origin 0 of the coordinate system. The angle between the line segment and the x axis is φ. As described above, both the incident ray entering into the lens from the object side and the exit ray that has been refracted by the lens and converging toward an image point on the image plane are contained in the incidence plane, i.e., the plane containing the line segment 2934 and the z axis. Accordingly, the projection scheme of the lens can be completely specified by the incidence angle with respect to the positive z axis, wherein the incident ray corresponds to the exit ray converging to an image point 2933 on the image plane. In addition, due to the characteristics of a rotationally symmetric lens, this function can be given as a single variable function which depends only on the distance r from the origin O. That is, δ=δ(r) may be conveniently used instead of δ=δ(x, y). This function δ(r) is a monotonous and continuous function with respect to r. Since this function is a monotonous function, there is an inverse function. Accordingly, this function can be alternatively given as r=r(δ). That is to say, the incidence angle may be used as the independent variable, and the projection scheme can be given by specifying the image height r on the image plane corresponding to the incidence angle δ, i.e., r=r(δ).

Computer scientist majoring in image processing needs to know the characteristics of the lens in use in order to extract useful information from a captured image or to correct the distortion of the image. Reference 10 describes such an example. However, it has been recognized by some that the second type of projection schemes directly reflecting the effective focal length as are given in Equation 15 or Equation 17 are inappropriate for a wide-angle lens such as a fisheye lens. Specifically, the computer scientists themselves neither design nor manufacture optical lenses, and generally purchase lenses manufactured by well-known makers such as Nikon in order to use it in the image processing and vision experiments. Since lens design data of these products are not provided to the customer, the computer scientists treat the lens as a black-box and experimentally measure and use the projection scheme of the lens in the form of $r=r(\delta)$, and polynomial is preferred as a fitting function. However, experimental measurement of the projection scheme has plenty of margins for error. Accordingly, there have been many researches in the computer science fields related to the methods for finding the most accurate projection scheme of a lens or the location of the intersection point between the optical axis and the image sensor plane.

The field of view of a lens (i.e., $2\delta_2$), the projection scheme of a lens (i.e., $r=r(\delta)$), and the maximum image height $r_2$ may be the characteristics of a rotationally symmetric imaging lens which is of direct interest to the user. In order to prevent vignetting effect, the maximum image height in a general imaging system is made equal or larger than the distance from the center O of the image sensor plane to the farthest edge of the image sensor plane. On the other hand, the diameter of the outer rim of the image plane for a panoramic imaging system is made equal or less than the height of the image sensor plane. The three characteristics as described above should be directly implemented in a preferable projection scheme.

If the distance from the nodal point N of a lens to the image sensor plane is approximately equal to the effective focal length f of the lens 2810, the maximum image height $r_2$ on the image sensor plane 2914 and the maximum zenith angle $\delta_2$ of the incident ray in a second type of rectilinear projection scheme satisfying $$r=f\tan\delta$$

satisfies Equation 34 as follows:

$$r_2 = f\tan\delta_2 \quad \text{MathFigure 34}$$

Accordingly, Equation 35 can be obtained from Equations 15 and 34 as follows:

$$\frac{r}{r_2} = \frac{\tan\delta}{\tan\delta_2} \quad \text{MathFigure 35}$$

Equation 35 can be rearranged into Equation 36 as follows:

$$r = \frac{r_2}{\tan\delta_2}\tan\delta \quad \text{MathFigure 36}$$

Equation 36 completely defines the projection scheme of a rotationally symmetric lens using only the three aforementioned characteristics. Specifically, if Equation 36 is used as a constraint on designing a lens or as an element in the merit function for design optimization, the effective focal length is not used. Accordingly, the effective focal length or equivalently the refractive power may be varied during the optimization process, and an optimum design can be obtained benefiting from the additional degree of freedom. Further, since the field of view of the lens, i.e., the maximum zenith angle of the incident ray, and the maximum image height are directly reflected in Equation 36, the projection scheme can be precisely satisfied even for a wide-angle lens wherein the paraxial ray tracing theory is no more valid. Hereinafter, the projection scheme given by Equation 36 is referred to as a third type of rectilinear projection scheme.

Similarly, from the second type of stereographic projection scheme given as, $$r = 2f\tan\frac{\delta}{2},$$

a third type of stereographic projection scheme is obtained as Equation 37:

$$r = \frac{r_2}{\tan\frac{\delta_2}{2}}\tan\frac{\delta}{2} \quad \text{MathFigure 37}$$

Similarly, from the second type of equidistance projection scheme, $$r=f\delta,$$

a third type of equidistance projection scheme is obtained by Equation 38 as follows:

$$r = \frac{r_2}{\delta_2}\delta \quad \text{MathFigure 38}$$

Further, from the second type of orthographic projection scheme, $$r = 2f\sin\frac{\delta}{2},$$

a third type of orthographic projection scheme as the following Equation 39 is obtained:

$$r = \frac{r_2}{\sin\frac{\delta_2}{2}}\sin\frac{\delta}{2} \quad \text{MathFigure 39}$$

The third type of rectilinear projection scheme, the third type of stereographic projection scheme, the third type of equidistance projection scheme, and the third type of orthographic projection scheme as described above can be given as particular examples of a generalized projection scheme given in Equation 40:

$$r(\delta)=aF(\delta)+b \quad \text{MathFigure 40}$$

where a and b are constants, and F is a monotonous and continuous function of incidence angle $\delta$. This is because a single incident ray must not converge onto two or more image points on the image plane. That is, all the image points on the line segment 2934 must correspond to different incidence angles.

If the incidence angle $\delta$ ranges from $\delta_1$ to $\delta_2$ (i.e., $\delta_1 \leq \delta \leq \delta_2$), the functional values of the monotonous functions F corresponding to the minimum incidence angle $\delta_1$ and the maximum incidence angle $\delta_2$ are given as $F_1=F(\delta_1)$ and $F_2=F(\delta_2)$, respectively. In addition, the image heights on the image sensor plane corresponding to the minimum incidence angle $\delta_1$ and the maximum incidence angle $\delta_2$ are designated as $r_1$ and $r_2$, respectively. Here, it is not necessary that $r_1$ is smaller than $r_2$. Using these relationships, Equation 40 can be converted into Equation 41 as follows:

$$r(\delta) = \frac{r_2 - r_1}{F_2 - F}\{F(\delta) - F_1\} + r_1 \qquad \text{MathFigure 41}$$

The most general projection scheme of a rotationally symmetric imaging lens can be given in this form.

The elevation angle μ and the nadir angle δ of the incident ray in a panoramic lens with the rectilinear projection scheme satisfies a relationship given as μ=δ−π/2. Accordingly, due to the trigonometric property of the tangent function, it can be seen that the rectilinear projection scheme given by Equation 31 is a particular example of a general projection scheme given by Equation 42 as follows:

$$r(\delta) = r_1 + \frac{r_2 - r_1}{\cot\delta_2 - \cot\delta_1}(\cot\delta - \cot\delta_1) \qquad \text{MathFigure 42}$$

Accordingly, it can be seen that $F(\delta)=\cot\delta$, and the minimum incidence angle $\delta_1$ and the corresponding image height $r_1$ are larger than 0. Meanwhile, in Equations 36 to 39, the minimum incidence angle $\delta_1$ and the corresponding image height $r_1$ are all 0.

First Embodiment

FIG. 30 shows the optical layout and the ray traces of a rotationally symmetric refractive rectilinear wide-angle lens according to the first embodiment of the present invention satisfying the rectilinear projection scheme given by Equation 36. This lens is designed to operate in the visible wavelength range, F number is 2.8, the field of view is 120° (i.e., $\delta_2=60°$), and optimized for a VGA-grade ⅓-inch CCD image sensor. A ⅓-inch CCD sensor has a width of 4.8 mm (i.e., W=4.8 mm), a height of 3.6 mm (i.e., H=3.6 mm), and a diagonal dimension of 6.0 mm. Accordingly, the maximum image height is $r_2=3.0$ mm in order to prevent the vignetting effect.

This lens includes a first lens element $E_1$ through an eleventh lens element $E_{11}$, wherein the first lens element $E_1$ is a double aspheric lens element, while the rest of the elements from the second element $E_1$ to the eleventh lens element $E_{11}$ are all spherical refractive lens elements. The stop S is located between the third lens element $E_3$ and the fourth lens element $E_4$. The optical low pass filter F located between the eleventh lens element $E_{11}$ and the image sensor plane 3032 is not a constituent element of the lens but belongs to a camera body, and is covered over the image sensor plane of the camera image sensor. The optical low pass filter serves to remove a moire effect from the image. FIG. 30 indicates that this lens is designed with a due consideration for the optical low pass filter.

An incident ray 3009 originating from an object point 3023 on an object plane 3021 has the incidence angle δ with respect to the optical axis of the lens. Here, the incidence angle is measured as a zenith angle in the spherical polar coordinate system having the optical axis 3001 as the z axis. This incident ray 3009 enters into the first lens surface $R_1$, which is the refractive surface of the first lens element $E_1$ on the object side, and sequentially passes through the first to the eleventh lens elements and the optical low pass filter, and then, finally converges onto an image point on the image plane 3032. The ray after passing through the eleventh lens element is referred to as the exit ray.

As described above, each of the first through the eleventh lens element is a refractive lens element having two lens surfaces. For example, the first lens element has the first lens surface $R_1$ on the object side and a second lens surface $R_2$ on the image side, the second lens element $E_2$ has a third lens surface $R_3$ on the object side and a fourth lens surface $R_4$ on the image side, and the rest of the lens elements have the fifth through the twenty second lens surfaces.

The profile of a rotationally symmetric lens surface can be conveniently described in a cylindrical coordinate system having the vertex of the lens surface as the origin and the rotational symmetry axis as the z axis. Such a profile can be conveniently represented as a set of pairs (ρ, h), wherein the axial radius ρ is the distance measured perpendicularly from the z axis to a point on the lens surface and the height or the sag h is a distance measured parallel to the z axis. However, it is more convenient to represent the lens profile as a function given as h=h(ρ), wherein the axial radius ρ is the independent variable while the sag h is the dependent variable. In this manner, the profile of the first aspheric lens surface shown in FIG. 30, i.e., the first lens surface $R_1$ of the first lens element $E_1$, is described as a polynomial function given by Equation 43 as follows:

$$h(\rho) = \sum_{i=1}^{n} C_i \rho^i \qquad \text{MathFigure 43}$$

where n is the order of the polynomial, and $C_i$ is the coefficient of the i-th order term. The surface profile of the first lens surface in the first embodiment according to the present invention is given by a polynomial of order n=8. The maximum axial radius is given as $\rho_2=21.134$ mm, and the polynomial coefficients are given by Table 1 as follows:

TABLE 1

| variable | value |
|---|---|
| $C_1$ | 7.81927e−03 |
| $C_2$ | −4.00700e−02 |
| $C_3$ | 4.34458e−03 |
| $C_4$ | −3.12537e−05 |
| $C_5$ | −1.11360e−05 |
| $C_6$ | 7.25042e−07 |
| $C_7$ | −2.51943e−08 |
| $C_8$ | 4.26404e−10 |

The profile of the second aspheric lens surface is represented as an even aspheric lens formula which is generally given by Equation 44 as follows:

$$h(\rho) = \frac{\frac{\rho^2}{R}}{1 + \sqrt{1 - (1+k)\left(\frac{\rho}{R}\right)^2}} + \sum_{i=1}^{n} C_i \rho^{2+2i} \qquad \text{MathFigure 44}$$

where R is the vertex radius of curvature, k is the conic constant, and $C_i$ is the i-th aspheric deformation coefficient. The conic constant k is 0 (i.e., k=0) for a spherical surface, k=−1 for a parabolic surface, k<−1 for a hyperbolic surface, −1<k<0 for a prolate elliptical surface, and k>0 for an oblate elliptical surface. A conic curve is referred to as the profile of a cross section obtained when a cone is cut out at a certain angle. For example, the profile of the cross section becomes a circle when a cone with a vertex half angle θ is cut perpendicularly to the rotational symmetry axis. On the other hand, the profile of the cross section becomes a parabola when the cone is cut slantly at an angle θ with respect to the rotational symmetry axis, and the cutting thereof at other angles causes the profile of the cross section to be a hyperbola or an ellipse. Further, if such a conic curve is rotated about the symmetry axis of the conic curve, the trace of the conic curve becomes a conic surface. The profile of the second lens surface $R_2$ of the lens of the first embodiment according to the present invention represented by the even aspheric lens formula is given by Table 2 as follows:

TABLE 2

| variable | value |
|---|---|
| R | 14.699 |
| k | 1.16503 |
| $C_1$ | 4.64956e−04 |
| $C_2$ | −6.34631e−06 |
| $C_3$ | 9.19067e−08 |
| $C_4$ | 1.83694e−10 |
| $C_5$ | −1.14126e−11 |
| $C_6$ | 5.45695e−14 |

The radius of curvature, the thickness, the refractive index and the Abbe number of the optical glass, and the other relevant design data of the spherical lens elements are summarized in Table 3. It is assumed that an optical plastic manufactured by 'Zeonex' under the trade name 'E48R' is used as the lens material for the first lens element, while optical glasses manufactured by 'Hikari' are used as the lens material for the second through the eleventh lens elements. The term 'glass' represents a product name of Hikari glass having the given refractive index and the Abbe number. That is, a glass manufactured by Hikari under the trade name 'E-LAF010' is most similar to a glass having a refractive index of 1.7432 and an Abbe number of 49.31.

In the first embodiment of the present invention, the maximum zenith angle of the incident ray is $\delta_2=60°$, and the maximum axial radius of the image point on the image plane (i.e., the maximum image height) is $r_2=3.0$ mm. Accordingly, if the second type of rectilinear projection scheme is assumed, the effective focal length of the lens should be given by Equation 45 as follows:

$$f = \frac{r_2}{\tan\delta_2} = \frac{3.0}{\tan 60°} = 1.732 \qquad \text{MathFigure 45}$$

Since the effective focal length calculated using Zemax, a dedicated lens design program, is 1.589 mm, it can be seen that the result is largely different from the calculation of Equation 45. Accordingly, if the rectilinear projection scheme given as $$r = f \tan \delta$$

is used, it is impossible to obtain a desired characteristic of a lens, i.e., an image without distortion.

FIG. 31 shows the modulation transfer function (MTF) characteristic of a refractive rectilinear wide-angle lens according to the first embodiment of the present invention, of which the optical design data is summarized in Tables 1 through 3. For a video graphics array (VGA) grade image sensor having 640×480 pixels, the Nyquist frequency is 67 line pairs/mm. Referring to FIG. 31, MTF is over 0.1 even at 1001 p/mm. Accordingly, it can be seen that the lens of the first embodiment of the present invention has a sufficient resolution as a VGA grade lens.

Meanwhile, FIG. 32 compares the ideal rectilinear projection scheme (rl: solid line) given by Equation 36 with the real projection scheme (rp: dotted line). Referring to FIG. 32, it can be seen that the design value and the real value are comparatively well in agreement to each other. For this lens, the distortion can be calculated in the manner given in Equation 21. FIG. 33 shows the percentage error calculated by the

TABLE 3

| surface number | element-surface | surface type | radius | thickness | index | Abbe number | glass |
|---|---|---|---|---|---|---|---|
| object | | Std. | infinity | infinity | | | |
| 1 | E1-R1 | Odd Asp. | infinity | 3.000 | 1.5312 | 56.04 | E48R |
| 2 | E1-R2 | Even Asp. | 14.699 | 12.277 | | | |
| 3 | E2-R3 | Std. | −41.216 | 2.500 | 1.7432 | 49.31 | E-LAF010 |
| 4 | E2-R4 | Std. | 17.954 | 4.861 | | | |
| 5 | E3-R5 | Std. | 12.708 | 3.000 | 1.7174 | 29.52 | E-SF1 |
| 6 | E3-R6 | Std. | 17.415 | 23.982 | | | |
| 7 | S | Std. | infinity | 0.500 | | | |
| 8 | E4-R7 | Std. | −208.353 | 2.274 | 1.6477 | 33.80 | E-SF2 |
| 9 | E4-R8/E5-R9 | Std. | −3.311 | 1.193 | 1.7857 | 44.17 | E-LASF01 |
| 10 | E5-R10 | Std. | −8.505 | 3.925 | | | |
| 11 | E6-R11 | Std. | −17.205 | 1.200 | 1.7283 | 28.46 | E-SF10 |
| 12 | E6-R12 | Std. | 9.733 | 0.455 | | | |
| 13 | E7-13 | Std. | 12.254 | 3.089 | 1.6204 | 60.29 | E-SK16 |
| 14 | E7-R14 | Std. | −9.196 | 0.488 | | | |
| 15 | E8-R15 | Std. | −22.181 | 2.806 | 1.4875 | 70.41 | E-FK5 |
| 16 | E8-R16 | Std. | −7.711 | 0.360 | | | |
| 17 | E9-R17 | Std. | −12.996 | 1.365 | 1.6396 | 34.56 | E-SF7 |
| 18 | E9-R18 | Std. | −16.362 | 0.456 | | | |
| 19 | E10-R19 | Std. | 13.755 | 3.472 | 1.4875 | 70.41 | E-FK5 |
| 20 | E10-R20/E11-R21 | Std. | −6.085 | 1.430 | 1.7552 | 27.51 | E-SF4 |
| 21 | E11-R22 | Std. | −38.471 | 4.181 | | | |
| 22 | F | Std. | infinity | 3.000 | 1.5168 | 64.11 | E-BK7 |
| 23 | | Std. | infinity | 1.000 | | | |
| IMA | CCD | Std. | infinity | | | | | method described above, wherein it can be seen that the distortion is less than 2% when the zenith angle of the incident ray is more than 5°. It is widely accepted that a distortion less than 4% cannot be noticed with a naked eye. Accordingly, it can be seen that this lens has very little distortion when the incidence angle is larger than 5°, and therefore this lens is a wide-angle lens satisfying the third type of rectilinear projection scheme for this range of the incidence angle. However, referring to FIG. 32, it can be seen that the real projection scheme is in a relatively good agreement with the ideal projection scheme even when the incidence angle is less than 5°. This is a mathematical illusion arising as the denominator in Equation 21 becomes too small. This point becomes clear by referring to FIG. 34. FIG. 34 shows the difference between the two image heights shown in FIG. 32. From FIG. 34, it can be seen that the difference between the two image heights is less than 5□ when the zenith angle of the incident ray is less than 5°. A pixel in a VGA grade ⅓-inch CCD sensor is a square pixel measuring as 5□×5□. Accordingly, since the difference between the two image heights is smaller than the size of one pixel, the notion of the presence of distortion itself is substantially meaningless. Accordingly, referring to FIGS. 32 through 34, it can be seen that this lens is practically distortion free.

Considering these matters as described above, the characteristics of the lens in the first embodiment of the present invention may be defined by a lens wherein for all the incident rays having the incidence angle between the minimum incidence angle $\delta_1$ and the maximum incidence angle $\delta_2$, the ideal image height r(δ) given by Equation 36 and the real image height r'(δ) satisfy at least one Equation between 46 and 47.

$$\left| \frac{r(\delta) - r'(\delta)}{r(\delta)} \right| < 0.04 \qquad \text{MathFigure 46}$$

$$\left| \frac{r(\delta) - r'(\delta)}{r_2} \right| < 0.02 \qquad \text{MathFigure 47}$$

Equation 46 means that the distortion of the lens by the conventional definition is less than 4%. Meanwhile, Equation 47 means that the error between the ideal image height and the real image height is not larger than 2% of the maximum image height. In the first embodiment, the maximum image height is $r_2=3$ mm, the minimum incidence angle is $\delta_1=0°$, and the maximum incidence angle is $\delta_2=60°$. Meanwhile, in the region near the incidence angle of 0° where the distortion is more than 4%, the maximum difference in the image heights is less than 5□ (=0.005 mm). Accordingly, since the functional value of left hand side of the Equation 47 is 0.005/3=0.0017, it can be seen that the inequality is well satisfied.

Similar to FIG. 14, FIG. 35 compares the real projection scheme of the lens with the second type of rectilinear projection scheme given by Equation 15. The effective focal length of this lens is 1.589 mm. As shown in FIG. 35, the projection scheme of the present lens cannot be described by the conventional second type of rectilinear projection scheme. FIG. 36 is a graph showing the distortion according to the second type of rectilinear projection scheme, wherein it can be seen that the distortion is more than 10% for most of the valid region of the angle of incidence. Accordingly, it can be seen that the rectilinear wide-angle lens according to the first embodiment of the present invention is an entirely unique lens which cannot be comprehended by the projection schemes of prior art.

The rectilinear wide-angle lens according to this embodiment of the present invention also differs from the lenses of prior art in another perspective. Firstly, this lens has a back focal length $f_B$ of 7.221 mm, which is more than twice as large as the effective focal length, so that this lens is a typical retrofocus lens.

$$\frac{f_B}{f} = \frac{7.221}{1.589} = 4.544 > 2 \qquad \text{MathFigure 48}$$

Simultaneously, this lens is an ultra wide-angle lens of which the field of view is wider than 90°, and the first lens surface $R_1$ of the first lens element $E_1$ on the object side is an aspheric surface which cannot be described by the usual even aspheric lens formula. That is, the profile of the first lens surface can be appropriately described only by a polynomial function of the axial radius ρ as shown in Equation 43. For a conventional wide-angle lens, the distortion becomes noticeable when the field of view is more than 60° (i.e., the maximum incidence angle is more than 30°), and the distortion is unpleasantly large when the field of view is larger than 90° (i.e., the maximum incidence angle is larger than 45°). In order to keep the distortion of a wide-angle lens with a field of view more than 90° as small as that of this embodiment of the present invention, the technique according to the present invention needs to be employed.

FIG. 37 shows the cross sectional view of the first lens element. As described above, the first lens element is a double aspheric lens element, wherein the first lens surface $R_1$ on the object side is in the shape of a letter ω having the image side as the upper side, and the second lens surface $R_2$ is in the shape of a letter U having the image side as the upper side and the object side as the lower side. That is, if the direction from the object side to the image side is taken as the positive direction, then the lowest points of the first lens surface $R_1$ form a circle about the optical axis 3701. Accordingly, as shown in FIG. 37, if a first tangential line $T_1$ which is in contact with the cross section of the first lens surface is drawn, then the cross section of the first lens surface and the first tangential line has two tangential points, namely, $Q_{1a}$ and $Q_{1b}$. Further, the intersection point between the first lens surface $R_1$ and the optical axis 3701, i.e., the vertex $Q_1$ of the first lens surface is also the local maximum. That is, as shown in FIG. 38, the vertex $Q_1$ of the first lens surface $R_1$ is dented as compared to its neighbors.

Meanwhile, referring to FIGS. 37 and 39, the sag of the second lens surface monotonically increases from the optical axis toward the perimeter of the second lens surface. The intersection point between the second lens surface $R_2$ and the optical axis 3701 or 3901 is $Q_2$. Here, a point $Q_{2a}$ is assumed to lie on the second lens surface with an axial radius ρ from the optical axis. Further, a second tangential line $T_2$ is assumed which is in contact with the cross section of the second lens surface and perpendicular to the optical axis. Then, the intersection point $Q_2$ is the vertex of the second lens surface as well as the contact (i.e., tangential) point between the second tangential line and the cross section of the second lens surface. In addition, the height or sag h(ρ) from the second tangential line to $Q_{2a}$ is a monotonically increasing function of the axial radius ρ. Accordingly, as the axial radius increases, the sag also increases.

Second Embodiment

FIG. 40 is the optical layout and ray traces of a refractive rectilinear wide-angle lens with a CS mount according to the second embodiment of the present invention. Similar to the first embodiment, the field of view is 120°, and the F number is 4.4. This lens differs from the lens in the first embodiment in that the back focal length is longer than 12.5 mm. In this lens, the first lens element $E_1$ is also a double aspheric lens element having a first lens surface $R_1$ which is described by a polynomial and a second lens surface $R_2$ which is described by an even aspheric lens formula. In addition, each of the second lens element $E_2$ through the eleventh lens element $E_{11}$ is a spherical lens element, and the stop S is located between the third lens element $E_3$ and the fourth lens element $E_4$. Table 4 summarizes the profile of the first lens surface $R_1$, Table 5 summarizes the profile of the second lens surface $R_2$ and Table 6 summarizes the lens design data for the entire lens except for the aspherical profiles of the first and the second lens surfaces. All the spherical lens elements are chosen to use the optical glasses manufactured by O'hara.

TABLE 4

| variable | value |
| --- | --- |
| $C_1$ | 1.83693e−03 |
| $C_2$ | −2.46840e−02 |
| $C_3$ | 3.50129e−03 |
| $C_4$ | −1.32747e−04 |
| $C_5$ | −3.83451e−06 |
| $C_6$ | 5.79633e−07 |
| $C_7$ | −1.97107e−08 |
| $C_8$ | 2.27659e−10 |

TABLE 5

| variable | value |
| --- | --- |
| R | 26.387 |
| k | 1.68159 |
| $C_1$ | 3.65195e−04 |
| $C_2$ | −4.99605e−06 |
| $C_3$ | 4.31417e−08 |
| $C_4$ | −2.11312e−10 |
| $C_5$ | 5.71171e−13 |
| $C_6$ | −6.29230e−16 |

TABLE 6

| surface number | element-surface | surface type | radius | thickness | index | Abbe number | glass |
| --- | --- | --- | --- | --- | --- | --- | --- |
| object | | Std. | infinity | infinity | | | |
| 1 | E1-R1 | Odd. Asp. | infinity | 3.000 | 1.5312 | 56.04 | E48R |
| 2 | E1-R2 | Even Asp. | 26.387 | 15.556 | | | |
| 3 | E2-R3 | Std. | 33.677 | 2.000 | 1.7865 | 50.00 | S-YGH52 |
| 4 | E2-R4 | Std. | 11.451 | 7.518 | | | |
| 5 | E3-R5 | Std. | −74.357 | 1.457 | 1.7865 | 50.00 | S-YGH52 |
| 6 | E3-R6 | Std. | 51.195 | 42.003 | | | |
| 7 | S | Std. | infinity | 3.000 | | | |
| 8 | E4-R7 | Std. | 123.355 | 3.503 | 1.6889 | 31.08 | S-TIM28 |
| 9 | E4-R8/E5-R9 | Std. | −3.691 | 1.200 | 1.7292 | 54.68 | S-LAL18 |
| 10 | E5-R10 | Std. | −20.080 | 3.073 | | | |
| 11 | E6-R11 | Std. | −26.696 | 2.519 | 1.7552 | 27.51 | S-TIH4 |
| 12 | E6-R12/E7-R13 | Std. | 11.252 | 2.943 | 1.6172 | 54.06 | S-BSM21 |
| 13 | E7-R14 | Std. | −17.603 | 0.500 | | | |
| 14 | E8-R15 | Std. | 72.086 | 3.166 | 1.4875 | 70.24 | S-FSL5 |
| 15 | E8-R16 | Std. | −8.423 | 0.500 | | | |
| 16 | E9-R17 | Std. | −12.651 | 1.500 | 1.7552 | 27.51 | S-TIH4 |
| 17 | E9-R18 | Std. | −240.084 | 0.500 | | | |
| 18 | E10-R19 | Std. | 19.879 | 4.003 | 1.4875 | 70.24 | S-FSL5 |
| 19 | E10-R20/E11-R21 | Std. | −6.474 | 1.500 | 1.7552 | 27.51 | S-TIH4 |
| 20 | E11-R22 | Std. | −14.467 | 15.000 | | | |
| IMA | CCD | Std. | infinity | | | | |

FIG. 41 shows the modulation transfer function characteristic of the rectilinear wide-angle lens according to the second embodiment of the present invention which is described by Tables 4 through 6. From the graph, it can be seen that the lens has a sufficient resolution for a VGA grade lens. Meanwhile, FIG. 42 shows the distortion of the lens calculated by Equation 21, wherein it can be seen that the distortion is less than 7% throughout the whole valid region of the incidence angle and furthermore, the distortion is less than 2% when the zenith angle of the incident ray is larger than 10°. However, referring to FIG. 43, it can be seen that the difference between the two image heights is less than 10□ when the zenith angle of the incident ray is smaller than 10°. That is, since the difference between the real image height and the ideal image height is less than the size of two pixels, it can be seen that this lens is substantially distortion free as in the first embodiment. The second embodiment of the present invention shares most of the characteristics with the first embodiment of the present invention except for the back focal length.

Third Embodiment

FIG. 44 is the optical layout and the ray traces of a rectilinear wide-angle lens according to the third embodiment of the present invention. The field of view of this lens is 125° and the F number is 3.92. In this lens, the first lens element $E_1$ is also a double aspheric lens element having a first lens surface $R_1$ which is described by a polynomial and a second lens surface $R_2$ which is described by an even aspheric lens formula, and all the other lens elements are spherical lens elements. A stop S is located between the fourth lens element $E_4$ and the fifth lens element $E_5$, and the optical low pass filter F is located between the twelfth lens element $E_{12}$ and the image plane 4432. Table 7 summarizes the aspherical surface profile of the first lens surface $R_1$, Table 8 summarizes the aspherical surface profile of the second lens surface $R_2$, and Table 9 summarizes the entire lens design data except for the two aspherical surface profiles. All the spherical lens elements are selected among the optical glasses manufactured by Hikari.

TABLE 7

| variable | value |
|---|---|
| $C_1$ | 2.08368e−03 |
| $C_2$ | −4.00850e−02 |
| $C_3$ | 4.38399e−03 |
| $C_4$ | −3.29126e−05 |
| $C_5$ | −1.10474e−05 |
| $C_6$ | 7.43655e−07 |
| $C_7$ | −2.66726e−08 |
| $C_8$ | 4.44690e−10 |

TABLE 8

| variable | value |
|---|---|
| R | 14.348 |
| k | 0.99756 |
| $C_1$ | 5.12475e−04 |
| $C_2$ | −6.92749e−06 |
| $C_3$ | 9.62560e−08 |
| $C_4$ | 2.54999e−10 |
| $C_5$ | −1.12677e−11 |
| $C_6$ | 4.52347e−14 | has a sufficient resolution as a VGA grade lens. Meanwhile, FIG. 46 shows the distortion of the lens calculated by Equation 21, wherein it can be seen that the distortion is less than 4% throughout the entire valid range of the incidence angle, and furthermore, the distortion is less than 2% when the zenith angle of the incident ray is larger than 10°. However, referring to FIG. 47, it can be seen that the difference between the two image heights is less than 5□ when the zenith angle of the incident ray is smaller than 10°. That is, since the difference between the ideal image height and the real image height is smaller than the size of one pixel, it can be seen that this lens is practically distortion free as in the first embodiment. The third embodiment of the present invention shares most of the characteristics with the first and the second embodiments of the present invention.

Fourth Embodiment

FIG. 48 is the optical layout and the ray traces of a refractive rectilinear wide-angle lens according to the fourth embodiment of the present invention. The field of view of this lens is 120°, and the F number is 3.17. In this lens, the first lens element $E_1$ is also a double aspheric lens element having a first lens surface $R_1$ which is described by a polynomial function and a second lens surface $R_2$ which is described by an even aspheric lens formula, and the second lens element $E_2$ through the fourteenth lens element $E_{14}$ are all spherical lens elements. The stop S is located between the sixth lens element $E_6$ and the seventh lens element $E_7$, and an optical low pass filter F is positioned between the fourteenth lens element $E_{14}$ and the image plane 4832. Table 10 summarizes the aspherical surface profile of the first lens surface, Table 11 summarizes the aspherical surface profile of the second lens surface,

TABLE 9

| surface number | element-surface | surface type | radius | thickness | index | Abbe number | glass |
|---|---|---|---|---|---|---|---|
| object | | Std. | infinity | infinity | | | |
| 1 | E1-R1 | Odd. Asp. | infinity | 3.000 | 1.5312 | 56.04 | E48R |
| 2 | E1-R2 | Even Asp. | 14.348 | 11.472 | | | |
| 3 | E2-R3 | Std. | −54.268 | 1.243 | 1.7668 | 46.80 | E-LASFH2 |
| 4 | E2-R4 | Std. | 17.831 | 8.608 | | | |
| 5 | E3-R5 | Std. | 14.865 | 2.879 | 1.7174 | 29.51 | SF1 |
| 6 | E3-R6/E4-R7 | Std. | 37.296 | 1.199 | 1.6970 | 48.53 | LAF09 |
| 7 | E4-R8 | Std. | 18.000 | 25.263 | | | |
| 8 | S | Std. | infinity | 0.500 | | | |
| 9 | E5-R9 | Std. | 684.511 | 2.041 | 1.6477 | 33.80 | E-SF2 |
| 10 | E5-R10/E6-R11 | Std. | −3.414 | 1.237 | 1.8061 | 40.94 | E-LASF03 |
| 11 | E6-R12 | Std. | −8.255 | 4.152 | | | |
| 12 | E7-R13 | Std. | −17.553 | 1.199 | 1.7283 | 28.46 | E-SF10 |
| 13 | E7-R14 | Std. | 10.081 | 0.524 | | | |
| 14 | E8-R15 | Std. | 11.999 | 2.634 | 1.6204 | 60.29 | E-SK16 |
| 15 | E8-R16 | Std. | −10.386 | 0.400 | | | |
| 16 | E9-R17 | Std. | −19.407 | 2.290 | 1.4875 | 70.41 | E-FK5 |
| 17 | E9-R18 | Std. | −7.177 | 0.399 | | | |
| 18 | E10-R19 | Std. | −10.942 | 1.362 | 1.6398 | 34.56 | SF7 |
| 19 | E10-R20 | Std. | −14.334 | 0.400 | | | |
| 20 | E11-R21 | Std. | 14.297 | 3.298 | 1.4875 | 70.41 | E-FK5 |
| 21 | E11-R22/E12-R23 | Std. | −5.581 | 1.200 | 1.7552 | 27.51 | E-SF4 |
| 22 | E12-R24 | Std. | −23.809 | 4.097 | | | |
| 23 | F | Std. | infinity | 3.000 | 1.5168 | 64.11 | E-BK7 |
| 24 | | Std. | infinity | 1.000 | | | |
| IMA | CCD | Std. | infinity | | | | |

FIG. 45 shows the modulation transfer function characteristics of the rectilinear wide-angle lens according to the third embodiment of the present invention which is described by Tables 7 through 9. From the graph, it can be seen that the lens and Table 12 summarizes the entire lens design data except for the two aspherical surface profiles. All the spherical lens elements are selected among the optical glasses manufactured by Hikari.

TABLE 10

| variable | value |
|---|---|
| $C_1$ | 4.96128e−03 |
| $C_2$ | −3.91720e−02 |
| $C_3$ | 4.21925e−03 |
| $C_4$ | −2.26436e−05 |
| $C_5$ | −1.14904e−05 |
| $C_6$ | 7.15869e−07 |
| $C_7$ | −2.34984e−08 |
| $C_8$ | 3.74816e−10 |

TABLE 11

| variable | value |
|---|---|
| R | 12.973 |
| k | 0.65486 |
| $C_1$ | 2.80434e−04 |
| $C_2$ | 9.10340e−07 |
| $C_3$ | −3.55468e−08 |
| $C_4$ | 9.98151e−10 |
| $C_5$ | −9.44283e−12 |
| $C_6$ | 2.32057e−14 |

TABLE 12

| surface number | element-surface | surface type | radius | thickness | index | Abbe number | glass |
|---|---|---|---|---|---|---|---|
| object | | Std. | infinity | infinity | | | |
| 1 | E1-R1 | Odd. Asp. | infinity | 3.000 | 1.5312 | 56.04 | E48R |
| 2 | E1-R2 | Even Asp. | 12.973 | 11.603 | | | |
| 3 | E2-R3 | Std. | −50.988 | 1.246 | 1.7668 | 46.80 | E-LASFH2 |
| 4 | E2-R4 | Std. | 33.147 | 5.442 | | | |
| 5 | E3-R5 | Std. | 86.437 | 1.230 | 1.7340 | 51.48 | E-LAK09 |
| 6 | E3-R6 | Std. | 27.050 | 3.870 | | | |
| 7 | E4-R7 | Std. | 27.172 | 3.312 | 1.7174 | 29.51 | SF1 |
| 8 | E4-R8/E5-R9 | Std. | −47.970 | 1.392 | 1.7200 | 50.23 | E-LAK10 |
| 9 | E5-R10 | Std. | 82.053 | 3.803 | | | |
| 10 | E6-R11 | Std. | −51.990 | 1.994 | 1.8061 | 40.94 | E-LASF03 |
| 11 | E6-R12 | Std. | −35.994 | 19.331 | | | |
| 12 | S | Std. | infinity | 0.474 | | | |
| 13 | E7-R13 | Std. | 75.279 | 2.225 | 1.6477 | 33.80 | E-SF2 |
| 14 | E7-R14/E8-R15 | Std. | −3.875 | 1.212 | 1.8061 | 40.94 | E-LASF03 |
| 15 | E8-R16 | Std. | −9.198 | 2.588 | | | |
| 16 | E9-R17 | Std. | −10.876 | 1.199 | 1.7283 | 28.46 | E-SF10 |
| 17 | E9-R18 | Std. | 15.264 | 0.559 | | | |
| 18 | E10-R19 | Std. | 13.694 | 2.769 | 1.6204 | 60.29 | E-SK16 |
| 19 | E10-R20 | Std. | −10.124 | 0.400 | | | |
| 20 | E11-R21 | Std. | −51.388 | 2.268 | 1.4875 | 70.41 | E-FK5 |
| 21 | E11-R22 | Std. | −9.369 | 0.427 | | | |
| 22 | E12-R23 | Std. | −9.693 | 1.371 | 1.6398 | 34.56 | SF7 |
| 23 | E12-R24 | Std. | −11.996 | 0.398 | | | |
| 24 | E13-R25 | Std. | 19.731 | 3.589 | 1.4875 | 70.41 | E-FK5 |
| 25 | E13-R26/E14-R27 | Std. | −5.762 | 1.200 | 1.7552 | 27.51 | E-SF4 |
| 26 | E14-R28 | Std. | −19.128 | 4.100 | | | |
| 27 | F | Std. | infinity | 3.000 | 1.5168 | 64.11 | E-BK7 |
| 28 | | Std. | infinity | 1.000 | | | |
| IMA | CCD | Std. | infinity | | | | |

FIG. 49 shows the modulation transfer function characteristics of the rectilinear wide-angle lens according to the fourth embodiment of the present invention which is described by Tables 10 through 12. From the graph, it can be seen that the lens has a sufficient resolution as a VGA grade lens. Meanwhile, FIG. 50 shows the distortion of the lens calculated by Equation 21, wherein it can be seen that the distortion is less than 2% when the zenith angle of the incident ray is larger than 10°. However, referring to FIG. 51, it can be seen that the difference between the two image heights is less than 10□ when the zenith angle of the incident ray is smaller than 10°. That is, since the difference between the ideal image height and the real image height is smaller than the size of two pixels, it can be seen that this lens is practically distortion free as in the first embodiment. The fourth embodiment of the present invention shares most of the characteristics with the first through the third embodiments of the present invention.

Fifth Embodiment

FIG. 52 is the optical layout and the ray traces of a catadioptric panoramic lens according to the fifth embodiment of the present invention. This lens includes a first lens element $E_1$ which is an aspheric mirror described by a polynomial function given in Equation 43 and the second lens element $E_2$ through the eighth lens element $E_8$. Table 13 summarizes the aspherical surface profile of the first lens surface $R_1$. All of the second lens element through the eighth lens element are refractive lens elements, and a stop S is located between the first lens surface $R_1$, i.e., the reflective surface of the first lens element $E_1$, and a second lens surface $R_2$, i.e., the first refractive surface of the second lens element $E_2$. Further, an optical low pass filter F is located between the fifteenth lens surface $R_{15}$ of the eighth lens element and the image plane 5232. It is assumed that E48R is used as the lens material for the second lens element, and the second lens surface of the second lens element is an aspheric refractive surface described by an even aspheric lens formula. Table 14 summarizes the aspherical surface profile of the second lens surface. Rest of the lens element from the third lens element to the eighth lens element are all refractive lens elements, and the lens materials are selected among the optical glasses manufactured by Hikari. The third lens surface through the fifteenth lens surface are all spherical refractive surfaces. Table 15 summarizes the entire lens design data except for the two aspherical surface profiles.

Characteristic of an optical system having an odd number of reflective surfaces, FIG. 52 is drawn so that the image plane lies at the left end of the optical layout.

TABLE 13

| variable | value |
|---|---|
| $C_1$ | 3.59300e−01 |
| $C_2$ | −5.80255e−03 |
| $C_3$ | 4.00422e−03 |
| $C_4$ | −1.46263e−04 |
| $C_5$ | 4.84105e−06 |
| $C_6$ | −6.04159e−07 |
| $C_7$ | 2.29778e−08 |
| $C_8$ | 2.65851e−10 |

TABLE 14

| variable | value |
|---|---|
| R | 1.765 |
| k | 0.06743 |
| $C_1$ | 1.20803e−03 |
| $C_2$ | −4.49600e−02 |
| $C_3$ | −7.06100e−02 |
| $C_4$ | 3.00600e−02 |
| $C_5$ | 6.73530e−01 |
| $C_6$ | 1.39845e−00 |
| $C_7$ | −4.70643e−00 |

TABLE 15

| surface number | element-surface | surface type | radius | thickness | index | Abbe number | glass |
|---|---|---|---|---|---|---|---|
| object | | Std. | infinity | infinity | | | |
| 1 | E1-R1 | Odd. Asp. | infinity | −45.068 | | | mirror |
| 2 | S | Std. | infinity | −0.493 | | | |
| 3 | E2-R2 | Even Asp. | 1.765 | −1.565 | 1.5312 | 56.04 | E48R |
| 4 | E2-R3 | Std. | −14.374 | −0.597 | | | |
| 5 | E3-R4 | Std. | −15.972 | −2.500 | 1.5168 | 64.11 | E-BK7 |
| 6 | E3-R5 | Std. | 4.460 | −1.695 | | | |
| 7 | E5-R6 | Std. | −15.537 | −1.923 | 1.6229 | 58.23 | E-SK15 |
| 8 | E5-R7 | Std. | 13.993 | −0.500 | | | |
| 9 | E6-R8 | Std. | −9.354 | −2.186 | 1.6127 | 58.73 | E-SK4 |
| 10 | E6-R9 | Std. | 14.247 | −0.524 | | | |
| 11 | E7-R10 | Std. | 5.901 | −1.023 | 1.7408 | 27.78 | E-SF13 |
| 12 | E7-R11 | Std. | −11.290 | −0.621 | | | |
| 13 | E8-R12 | Std. | −5.112 | −2.501 | 1.6384 | 55.48 | E-SK18 |
| 14 | E8-R13 | Std. | 35.577 | −1.369 | | | |
| 15 | E9-R14 | Std. | 78.148 | −2.442 | 1.5638 | 60.68 | E-SK11 |
| 16 | E9-R15 | Std. | −3.098 | −1.498 | | | |
| 17 | F | Std. | infinity | −3.000 | 1.5168 | 64.11 | E-BK7 |
| 18 | | Std. | infinity | −1.000 | | | |
| IMA | CCD | Std. | infinity | | | | |

In this embodiment, unlike the panoramic lens of the prior art shown in FIG. 24, there is no constraint on the shape of the panoramic mirror itself. A constraint exists only as a rectilinear panoramic projection scheme given in Equation 42 applied to the entire lens. The image height on the image sensor plane ranges from $r_1=0.89$ mm to $r_2=1.79$ mm, the minimum incidence angle $\delta_1$ of the incident ray is 65°, and the maximum incidence angle $\delta_2$ is 110°.

Unlike the panoramic lens of the prior art having two separate projection schemes, i.e., one for the mirror and one for the entire lens, a single merit function given in Equation 42 is used in the fifth embodiment of the present invention. Consequently, the lens structure could be simplified and the lens characteristics such as the modulation transfer function characteristics could be improved. FIG. 53 shows the modulation transfer function characteristics of this lens, and it can be seen that this lens has enough resolution to be used in a mega-pixel grade camera. The diameter of the stop is 1.2 mm, and the F number of this lens is 4.2, which is reasonably good. FIG. 54 compares the ideal projection scheme rl given by Equation 42 with the real projection scheme rp, and FIG. 55 shows the percentage error calculated by Equation 46. As is clear from FIG. 55, it can be seen that the distortion is less than 4%, a result which can be considered excellent for a panoramic lens.

Sixth Embodiment

If the field of view of a lens is larger than 160° (i.e., if the maximum incidence angle of the incident ray is larger than 80°), it is not only very difficult to design a lens implementing the accurate rectilinear projection scheme, but also the acquired image from such a lens appears discomfortably unnatural. Accordingly, when the field of view of a lens needs to be larger than 160°, it is a sensible choice to design the lens as a fisheye lens. A conventional fisheye lens is designed and manufactured according to an equidistance projection scheme. In practice, when the field of view is 180° or more, there tends to be errors between the ideal equidistance projection scheme and the projection scheme of the real lens. However, as described above, among the various projection schemes for fisheye lenses, the stereographic projection scheme is the projection scheme that provides an image which appears most natural to the naked eye. The stereographic projection scheme in this embodiment is given by Equation 37. FIG. 56 is a schematic diagram of a catadioptric fisheye lens with the stereographic projection scheme. Such a catadioptric fisheye lens is preferably mounted so that its optical axis 5601 is perpendicular to the ground plane 5603. Considering this matter, the incidence angle δ of an incident ray 5609 is measured as a nadir angle instead of a zenith angle.

FIG. 57 is the optical layout and the ray traces of a catadioptric fisheye lens with the field of view of 220° and satisfying the stereographic projection scheme. This lens is optimized for a ⅓-inch CCD sensor, and the F number is 4.5. Further, the lens is intended to be used as a circular fisheye lens instead of a full frame fisheye lens. Consequently, the entire image plane is contained within the rectangular image sensor plane, and the maximum image height is $r_2$ 1.8 mm. In this embodiment, the minimum incidence angle is 0° and the maximum incidence angle is 110°.

This lens includes a first lens element $E_1$ with a first lens surface that is an aspheric mirror surface described by an even aspheric lens formula, and a second lens element $E_2$ through a ninth lens element $E_9$. Table 16 summarizes the aspherical surface profile of the first lens surface $R_1$. Rest of the lens element ranging from the second lens element to the ninth lens element are refractive lens elements, and a stop S is located between the first lens surface $R_1$, i.e., the reflective surface of the first lens element, and the second lens surface $R_2$, i.e., the object-side refractive surface of the second lens element. Further, there is an optical low pass filter F between the seventeenth lens surface $R_{17}$ of the ninth lens element and the image plane 5732. It is assumed that E48R is used as the lens material for the second lens element, and the second lens surface of the second lens element is an aspheric refractive surface described by an even aspheric lens formula, wherein the aspherical surface profile is summarized in Table 17. It is assumed that rest of the lens element ranging from the third lens element to the ninth lens element are refractive lens elements and the lens materials are selected among the optical glasses manufactured by Hikari. The rest of the lens surface ranging from the third lens surface to the seventeenth lens surface are all spherical refractive surfaces. The entire lens design data such as glass compositions and radii and thicknesses of the spherical lens elements are summarized in Table 18. Characteristic of an optical system having an odd number of reflective surfaces, FIG. 57 is drawn so that the image plane lies at the left end of the optical layout.

TABLE 16

| variable | value |
| --- | --- |
| R | 10.422 |
| k | −1.06406 |
| $C_1$ | −2.02471e−05 |
| $C_2$ | −1.65451e−08 |
| $C_3$ | 4.25560e−11 |

TABLE 17

| variable | value |
| --- | --- |
| R | 2.268 |
| k | −0.08211 |
| $C_1$ | −0.03300 |
| $C_2$ | 0.06024 |
| $C_3$ | 0.06277 |
| $C_4$ | −0.29039 |
| $C_5$ | −0.18298 |
| $C_6$ | 1.09348 |
| $C_7$ | −0.78081 |

TABLE 18

| surface number | element-surface | surface type | radius | thickness | index | Abbe number | glass |
| --- | --- | --- | --- | --- | --- | --- | --- |
| object |  | Std. | infinity | infinity |  |  |  |
| 1 | E1-R1 | Even Asp. | 10.422 | −50.231 |  |  | mirror |
| Stop | S | Std. | infinity | −0.490 |  |  |  |
| 3 | E2-R2 | Even Asp. | 2.268 | −0.927 | 1.5312 | 56.04 | E48R |
| 4 | E2-R3 | Std. | −6.043 | −1.825 |  |  |  |
| 5 | E3-R4 | Std. | −39.701 | −2.324 | 1.5168 | 64.11 | E-BK7 |
| 6 | E3-R5 | Std. | 4.796 | −0.300 |  |  |  |
| 7 | E4-R6 | Std. | −58.547 | −1.564 | 1.6204 | 60.29 | E-SK16 |
| 8 | E4-R7 | Std. | 11.666 | −0.300 |  |  |  |
| 9 | E5-R8 | Std. | −7.323 | −2.234 | 1.6180 | 63.37 | E-PSK02 |
| 10 | E5-K9 | Std. | 26.610 | −0.573 |  |  |  |
| 11 | E6-R10 | Std. | 12.478 | −1.199 | 1.7408 | 27.78 | E-SF13 |
| 12 | E6-R11 | Std. | −5.244 | −0.402 |  |  |  |
| 13 | E7-R12 | Std. | −5.608 | −1.591 | 1.6385 | 55.48 | SK18 |
| 14 | R7-R13 | Std. | −46.274 | −0.298 |  |  |  |
| 15 | E8-R14 | Std. | −5.038 | −1.923 | 1.5688 | 56.34 | E-BAK4 |
| 16 | E8-R15 | Std. | −7.509 | −0.300 |  |  |  |
| 17 | E9-R16 | Std. | −4.838 | −1.294 | 1.7234 | 37.97 | BASF8 |
| 18 | E9-R17 | Std. | −2.295 | −1.988 |  |  |  |
| 19 | F | Std. | infinity | −3.000 | 1.5168 | 64.11 | E-BK7 |
| 20 |  | Std. | infinity | −1.000 |  |  |  |
| IMA | CCD | Std. | infinity |  |  |  |  |

FIG. 58 shows the modulation transfer function characteristics of the catadioptric fisheye lens with the stereographic projection scheme shown in FIG. 57, and FIG. 59 compares the ideal image height (solid line) according to the third type of stereographic projection scheme of the present invention with the real image height (dotted line). FIG. 60 is a graph showing the distortion of this lens as a percentage error, and it can be seen that the percentage error is less than 4%. The most preferable use of a catadioptric fisheye lens with the stereographic projection scheme is having the lens installed outdoors to monitor a wide area including the ground surface and the region above the horizon.

The catadioptric fisheye lens with the stereographic projection scheme according to the sixth embodiment of the present invention is characterized in that the maximum incidence angle is more than 80° (i.e., $\delta_2 \geqq 80°$), the first lens surface of the first lens element is an aspheric mirror surface, the sag of the first lens surface monotonically increases from the optical axis toward the perimeter of the first lens surface, and the stop is located between the first lens element and the second lens element.

Seventh Embodiment

FIG. 61 is the optical layout and the ray traces of a refractive fisheye lens with a field of view of 180° and satisfying the stereographic projection scheme. This lens is optimized for a ⅓-inch CCD sensor and the F number is 2.8. Further, the lens is intended to be used as a circular fisheye lens instead of a full frame fisheye lens. Consequently, the entire image plane is contained within the rectangular image sensor plane, and the maximum image height is $r_2 = 1.8$ mm. In this embodiment, the minimum incidence angle $\delta_1$ is 0°, and the maximum incidence angle $\delta$ is 90°.

This lens includes the first lens element $E_1$, i.e., a double aspheric lens element, and the second lens element $E_2$ through the eleventh lens element $E_{11}$, wherein all the lens elements ranging from the second to the eleventh lens elements are refractive spherical lens elements. A stop S is located between the seventh lens element $E_7$ and the eighth lens element $E_8$, and an optical low pass filter F is positioned between the eleventh lens element and the image plane 6132. The aspherical surface profiles of the first lens surface $R_1$ and the second lens surface $R_2$ of the first lens element $E_1$ are described by an even aspheric lens formula, wherein the aspheric surface profiles are summarized in Tables 19 and 20. Meanwhile, the entire lens design data such as glass compositions, radii and thicknesses of the spherical lens elements is summarized in Table 21. The lens material of the first lens element is E48R from Zeonex, and the lens materials for the rest of the lens elements are selected from Hikari glasses.

TABLE 19

| variable | value |
| --- | --- |
| R | 27.640 |
| k | 0.67987 |
| $C_1$ | 2.57791e−06 |
| $C_2$ | 3.64927e−08 |
| $C_3$ | −8.85286e−11 |
| $C_4$ | 3.59030e−13 |
| $C_5$ | −1.21746e−15 |
| $C_6$ | 1.08724e−18 |
| $C_7$ | 6.24833e−22 |

TABLE 20

| variable | value |
| --- | --- |
| R | 10.702 |
| k | −0.62540 |
| $C_1$ | 7.67109e−05 |
| $C_2$ | −1.44037e−07 |
| $C_3$ | 3.47919e−09 |
| $C_4$ | 3.32565e−11 |
| $C_5$ | 1.33262e−13 |
| $C_6$ | 3.33833e−16 |
| $C_7$ | −9.58470e−19 |

TABLE 21

| surface number | element-surface | surface type | radius | thickness | index | Abbe number | glass |
| --- | --- | --- | --- | --- | --- | --- | --- |
| object |  | Std. | infinity | infinity |  |  |  |
| 1 | E1-R1 | Even. Asp. | 27.640 | 2.000 | 1.5312 | 56.04 | E48R |
| 2 | E1-R2 | Even. Asp. | 10.702 | 7.551 |  |  |  |
| 3 | E2-R3 | Std. | 16.867 | 2.303 | 1.8040 | 46.58 | E-LASF015 |
| 4 | E2-R4 | Std. | 4.637 | 5.047 |  |  |  |
| 5 | E3-R5 | Std. | −50.057 | 2.112 | 1.8040 | 46.58 | E-LASF015 |
| 6 | E3-R6 | Std. | 8.268 | 4.851 |  |  |  |
| 7 | E4-R7 | Std. | 119.492 | 2.499 | 1.8040 | 46.58 | E-LASF015 |
| 8 | E4-R8 | Std. | 6.343 | 0.696 |  |  |  |
| 9 | E5-R9 | Std. | 7.445 | 2.510 | 1.6034 | 38.01 | E-F5 |
| 10 | E5-R10 | Std. | −8.613 | 4.818 |  |  |  |
| 11 | E6-R11 | Std. | 27.555 | 1.257 | 1.7570 | 47.83 | E-LAF04 |
| 12 | E6-R12 | Std. | 3.058 | 0.200 |  |  |  |
| 13 | E7-R13 | Std. | 3.206 | 2.500 | 1.6034 | 38.01 | E-F5 |
| 14 | E7-R14 | Std. | −11.881 | 0.529 |  |  |  |
| 15 | S | Std. | infinity | 1.890 |  |  |  |
| 16 | E8-R15 | Std. | 12.474 | 1.503 | 1.6667 | 48.36 | E-BAF11 |
| 17 | E8-R16 | Std. | −5.279 | 0.456 |  |  |  |
| 18 | E9-R17 | Std. | −4.043 | 1.198 | 1.8052 | 25.43 | E-SF6 |
| 19 | E9-R18 | Std. | 6.158 | 0.189 |  |  |  |
| 20 | E10-R19 | Std. | 7.814 | 2.007 | 1.4875 | 70.41 | E-FK5 |
| 21 | E10-R20 | Std. | −5.485 | 0.200 |  |  |  |
| 22 | E11-R21 | Std. | 7.890 | 2.500 | 1.4875 | 70.41 | E-FK5 |
| 23 | E11-R22 | Std. | −7.567 | 2.050 |  |  |  |
| 24 | F | Std. | infinity | 3.000 | 1.5168 | 64.11 | E-BK7 |
| 25 |  | Std. | infinity | 1.000 |  |  |  |
| IMA | CCD | Std. | infinity |  |  |  |  |

FIG. 62 shows the modulation transfer function characteristics of a refractive fisheye lens with the stereographic projection scheme shown in FIG. 61, and FIG. 63 compares the ideal image height (solid line) according to the third type of stereographic projection scheme of the present invention with the real image height (dotted line). FIG. 64 shows the distortion of this lens, and it can be seen that the percentage error is less than 4%. The most preferable use of a refractive fisheye lens with the stereographic projection scheme is to install the lens on a ceiling in order to monitor the entire interior of a room below the horizon without any dead zone.

The catadioptric fisheye lens with the stereographic projection scheme according to the seventh embodiment of the present invention is characterized in that the maximum incidence angle is more than 80° (i.e., $\delta_2 \geq 80°$), the first lens element is a double aspheric lens element, the lowest point of the first refractive surface on the object side and the lowest point of the second refractive surface on the image side are on the optical axis if we define the direction from the object side to the image side as a positive direction. The sags of the first refractive surface and the second refractive surface monotonically increase from the optical axis toward the perimeters of the refractive surfaces.

Eighth Embodiment

FIG. 65 is a schematic diagram illustrating the projection scheme of a rotationally symmetric rectilinear lens in a new point of view. Referring to FIGS. 21 and 65, an image sensor plane 6514 has a rectangular shape with horizontal sides 6514a and 6514b having a width W and vertical sides 6514c and 6514d having a height H. The origin of the rectangular coordinate system for describing an object point P' on an object plane 6521 and an image point P on the image sensor plane 6514 is located at the nodal point N of the lens, and the optical axis of the lens coincides with the z axis of the rectangular coordinate system. The z axis perpendicularly passes through the center O of the image sensor plane 6514. The x axis of the rectangular coordinate system is parallel to the horizontal sides 6514a and 6514b of the image sensor plane 6514, and the y axis is parallel to the vertical sides 6514c and 6514d of the image sensor plane.

Since the mathematical property of a rectilinear lens can be approximated as a pinhole camera, the shape of the object plane 6521 captured by the image sensor plane is identical to that of the image sensor plane 6514, and the imaging operation of the lens renders an incident ray 6509 propagating from an object point P' on the object plane 6521 toward the nodal point N of the lens to become an exit ray 6511 which converges toward an image point P on the image plane. In a rectilinear lens, the incident ray 6509 and the exit ray 6511 are parallel to each other. Under the assumption of paraxial ray tracing, the distance from the nodal point N to the image sensor plane 6514 is close to the effective focal length of the lens. The distance becomes identical to the effective focal length when the object point is at infinity from the lens. If the rectangular coordinate of the object point is (x', y', d) and the rectangular coordinate of the image point is (x, y, −f), then the horizontal incidence angle $\delta_x$ of the incident ray 6509 corresponding to the exit ray 6511 converging toward the image point is given by Equation 49, while the vertical incidence angle $\delta_y$ is given by Equation 50 as follows:

$$\delta_x = \tan^{-1}\left(\frac{x'}{d}\right) \qquad \text{MathFigure 49}$$

$$\delta_y = \tan^{-1}\left(\frac{y'}{d}\right) \qquad \text{MathFigure 50}$$

Since the incident ray and the exit ray are parallel to each other, the horizontal incidence angle and the vertical incidence angle may also be written by Equations 51 and 52 as follows:

$$\delta_x = \tan^{-1}\left(\frac{x}{f}\right) \qquad \text{MathFigure 51}$$

$$\delta_y = \tan^{-1}\left(\frac{y}{f}\right) \qquad \text{MathFigure 52}$$

Accordingly, the projection scheme of a rotationally symmetric rectilinear lens may be written as follows. The horizontal incidence angle of the incident ray 6509 corresponding to the exit ray 6511 converging toward the image point P having two dimensional coordinate (x, y) on the image sensor plane 6514 which is coincident with the focal plane is given by Equation 51, while the vertical incidence angle is given by Equation 52, wherein the effective focal length f is determined by the size (W, H) of the image sensor plane and the field of view ($2\delta_{x2}$, $2\delta_{y2}$) of the rectilinear lens.

Since the horizontal width of the image sensor plane is W, the horizontal field of view $2\delta_{x2}$ is given by Equation 53 as follows:

$$2\delta_{x2} = 2\tan^{-1}\left(\frac{W}{2f}\right) \qquad \text{MathFigure 53}$$

where $\delta_{x2}$ is the maximum horizontal incidence angle. Similarly, the vertical field of view $2\delta_{y2}$ is given by Equation 54 as follows:

$$2\delta_{y2} = 2\tan^{-1}\left(\frac{H}{2f}\right) \qquad \text{MathFigure 54}$$

Equation 55 can be derived from Equations 53 and 54 as follows:

$$\frac{\tan\delta_{y2}}{\tan\delta_{x2}} = \frac{H}{W} \qquad \text{MathFigure 55}$$

Therefore, regardless of the effective focal length, the horizontal field of view and the vertical field of view satisfy Equation 56 as follows:

$$\delta_{y2} = \tan^{-1}\left(\frac{H}{W}\tan\delta_{x2}\right) \qquad \text{MathFigure 56}$$

Accordingly, if the effective focal length f of the lens is changed, the horizontal and the vertical fields of view can be changed according to the Equations 53 and 54 but the horizontal and the vertical fields of view cannot be changed independently of each other.

The ratio between the horizontal width and the vertical height (i.e., aspect ratio) of a typical image sensor plane is given as 4:3, 1:1, 16:9, or the like. However, for some applications, it can be advantageous to have the horizontal and the vertical fields of view different from those possible by the prefixed image sensor aspect ratio. For example, it is desirable that the field of view of semiconductor inspection equipment is matched to the size of a PCB or the component under inspection. If the field of view of the imaging system is sufficiently large, the object under inspection can be captured as a whole, but in this case, there are wasted pixels in the captured image. Further, if it is required that the horizon or the coastline needs to be monitored for security purposes, it can be advantageous that the horizontal field of view is as much as wide, while the vertical field of view is equal to or narrower than the standard field of view. For such cases, an anamorphic rectilinear lens may be the most preferable choice. An anamorphic rectilinear lens is a lens wherein the rectilinear projection schemes are satisfied for the horizontal and the vertical directions separately, but the horizontal refractive power of the lens is different from the vertical refractive power. Since a refractive power is the reciprocal of the effective focal length, the horizontal effective focal length is different from the vertical effective focal length in an anamorphic rectilinear lens.

More generally, an anamorphic lens is a lens wherein the refractive power or the projection scheme in one plane containing the optical axis, e.g., the x-z plane, is different from those in the other plane (i.e., y-z plane) perpendicular to the first plane. An anamorphic lens has two mirror symmetry planes. For example, if the cross sectional profile of the lens perpendicular to the z axis is an ellipse, the plane containing the major axis of the ellipse and the optical axis is one mirror symmetry plane and the plane containing the minor axis of the ellipse and the optical axis is another mirror symmetry plane.

FIG. 66 is a schematic diagram illustrating the projection scheme of an anamorphic rectilinear lens. In FIG. 66, the object plane 6621 is different in shape from the image sensor plane 6614. In order to fully capture the object plane onto the image sensor plane 6614 without any unused pixels, the vertical magnification should be different from the horizontal magnification. FIG. 67 illustrates a specific embodiment wherein an object plane 6721 which has a horizontal width W' and a vertical height H' is fully captured by an image sensor plane which has a horizontal width W and a vertical height H. If the coordinate of an image point P on the image sensor plane is (x, y, −f) and the coordinate of the corresponding object point P' is (x', y', d), then the horizontal coordinate x' of the object point corresponding to the two dimensional coordinate (x, y) of the image point is given by Equation 57, while the vertical coordinate y' is given by Equation 58 as follows:

$$x' = \frac{W'}{W}x \quad \text{MathFigure 57}$$

$$y' = \frac{H'}{H}y \quad \text{MathFigure 58}$$

Accordingly, the horizontal incidence angle of the incident ray 6609 corresponding to the exit ray 6611 converging toward the image point P is given by Equation 59, while the vertical incidence angle is given by Equation 60 as follows:

$$\delta_x = \tan^{-1}\left(\frac{x'}{d}\right) = \tan^{-1}\left(\frac{W'}{W}\frac{x}{d}\right) \quad \text{MathFigure 59}$$

$$\delta_y = \tan^{-1}\left(\frac{y'}{d}\right) = \tan^{-1}\left(\frac{H'}{H}\frac{y}{d}\right) \quad \text{MathFigure 60}$$

In order to simplify the equations, a horizontal effective focal length $f_x$ given by Equation 61 and a vertical effective focal length $f_y$ given by Equation 62 may be defined as follows:

$$f_x = \frac{Wd}{W'} \quad \text{MathFigure 61}$$

$$f_y = \frac{Hd}{H'} \quad \text{MathFigure 62}$$

Accordingly, similar to Equations 51 and 52, the horizontal and the vertical incidence angles of the incident ray are given by Equations 63 and 64:

$$\delta_x = \tan^{-1}\left(\frac{x}{f_x}\right) \quad \text{MathFigure 63}$$

$$\delta_y = \tan^{-1}\left(\frac{y}{f_y}\right) \quad \text{MathFigure 64}$$

Equations 63 and 64 can be inverted to yield Equations 65 and 66 as follows:

$$x(\delta_x,\delta_y)=f_x \tan \delta_x \quad \text{MathFigure 65}$$

$$y(\delta_x,\delta_y)=f_y \tan \delta_y \quad \text{MathFigure 66}$$

Accordingly, the horizontal width W of the image sensor plane and the maximum horizontal incidence angle satisfy the relationship given by Equation 67, and similarly, the vertical height H and the maximum vertical incidence angle satisfy the relationship given by Equation 68 as follows:

$$\frac{W}{2} = f_x \tan \delta_{x2} \quad \text{MathFigure 67}$$

$$\frac{H}{2} = f_y \tan \delta_{y2} \quad \text{MathFigure 68}$$

Therefore, the two dimensional coordinate (x, y) of the image point on the image sensor plane corresponding to the incident ray having a horizontal incidence angle $\delta_x$ and a vertical incidence angle $\delta_y$ is given by Equations 69 and 70 as follows:

$$x(\delta_x, \delta_y) = \frac{W}{2\tan\delta_{x2}} \tan\delta_x \quad \text{MathFigure 69}$$

$$y(\delta_x, \delta_y) = \frac{H}{2\tan\delta_{y2}} \tan\delta_y \quad \text{MathFigure 70}$$

Accordingly, the projection scheme of an anamorphic rectilinear lens according to the present invention is characterized in that the imaging operation of the lens renders an incident ray having a horizontal incidence angle $\delta_x$ and a vertical incidence angle $\delta_y$ to form an image point on the image sensor plane, wherein the two dimensional coordinate (x, y) of the image point is given by Equations 69 and 70.

Ninth Embodiment

FIG. 17 shows a schematic diagram of a conventional panoramic lens for simultaneously monitoring all the directions (i.e., 360°) around the imaging system. However, in an indoor environments, it may be unnecessary to monitor all the directions and furthermore, it may even be cumbersome. If a camera has to be installed in an indoor environment for security or other purpose, it will be a natural choice to mount the camera on the ceiling or on a side-wall. Accordingly, in this case, it is most preferable that the horizontal field of view of the lens is about 180°.

FIG. 68 is a schematic diagram illustrating the projection scheme of an anamorphic panoramic lens according to the ninth embodiment of the present invention. The origin of the rectangular coordinate system for describing the imaging system including an anamorphic panoramic lens is located at the nodal point N of the anamorphic panoramic lens, and the z axis of the coordinate system coincides with the optical axis. The imaging system using the anamorphic lens of this embodiment is assumed as attached on a wall 6830 which is a plane perpendicular to the ground plane. The wall coincides with the x-y plane of the coordinate system, and the y axis runs from the ground plane (i.e., the x-z plane) toward the zenith (i.e., the ceiling). The x and the y axes of the coordinate system are parallel to the horizontal and the vertical sides of the image sensor plane 6814, respectively. Further, the image sensor plane has a rectangular shape with a horizontal width W and a vertical height H.

However, it is not preferable that a fisheye lens with the equidistance projection scheme or the stereographic projection scheme is used in order to obtain a horizontal field of view of 180°. This is because a natural-looking panoramic image cannot be obtained due to the barrel distortion of fisheye lenses. Although it has not been explicitly described in detail, the rectilinear panoramic lens in the fifth embodiment of the present invention satisfies the rectilinear projection scheme in the vertical direction, while the equidistance projection scheme is satisfied in the horizontal direction due to the optical layout of the lens. Accordingly, for the ninth embodiment of the present invention, it is also preferable that the equidistance projection scheme is satisfied in the horizontal direction and the rectilinear projection scheme is satisfied in the vertical direction. Such a projection scheme can be easily comprehended by assuming a hemi-cylindrical object plane 6821 with a radius R and having the rotationally symmetry axis in coincident with the y axis. According to the preferable projection scheme of the present invention, any scene which exists on the hemi-cylindrical object plane 6821 is reproduced on the image sensor plane with the correct horizontal-to-vertical ratio preserved. In the current invention, such an imaging system will be referred to as a wall-mounting type panoramic imaging system.

Referring to FIG. 68, if the horizontal incidence angle of an incident ray with respect to the y-z plane is $\delta_x$ and the maximum value of the horizontal incidence angle is $\delta_{x2}$, then the x coordinate of the corresponding image point on the image sensor plane is given by Equation 71 as follows:

$$x(\delta_x, \delta_y) = \frac{W}{2\delta_{x2}}\delta_x \quad \text{MathFigure 71}$$

Meanwhile, if the vertical incidence angle of the incident ray with respect to the x-z plane is $\delta_y$ and the maximum value of the vertical incidence angle is $\delta_{y2}$, then the y coordinate of the corresponding image point on the image sensor plane is given by Equation 72 as follows:

$$y(\delta_x, \delta_y) = \frac{H}{2\tan\delta_{y2}}\tan\delta_y \quad \text{MathFigure 72}$$

The aspect ratio (i.e., the ratio between the horizontal width and the vertical height) of typical image sensor planes follow several predetermined formats. The widely-used aspect ratios of image sensor planes are given as 1:1, 4:3 or 16:9. As is described previously, it is preferable that the horizontal field of view is $2\delta_{x2}=180°$ for a wall-mounting type panoramic imaging system, but the standard field of view will be appropriate in the vertical direction. Accordingly, it is desirable that an image sensor with a wider horizontal dimension is used, such as the one with the aspect ratio of 16:9. If an image sensor with the aspect ratio of W:H is employed, the preferable size of the object plane is given as described below. First, if the radius of the object plane is R, the horizontal width of the object plane is given as $2\delta_{x2}R$. Herein, it is assumed that Radian is used as the unit of angle. Accordingly, the width $2\delta_{x2}R$ of the object plane should be proportional to the horizontal width W of the image sensor plane. Let's suppose that this proportionality constant is c. Then, the radius R of the object plane is given by Equation 73 as follows:

$$R = \frac{cW}{2\delta_{x2}} \quad \text{MathFigure 73}$$

Since the proportionality constant is c, the height of the object plane is given as cH. Meanwhile, since the object plane has a hemi-cylindrical structure, the distance from the y axis to the object plane is always R. Accordingly, if the vertical field of view $2\delta_{y2}$ is symmetric with respect to the horizon (i.e., the x-z plane), then the following equation is satisfied for the vertical direction due to the property of trigonometric function.

$$R\tan\delta_{y2} = \frac{cH}{2} \quad \text{MathFigure 74}$$

As a result, the following relationship can be obtained from Equations 73 and 74.

$$\frac{2R}{c} = \frac{W}{\delta_{x2}} = \frac{H}{\tan\delta_{y2}} \quad \text{MathFigure 75}$$

As a consequence, in order to obtain a natural looking panoramic image, the horizontal and the vertical fields of view should satisfy the relationship given by Equation 75.

INDUSTRIAL APPLICABILITY

According to the present invention, it is possible to obtain a wide-angle lens which provides a most satisfactory image with a desirable projection scheme, wherein the quantities of direct interest to the user, namely the image sensor size, the field of view, and the like are directly reflected in the projection scheme.

The specification of the present invention is implicitly described with reference to the visible wavelength range, but the projection scheme of the present invention can be described by the same equations as described above even in the millimeter and microwave region, in the ultra violet wavelength range, in the near infrared wavelength range and in the far infrared wavelength range, as well as in the visible wavelength range. Accordingly, the present invention is not limited to imaging systems operating in the visible wavelength range.

The preferred embodiments of the present invention have been described in detail with reference to the accompanying drawings. However, the descriptions and the embodiments of the present invention are merely for illustrative purposes, and it will be apparent to those skilled in the art that various modifications and changes can be made thereto without departing from the scope and spirit of the present invention.

The invention claimed is:

1. An imaging optical lens rotationally symmetric about an optical axis, wherein
the imaging operation of the lens renders an incident ray to form an image point on an image plane perpendicular to the optical axis;
the incidence angle of the incident ray with respect to the optical axis is $\delta$;
the incidence angle ranges from a minimum incidence angle $\delta_1$ to a maximum incidence angle $\delta_2$ ($\delta_1 \leq \delta \leq \delta_2$);
the image height r defined by a distance from the intersection point between the image plane and the optical axis to the image point is given by Equation 1 for a continuous and monotonic function $F(\delta)$ as follows:

$$r(\delta) = \frac{r_2 - r_1}{F_2 - F_1}\{F(\delta) - F_1\} + r_1 \quad \text{(Equation 1)}$$

$F_1$ is a functional value corresponding to the minimum incidence angle $\delta_1$ (i.e., $F_1 \equiv F(\delta_1)$);
$F_2$ is a functional value corresponding to the maximum incidence angle $\delta_2$ (i.e., $F_2 \equiv F(\delta_2)$);
$r_1$ is an image height corresponding to the minimum incidence angle $\delta_1$ (i.e., $r_1 \equiv r(\delta_1)$);
$r_2$ is an image height corresponding to the maximum incidence angle $\delta_2$ (i.e., $r_2 \equiv r(\delta_2)$); and
the function $F(\delta)$ is given by any one among the Equations 2 through 6 as follows:

$$F(\delta) = \tan \delta \quad \text{(Equation 2)}$$

$$F(\delta) = \tan \frac{\delta}{2} \quad \text{(Equation 3)}$$

$$F(\delta) = \delta \quad \text{(Equation 4)}$$

$$F(\delta) = \sin \delta/2 \quad \text{(Equation 5)}$$

$$F(\delta) = \cot \delta. \quad \text{(Equation 6)}$$

2. A lens according to claim 1, wherein the minimum incidence angle $\delta_1$ is 0°, the image height $r_1$ is 0, the maximum incidence angle $\delta_2$ is smaller than 90°, and the function $F(\delta)$ is given by Equation 2.

3. The lens according to claim 1, wherein the minimum incidence angle $\delta_1$ is 0°, the image height $r_1$ is 0, the maximum incidence angle $\delta_2$ is smaller than 180°, and the function $F(\delta)$ is given by Equation 3.

4. The lens according to claim 1, wherein the minimum incidence angle $\delta_1$ is 0°, the image height $r_1$ is 0, the maximum incidence angle $\delta_2$ is smaller than 180°, and the function $F(\delta)$ is given by Equation 4.

5. The lens according to claim 1, wherein the minimum incidence angle $\delta_1$ is 0°, the image height $r_1$ is 0, the maximum incidence angle $\delta_2$ is smaller than 180°, and the function $F(\delta)$ is given by Equation 5.

6. The lens according to claim 1, wherein the minimum incidence angle $\delta_1$ is larger than 0°, the image height $r_1$ is larger than 0, the maximum incidence angle $\delta_2$ is smaller than 180°, and the function $F(\delta)$ is given by Equation 6.

7. An imaging optical lens rotationally symmetric about an optical axis, wherein
the lens includes at least a first lens element and a stop;
the imaging operation of the lens renders an incident ray to form an image point on an image plane perpendicular to the optical axis;
the incidence angle of an incident ray with respect to the optical axis is $\delta$;
the incidence angle ranges from 0° to a maximum incidence angle $\delta$ smaller than 90° ($0° \leq \delta \leq \delta_2 \leq 90°$);
a real image height defined by a distance from an intersection point between the image plane and the optical axis to the image point is referred to as $r'(\delta)$;
a theoretical image height given by Equation 7 is referred to as $r(\delta)$;

$$r(\delta) = \frac{r_2}{\tan \delta_2}\tan \delta \quad \text{(Equation 7)}$$

where $r_2$ is an image height corresponding to the maximum incidence angle $\delta_2$ (i.e., $r_2 \equiv r(\delta_2)$); and
for all the incident rays with incidence angles smaller than the maximum incidence angle $\delta_2$, the real image height $r'(\delta)$ and the theoretical image height $r(\delta)$ satisfy at least one equation between Equations 8 and 9 given as:

$$\left|\frac{r(\delta) - r'(\delta)}{r(\delta)}\right| < 0.04 \quad \text{(Equation 8)}$$

$$\left|\frac{r(\delta) - r'(\delta)}{r_2}\right| < 0.02. \quad \text{(Equation 9)}$$

8. The lens according to claim 7,
wherein the maximum incidence angle is larger than 45° (i.e., $\delta_2 \geq 45°$), the back focal length $f_B$ of the lens is at least twice as large as the effective focal length f (i.e., $f_B \geq 2f$),
the first lens element is a double aspheric lens element having a first lens surface which is an aspheric surface on the object side and a second lens surface which is an aspheric surface on the image side, the first lens surface is described by a polynomial given by Equation 10 as follows:

$$h(\rho) = \sum_{i=1}^{n} C_i \rho^i \quad \text{(Equation 10)}$$

where $\rho$ is the axial radius perpendicularly measured with respect to the optical axis, $h(\rho)$ is the sag of the first lens surface measured along the optical axis at the axial radius $\rho$, n is the order of the polynomial, and $C_i$ is the coefficient of the i-th order term.

9. The lens according to claim 7,
wherein the first lens element is a double aspheric lens element having a first lens surface which is an aspheric surface on the object side and a second lens surface which is an aspheric surface on the image side,
wherein the first lens surface is in the shape of a letter ω having the image side as the upper side,
and the second lens surface is in the shape of a letter U having the image side as the upper side and the object side as the lower side.

10. The lens according to claim 7,
wherein the first lens element is a double aspheric lens element having a first lens surface which is an aspheric surface on the object side and a second lens surface which is an aspheric surface on the image side,
the lowest points of the first lens surface form a circle about the optical axis when the direction from the object side to the image side is taken as the positive direction,
a local maximum is located at the optical axis,
the lowest point of the second lens surface is located at the optical axis,
and the sag of the second lens surface monotonically increases from the optical axis toward the perimeter of the second lens surface.

11. An imaging optical lens rotationally symmetric about an optical axis, wherein
the lens includes at least a first and a second lens elements and a stop;
the imaging operation of the lens renders an incident ray to form an image point on an image plane perpendicular to the optical axis;
the incidence angle of the incident ray with respect to the optical axis is $\delta$;
the incidence angle ranges from 0° to a maximum incidence angle $\delta_2$ smaller than 180° ($0° \leq \delta \leq \delta_2 \leq 180°$);
a real image height defined by a distance from an intersection point between the image plane and the optical axis to the image point is referred to as $r'(\delta)$;
a theoretical image height given by Equation 11 is referred to as $r(\delta)$, $$r(\delta) = \frac{r_2}{\tan\frac{\delta_2}{2}} \tan\frac{\delta}{2} \quad \text{(Equation 11)}$$

where $r_2$ is an image height corresponding to the maximum incidence angle $\delta_2$ (i.e., $r_2 \equiv r(\delta_2)$); and
for all the incident rays with incidence angles smaller than the maximum incidence angle $\delta_2$, the real image height $r'(\delta)$ and the theoretical image height $r(\delta)$ satisfy Equation 12 as follows:

$$\left| \frac{r(\delta) - r'(\delta)}{r(\delta)} \right| < 0.04. \quad \text{(Equation 12)}$$

12. The lens according to claim 11,
wherein the maximum incidence angle is larger than 80° (i.e., $\delta_2 \geq 80°$),
the first lens element is an aspheric mirror having a first lens surface which is a reflective surface,
the sag of the first lens surface monotonically increases from the optical axis toward the perimeter of the first lens surface,
and a stop is positioned between the first lens element and the second lens element.

13. The lens according to claim 11,
wherein the maximum incidence angle is larger than 80° (i.e., $\delta_2 \geq 80°$),
the first lens element is a double aspheric lens element having a first lens surface which is an aspheric refractive surface on the object side and a second lens surface which is an aspheric refractive surface on the image side,
the lowest points of the first and the second lens surfaces are located at the optical axis when the direction from the object side to the image side is taken as the positive direction,
and the sags of the first and the second lens surfaces monotonically increase from the optical axis toward the perimeters of the first and the second lens surfaces, respectively.

14. An imaging optical lens rotationally symmetric about an optical axis, wherein
the lens includes at least a first and a second lens elements and a stop;
the imaging operation of the lens renders an incident ray to form an image point on an image plane perpendicular to the optical axis;
the incidence angle of the incident ray with respect to the optical axis is $\delta$;
the incidence angle ranges from a minimum incidence angle $\delta_1$ larger than 0° to a maximum incidence angle $\delta_2$ smaller than 180° ($0° < \delta_1 \leq \delta \leq \delta_2 < 180°$),
a real image height defined by a distance from an intersection point between the image plane and the optical axis to the image point is referred to as $r'(\delta)$;
a theoretical image height given by Equation 13 is referred to as $r(\delta)$, $$r(\delta) = r_i + \frac{r_2 - r_1}{\cot\delta_2 - \cot\delta_1}(\cot\delta - \cot\delta_1) \quad \text{(Equation 13)}$$

where $r_1$ is an image height corresponding to the minimum incidence angle $\delta_1$ (i.e., $r_1 \equiv r(\delta_1)$), and $r_2$ is an image height corresponding to the maximum incidence angle $\delta_2$ (i.e., $r_2 \equiv r(\delta_2)$); and
for all the incident rays with incidence angles ranging from the minimum incidence angle $\delta_1$ to the maximum incidence angle $\delta_2$, the real image height $r'(\delta)$ and the theoretical image height $r(\delta)$ satisfy Equation 14 as follows:

$$\left| \frac{r(\delta) - r'(\delta)}{r(\delta)} \right| < 0.04. \quad \text{(Equation 14)}$$

15. The lens according to claim 14,
wherein the first lens element is an aspheric mirror having a first lens surface which is a reflective surface;
the first lens surface of the first lens element is described as a polynomial given by Equation 15 as follows:

$$h(\rho) = \sum_{i=1}^{n} C_i \rho^i \qquad \text{(Equation 15)}$$

where $\rho$ is an axial radius measured perpendicular to the optical axis, $h(\rho)$ is the sag of the first lens surface measured along the optical axis at the axial radius $\rho$, n is the order of the polynomial, and $C_i$ is the coefficient of the i-th order term;
the sag of the first lens surface monotonically increases from the optical axis toward the perimeter of the first lens surface; and
a stop is positioned between the first lens element and the second lens element.

16. An anamorphic imaging lens, wherein
the imaging operation of the lens renders an incident ray to form an image point on an image plane perpendicular to the optical axis of the lens;
the image plane has a rectangular shape with a horizontal width W and a vertical height H; and
with respect to a rectangular coordinate system in which the z axis coincides with the optical axis, the x axis is perpendicular to the z axis and parallel to the horizontal sides of the image plane, and the y axis is perpendicular to the z axis and parallel to the vertical sides of the image sensor plane, the horizontal incidence angle of an incident ray with respect to the y-z plane is $\delta_x$, the vertical incidence angle of the incident ray with respect to the x-z plane is $\delta_y$, the maximum horizontal incidence angle of the incident ray is $\delta_{x2}$, the maximum vertical incidence angle of the incident ray is $\delta_{y2}$, and the two dimensional coordinate of the image point corresponding to the incident ray is (x, y), the horizontal coordinate x is given by Equation 16 and the vertical coordinate y is given by Equation 17 as follows:

$$x(\delta_x, \delta_y) = \frac{W}{2\tan\delta_{x2}}\tan\delta_x \qquad \text{(Equation 16)}$$

$$y(\delta_x, \delta_y) = \frac{H}{2\tan\delta_{y2}}\tan\delta_y. \qquad \text{(Equation 17)}$$

17. An anamorphic imaging lens, wherein
the imaging operation of the lens renders an incident ray to form an image point on an image plane perpendicular to the optical axis of the lens;
the image plane has a rectangular shape with a horizontal width W and a vertical height H; and
with respect to a rectangular coordinate system in which the z axis coincides with the optical axis, the x axis is perpendicular to the z axis and parallel to the horizontal sides of the image plane, and the y axis is perpendicular to the z axis and parallel to the vertical sides of the image plane, the horizontal incidence angle of an incident ray with respect to the y-z plane is $\delta_x$, the vertical incidence angle of the incident ray with respect to the x-z plane is $\delta_y$, the maximum horizontal incidence angle of the incident ray is $\delta_{x2}$, the maximum vertical incidence angle of the incident ray is $\delta_{y2}$, and the two dimensional coordinate of the image point corresponding to the incident ray is (x, y),
the horizontal coordinate x is given by Equation 18 and the vertical coordinate y is given by Equation 19 as follows:

$$x(\delta_x, \delta_y) = \frac{W}{2\delta_{x2}}\delta_x \qquad \text{(Equation 18)}$$

$$y(\delta_x, \delta_y) = \frac{H}{2\tan\delta_{y2}}\tan\delta_y. \qquad \text{(Equation 19)}$$

18. The lens according to claim 17,
wherein the horizontal width W and the vertical height H of the image plane, the maximum horizontal incidence angle $\delta_{x2}$ and the maximum vertical incidence angle $\delta_{y2}$ satisfy Equation 20 as follows:

$$\frac{W}{\delta_{x2}} = \frac{H}{\tan\delta_{y2}}. \qquad \text{(Equation 20)}$$

* * * * *

UNITED STATES PATENT AND TRADEMARK OFFICE
CERTIFICATE OF CORRECTION

| | |
|---|---|
| PATENT NO. | : 7,612,946 B2 |
| APPLICATION NO. | : 12/162122 |
| DATED | : November 3, 2009 |
| INVENTOR(S) | : Kweon et al. |

Page 1 of 1

It is certified that error appears in the above-identified patent and that said Letters Patent is hereby corrected as shown below:

On the Title Page, Item (75)
On the cover page, the name of the first-listed inventor should read --Gyeong Il Kweon--; and the identification of the inventors should read --Kweon et al.--.

Signed and Sealed this

Thirteenth Day of July, 2010

David J. Kappos
*Director of the United States Patent and Trademark Office*